(12) United States Patent
Kishi et al.

(10) Patent No.: US 12,281,727 B2
(45) Date of Patent: Apr. 22, 2025

(54) PIPE TRANSPORT DEVICE AND PIPE JOINING METHOD INSIDE PIPELINE CONSTRUCTION SHAFT

(71) Applicant: KUBOTA CORPORATION, Osaka (JP)

(72) Inventors: Shozo Kishi, Amagasaki (JP); Kazuya Ito, Amagasaki (JP); Yuito Komaru, Amagasaki (JP); Ko Ishimura, Amagasaki (JP); Masataka Shimomura, Amagasaki (JP); Yutaka Fujimoto, Amagasaki (JP); Kento Higashi, Amagasaki (JP)

(73) Assignee: KUBOTA CORPORATION, Osaka (JP)

( * ) Notice: Subject to any disclaimer, the term of this patent is extended or adjusted under 35 U.S.C. 154(b) by 800 days.

(21) Appl. No.: 17/441,320

(22) PCT Filed: Mar. 19, 2020

(86) PCT No.: PCT/JP2020/012350
§ 371 (c)(1),
(2) Date: Sep. 21, 2021

(87) PCT Pub. No.: WO2020/196287
PCT Pub. Date: Oct. 1, 2020

(65) Prior Publication Data
US 2022/0178471 A1 Jun. 9, 2022

(30) Foreign Application Priority Data

Mar. 22, 2019 (JP) .................................. 2019-054008
Mar. 22, 2019 (JP) .................................. 2019-054009

(51) Int. Cl.
*E21D 11/40* (2006.01)
*F16L 1/036* (2006.01)
*F16L 1/09* (2006.01)

(52) U.S. Cl.
CPC ................. *F16L 1/09* (2013.01); *F16L 1/036* (2013.01)

(58) Field of Classification Search
CPC ... F16L 1/09; F16L 1/036; F16L 1/028; E21D 11/40
See application file for complete search history.

(56) References Cited

U.S. PATENT DOCUMENTS 17,650 A * 6/1857 Wilson ...................... E21B 3/02
175/203
80,056 A * 7/1868 Brunton ................ E21D 9/1093
175/348

(Continued)

FOREIGN PATENT DOCUMENTS

CN 203558594 U 4/2014
JP 10-127171 A 5/1998

(Continued)

OTHER PUBLICATIONS

Extended European Search Report issued in corresponding European Patent Application No. 20777495.1 dated Mar. 22, 2022.

(Continued)

*Primary Examiner* — Edwin J Toledo-Duran
(74) *Attorney, Agent, or Firm* — RENNER, OTTO, BOISSELLE & SKLAR, LLP

(57) ABSTRACT

A pipe joining method includes a moving of a first transport trolley with a loaded first pipe and a second transport trolley with a loaded second pipe forward, a joining of one end of the first pipe to another end of a rearmost pipe of a pipeline, a lifting of another end of the first pipe, a moving of the first transport trolley and the second transport trolley backward, (Continued)

a drawing of the first transport trolley from beneath of the first pipe to the near side, a removing of a coupler to separate the first transport trolley and the second transport trolley, a moving of the first transport trolley backward, a drawing of the first transport trolley below the second pipe loaded on the second transport trolley, and a moving of the second transport trolley forward with the first transport trolley.

12 Claims, 52 Drawing Sheets

(56) References Cited

U.S. PATENT DOCUMENTS

| | | | | |
|---|---|---|---|---|
| 92,126 | A * | 6/1869 | Turnbull | A63H 19/18 213/84 |
| 165,529 | A * | 7/1875 | Bell | B61G 1/28 213/98 |
| 370,606 | A * | 9/1887 | Chambers | F16L 27/0861 285/31 |
| 375,464 | A * | 12/1887 | Thacher et al. | F16L 35/00 285/31 |
| 376,131 | A * | 1/1888 | Bailey | A63H 19/18 213/215 |
| 395,369 | A * | 1/1889 | Wellington | B61G 1/02 213/182 |
| 466,046 | A * | 12/1891 | Reno | E21D 9/06 299/33 |
| 497,121 | A * | 5/1893 | Dingwall | B61G 3/16 213/97 |
| 498,855 | A * | 6/1893 | Morris | E21D 9/0621 405/143 |
| 504,179 | A * | 8/1893 | Stanley | E21D 9/1093 299/59 |
| 551,042 | A * | 12/1895 | McDonald | E21D 11/10 299/61 |
| 801,848 | A * | 10/1905 | Buechler | E21D 9/06 405/141 |
| 823,196 | A * | 6/1906 | Sundh | B60Q 1/245 307/41 |
| 927,659 | A * | 7/1909 | Kilpatrick | F16L 27/0828 285/190 |
| 945,623 | A * | 1/1910 | Sleade | E21D 9/106 299/101 |
| 1,212,107 | A * | 1/1917 | Robinson | E21D 9/106 299/62 |
| 1,361,583 | A * | 12/1920 | Hiss | E21D 11/003 104/165 |
| 1,462,997 | A * | 7/1923 | Anderson | E21D 9/10 299/56 |
| 1,499,638 | A * | 7/1924 | Brake | B61G 7/04 451/412 |
| 1,716,125 | A * | 6/1929 | Hackley | E21D 11/10 405/150.1 |
| 1,954,161 | A * | 4/1934 | Williams | E21D 9/126 414/565 |
| 2,116,905 | A * | 5/1938 | Mercier | E21D 9/12 414/398 |
| 2,318,154 | A * | 5/1943 | Gooder | E21D 9/126 405/129.1 |
| 2,587,362 | A * | 2/1952 | Miller | E21D 9/126 414/339 |
| 2,655,360 | A * | 10/1953 | Danielsson | E21D 9/12 212/326 |
| 2,780,376 | A * | 2/1957 | Sanders | A01G 25/09 414/745.9 |
| 2,807,937 | A * | 10/1957 | Rhodes | F16L 55/1283 138/93 |
| 2,841,297 | A * | 7/1958 | Washabaugh | E21D 11/40 414/746.5 |
| 2,895,299 | A * | 7/1959 | Washabaugh | E21D 11/08 405/138 |
| 2,995,901 | A * | 8/1961 | Kemper | E21D 11/105 405/150.1 |
| 3,117,676 | A * | 1/1964 | Edwards | A63H 19/18 213/211 |
| 3,122,890 | A * | 3/1964 | Kemper | B65G 53/32 105/247 |
| 3,233,315 | A * | 2/1966 | Levake | F16L 1/10 405/184.5 |
| 3,272,357 | A * | 9/1966 | Freni | E21D 9/126 105/364 |
| 3,355,792 | A * | 12/1967 | Cunningham | B23K 37/0531 294/93 |
| 3,506,310 | A * | 4/1970 | Gruere | E21D 9/102 299/56 |
| 3,561,223 | A * | 2/1971 | Tabor | E21D 9/0873 299/33 |
| 3,645,102 | A * | 2/1972 | Chlumecky | E21D 11/08 405/150.1 |
| 3,970,200 | A * | 7/1976 | Goetjen | E21D 11/40 405/148 |
| 4,209,269 | A * | 6/1980 | Martinez | F16L 1/09 405/184.5 |
| 4,298,296 | A * | 11/1981 | Hanson | F16L 1/038 405/150.1 |
| 4,618,298 | A * | 10/1986 | Takamiya | E21D 9/0607 405/138 |
| 4,808,030 | A * | 2/1989 | Takegawa | E21D 11/10 405/145 |
| 5,129,761 | A * | 7/1992 | Andersen | F16L 1/09 405/150.1 |
| 5,141,363 | A * | 8/1992 | Stephens | C04B 28/02 405/150.2 |
| 5,362,114 | A * | 11/1994 | Levingston | F16L 47/16 285/291.1 |
| 5,531,337 | A * | 7/1996 | Cappelletti | B61G 7/04 901/47 |
| 5,626,442 | A * | 5/1997 | Boyer | E02F 5/10 405/184.2 |
| 6,874,807 | B1 * | 4/2005 | Labadie | B62B 5/00 280/491.4 |
| 11,739,639 | B2 * | 8/2023 | Wang | E21D 11/40 405/151 |
| 2005/0206106 | A1 * | 9/2005 | Labadie | B60D 1/481 280/79.11 |
| 2014/0090576 | A1 * | 4/2014 | Wells, Sr. | F16L 3/01 105/238.1 |
| 2014/0137389 | A1 * | 5/2014 | Dagenais | B23K 37/0533 29/466 |
| 2022/0364469 | A1 * | 11/2022 | Wang | E21D 11/40 |

FOREIGN PATENT DOCUMENTS

| | | |
|---|---|---|
| JP | H10-127171 A | 5/1998 |
| JP | 2000-001213 A | 1/2000 |
| JP | 2001-280541 A | 10/2001 |
| JP | 2004-190690 A | 7/2004 |

OTHER PUBLICATIONS

International Search Report from corresponding International Patent Application No. PCT/JP2020/012350, dated Jun. 16, 2020.
First Office Action issued in related Chinese Patent Application No. 202080022998.9 dated Jun. 27, 2024 along with the English-language translation.

\* cited by examiner

PIPE TRANSPORT DEVICE AND PIPE JOINING METHOD INSIDE PIPELINE CONSTRUCTION SHAFT

FIELD OF THE INVENTION

The present invention relates to a pipe transport device that is used when pipes are joined together to form a pipeline inside a pipeline construction shaft formed underground by, for example, a shield machine, and a pipe joining method using the pipe transport device.

BACKGROUND OF THE INVENTION

As illustrated in FIGS. 51 and 52, a pipe transport device is conventionally used when a first pipe 203 and a second pipe 204 are joined to a rearmost pipe 202 of a pipeline in a pipeline construction shaft 201. A pipe transport device 205 can travel on rails 206 in the pipeline construction shaft 201 and includes a first transport trolley 207 for transporting the first pipe 203, a second transport trolley 208 for transporting the second pipe 204, and a coupling bar 209 coupling the first transport trolley 207 and the second transport trolley 208. One end of the coupling bar 209 and the first transport trolley 207 are detachably coupled to each other via a first coupling pin 211 while the other end of the coupling bar 209 and the second transport trolley 208 are detachably coupled to each other via a second coupling pin 212.

By using the pipe transport device 205 thus configured, the pipes are joined as follows:

First, as illustrated in FIG. 52, the first pipe 203 is loaded on the first transport trolley 207, and the second pipe 204 is loaded on the second transport trolley 208. In this state, the pipe transport device 205 is moved forward to be stopped near the rearmost pipe 202.

Subsequently, the first coupling pin 211 is removed to decouple the coupling bar 209 and the first transport trolley 207, the second coupling pin 212 is removed to decouple the coupling bar 209 and the second transport trolley 208, and the coupling bar 209 is removed, so that the first transport trolley 207 and the second transport trolley 208 are separated from each other.

Thereafter, the first transport trolley 207 is moved forward, and one end of the first pipe 203 is joined to another end of the rearmost pipe 202.

After that, as illustrated in FIG. 53, a sleeper 214 is set under the first pipe 203, the first pipe 203 is laid on the sleeper 214, and the first transport trolley 207 is moved backward to be drawn from beneath the first pipe 203 to the near side of the first pipe 203.

The first transport trolley 207 thus drawn is lifted and collected into the second pipe 204 loaded on the second transport trolley 208.

The second transport trolley 208 is then moved forward, so that one end of the second pipe 204 on the second transport trolley 208 is joined to the other end of the first pipe 203 joined to the rearmost pipe 202.

See Japanese Patent Laid-Open No. 2001-280541 for a description on the pipe transport device and the pipe joining method.

In the conventional form, however, the first pipe 203 is joined to the rearmost pipe 202 as illustrated in FIG. 53, and then the first transport trolley 207 drawn from beneath the first pipe 203 to the near side of the first pipe 203 is lifted and transferred into the second pipe 204 on the second transport trolley 208. Thus, if the first transport trolley 207 is large and heavy, it takes much time and effort to lift and transfer the first transport trolley 207 into the second pipe 204 on the second transport trolley 208.

Moreover, in the conventional form, the first pipe 203 is loaded on the first transport trolley 207, and the second pipe 204 is loaded on the second transport trolley 208. In this state, the coupling bar 209 is hidden under the first and second pipes 203 and 204. A space under the first pipe 203 and a space under the second pipe 204 are quite small. Thus, when the first coupling pin 211 is removed to decouple the coupling bar 209 and the first transport trolley 207, the first pipe 203 may interfere with the removal of the first coupling pin 211, making the removal difficult to perform. Moreover, when the second coupling pin 212 is removed to decouple the coupling bar 209 and the second transport trolley 208, the second pipe 204 may interfere with the removal of the second coupling pin 212, making the removal difficult to perform.

Hence, it takes time and effort to remove the coupling bar 209 to separate the first transport trolley 207 and the second transport trolley 208.

SUMMARY OF THE INVENTION

An object of present invention is to provide a pipe joining method inside a pipeline construction shaft so as to save time and effort to lift and transfer a first transport trolley into a second pipe on a second transport trolley.

An object of the present invention is to provide a pipe transport device and a pipe joining method inside a pipeline construction shaft so as to reduce time and effort to remove a coupler to separate the first transport trolley and the second transport trolley.

A pipe joining method according to the present invention, in which a first pipe is loaded on a first transport trolley of a pipe transport device including the first transport trolley and a second transport trolley that are capable of traveling on rails in a pipeline construction shaft, a second pipe is loaded on the second transport trolley coupled to the first transport trolley via a coupler, the first pipe and the second pipe are transported, and the first pipe and the second pipe are sequentially joined to a rearmost pipe of a pipeline in the pipeline construction shaft, the method including: moving the first transport trolley with the loaded first pipe and the second transport trolley with the loaded second pipe forward and joining one end of the first pipe to the rearmost pipe;

lifting the other end of the first pipe, moving the first transport trolley and the second transport trolley backward, and drawing the first transport trolley from beneath of the first pipe to a near side of the first pipe;

removing the coupler to separate the first transport trolley and the second transport trolley;

moving the first transport trolley backward and drawing the first transport trolley below the second pipe loaded on the second transport trolley; and moving the second transport trolley forward with the first transport trolley and joining one end of the second pipe on the second transport trolley to the other end of the first pipe joined to the rearmost pipe.

The pipe joining method inside the pipeline construction shaft according to the present invention, wherein after joining one end of the second pipe on the second transport trolley to the other end of the first pipe joined to the rearmost pipe, the method preferably further includes: lifting the other end of the second pipe, moving the first transport trolley and the second transport trolley backward, and drawing the first transport trolley and the second transport trolley from beneath of the second pipe to the near side of the second pipe.

The pipe joining method inside the pipeline construction shaft according to the present invention, wherein after lifting the other end of the first pipe, moving the first transport trolley and the second transport trolley backward, and drawing the first transport trolley from beneath of the first pipe to the near side of the first pipe, the method preferably further includes: removing the rails under the first pipe joined to the rearmost pipe and loading the rails on the first transport trolley; and removing the coupler to separate the first transport trolley and the second transport trolley;
drawing, with the removed rails, the first transport trolley below the second pipe loaded on the second transport trolley.

The pipe joining method inside the pipeline construction shaft according to the present invention preferably further includes transferring the removed coupler into the second pipe.

The pipe joining method inside the pipeline construction shaft according to the present invention, wherein after lifting the other end of the first pipe, moving the first transport trolley and the second transport trolley backward, and drawing the first transport trolley from beneath of the first pipe to the near side of the first pipe, the method preferably further includes:

installing a support member under the other end of the first pipe; and lowering the other end of the first pipe onto the support member and supporting the other end of the first pipe by the support member.

The pipe joining method inside the pipeline construction shaft according to the present invention, wherein after removing the coupler to separate the first transport trolley and the second transport trolley, the method preferably further includes drawing the first transport trolley below the second pipe while the second pipe loaded on the second transport trolley is lifted by a lifting device provided for the second transport trolley.

A pipe joining method according to the present invention, in which a first pipe is loaded on a first transport trolley of a pipe transport device including the first transport trolley and a second transport trolley that are capable of traveling on rails in a pipeline construction shaft, a second pipe is loaded on the second transport trolley coupled to the first transport trolley via a coupler, the first pipe and the second pipe are transported, and the first pipe and the second pipe are sequentially joined to a rearmost pipe of a pipeline in the pipeline construction shaft, the method including:

moving the first transport trolley with the loaded first pipe and the second transport trolley with the loaded second pipe forward and joining one end of the first pipe to the rearmost pipe;
lifting the other end of the first pipe, moving the first transport trolley and the second transport trolley backward, and drawing the first transport trolley from beneath of the first pipe to a near side of the first pipe;
removing the coupler to separate the first transport trolley and the second transport trolley;
installing an auxiliary rail device that branches from the rails on the near side of the first pipe and extends into the second pipe loaded on the second transport trolley;
moving the first transport trolley backward from the near side of the first pipe, causing the first transport trolley to travel on the auxiliary rail device from the rails, and transferring the first transport trolley into the second pipe;
removing a tilted part that branches from the rails and protrudes forward from one end of the second pipe; and
moving the second transport trolley forward and joining one end of the second pipe on the second transport trolley to the other end of the first pipe joined to the rearmost pipe.

The pipe joining method inside the pipeline construction shaft according to the present invention, wherein when the coupler is removed to separate the first transport trolley and the second transport trolley, one end of the coupler is preferably removed from the first transport trolley, and an operation part provided for the coupler is preferably operated to disengage the other end of the coupler from the second transport trolley and remove the coupler between the first transport trolley and the second transport trolley.

A pipe transport device for transporting a pipe according to the present invention, including:

a first transport trolley for transporting a first pipe, a second transport trolley for transporting a second pipe, and a coupling device for coupling the first transport trolley and the second transport trolley,
wherein the coupling device has a coupler one end of which is attachable and detachable to and from the first transport trolley and the other end of which is attachable and detachable to and from the second transport trolley,
one end of the coupler includes an engaging member that is engageable and disengageable into and from one of the first transport trolley and the second transport trolley,
the engaging member is switchable between an engaged state for engagement with one of the transport trolleys and a disengaged state for disengagement from one of the transport trolleys,
the coupler includes a switching device for switching the engaging member from the engaged state to the disengaged state,
the switching device includes an operation part for operating the switching device from outside, and
the operation part is exposed to a space formed between the first pipe loaded on the first transport trolley and the second pipe loaded on the second transport trolley.

The pipe transport device according to the present invention, wherein the engaging member preferably drops from the engaged state so as to be switched to the disengaged state.

The pipe transport device according to the present invention, wherein one of the transport trolleys preferably includes an urging member for urging the engaging member from the engaged state to the disengaged state.

The pipe transport device according to the present invention, wherein the coupler is preferably allowed to be divided into a first coupler and a second coupler, the first coupler is preferably detachably coupled to the first transport trolley, the engaging member and the switching device are preferably provided for the second coupler, and the engaging member is preferably switchable between the engaged state for engagement with the second transport trolley and the disengaged state for disengagement from the second transport trolley.

According to the present invention, after joining the first pipe to the rearmost pipe, the first transport trolley is drawn to the near side of the first pipe, the first transport trolley is drawn below the second pipe loaded on the second transport trolley, the second transport trolley is moved forward with the first transport trolley, and the second pipe on the second transport trolley is joined to the rearmost pipe, thereby saving time and effort to lift and transfer the first transport trolley into the second pipe on the second transport trolley.

The operation part is operated to operate the switching device, so that the engaging member is switched from the engaged state to the disengaged state by the switching device, and one of the first transport trolley and the second transport trolley is disengaged from the coupler. At this point, the operation part can be operated without interfering with the first pipe and the second pipe. Thus, even if a small space is formed under the first pipe loaded on the first transport trolley or the second pipe loaded on the second transport trolley, one of the transport trolleys can be easily disengaged from the coupler by operating the operation part. This can reduce time and effort to remove the coupler to separate the first transport trolley and the second transport trolley.

DETAILED DESCRIPTION OF THE INVENTION

Embodiments of the present invention will be described below in accordance with the accompanying drawings.

Figure 1:
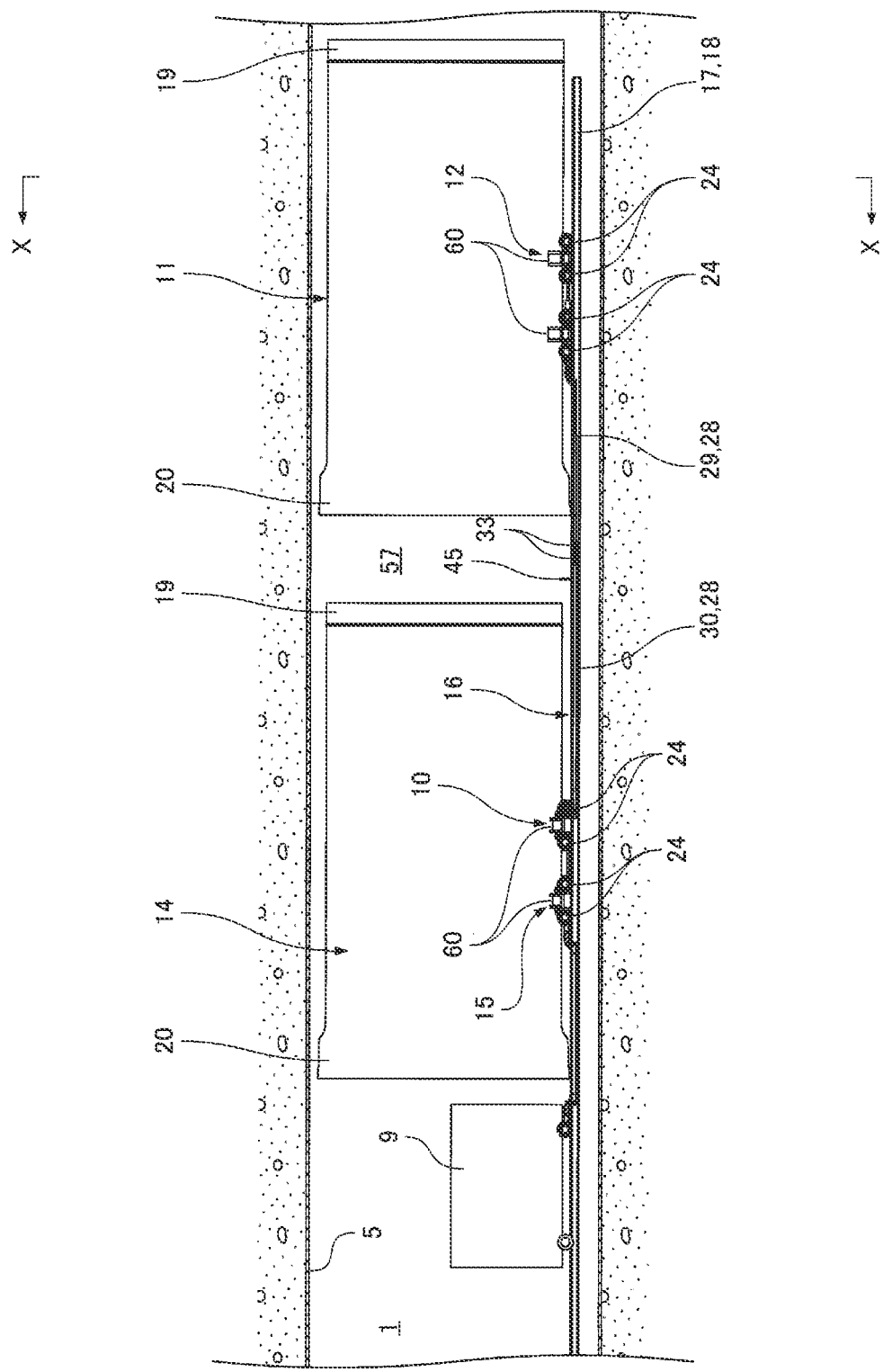
FIG. 1 is a side view illustrating pipes placed in a pipe transport device used for joining the pipes according to a first embodiment of the present invention.
Figure 2:
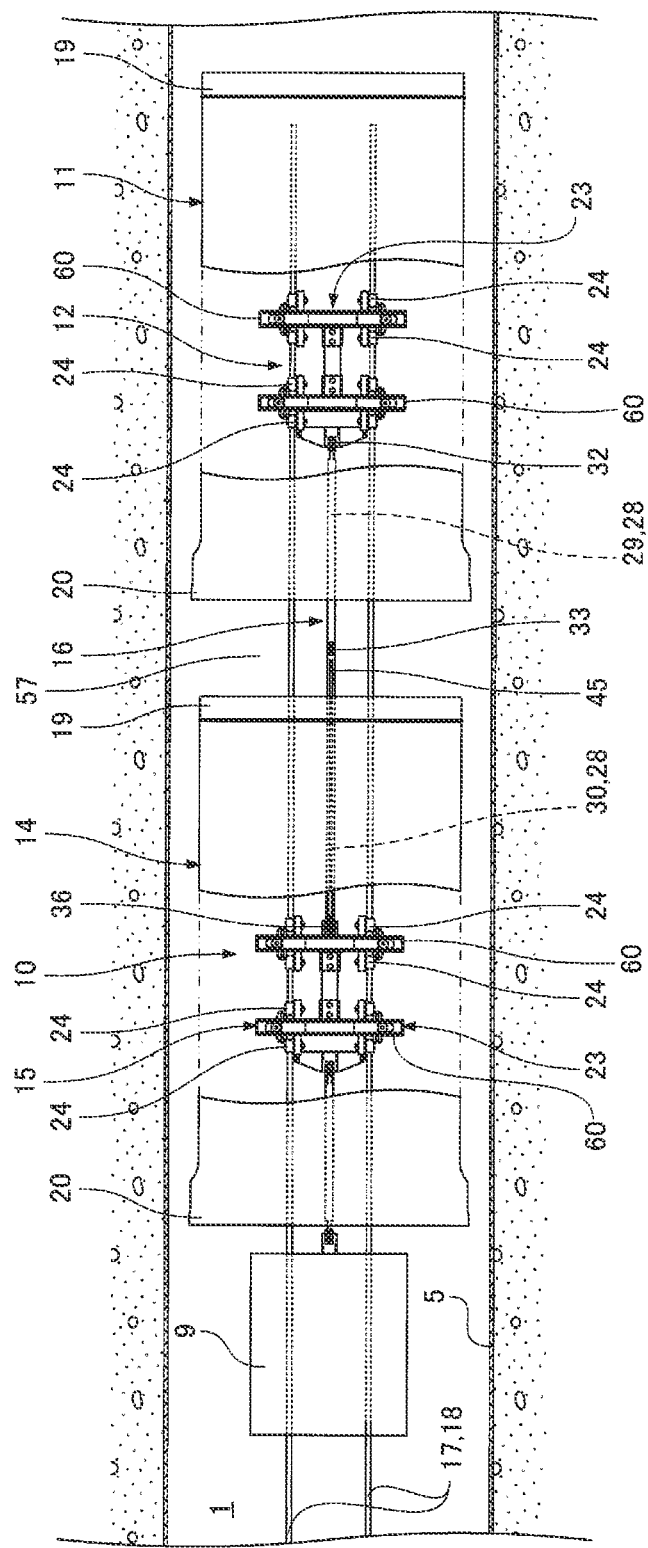
FIG. 2 is a partially cut plan view illustrating the pipes placed in the pipe transport device used for joining the pipes according to the first embodiment of the present invention.
Figure 20:
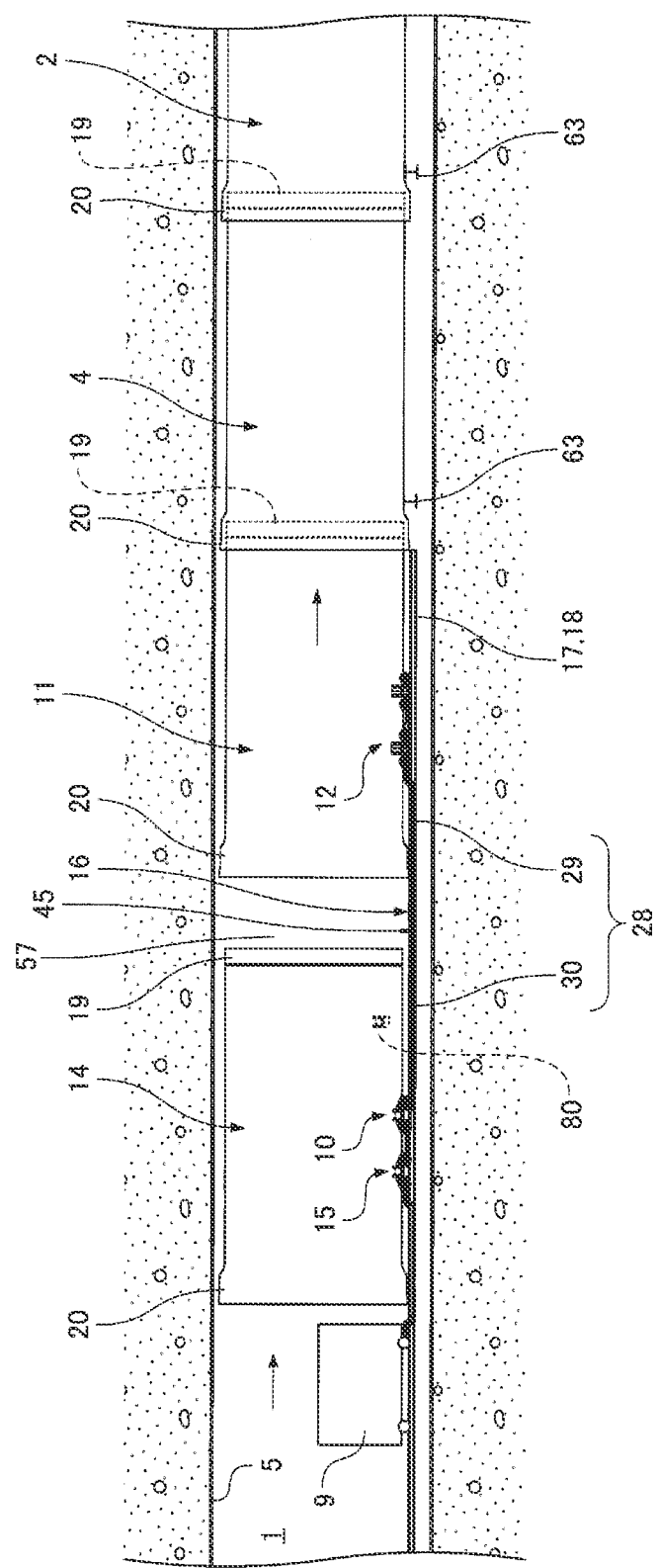
FIG. 20 illustrates a pipe joining method used for joining the pipes according to the first embodiment of the present invention.

In a first embodiment, as illustrated in FIGS. 1, 2, and 20, reference numeral 1 denotes a pipeline construction shaft that is constructed underground by a shield machine and is subjected to primary lining. Constructed in the pipeline construction shaft 1 are a pipeline 2 including a plurality of pipes joined together and a pair of left and right rails 17 (an example of rails). The rails 17 each include a plurality of separate rails 18 that are joined to one another.

Figure 3:
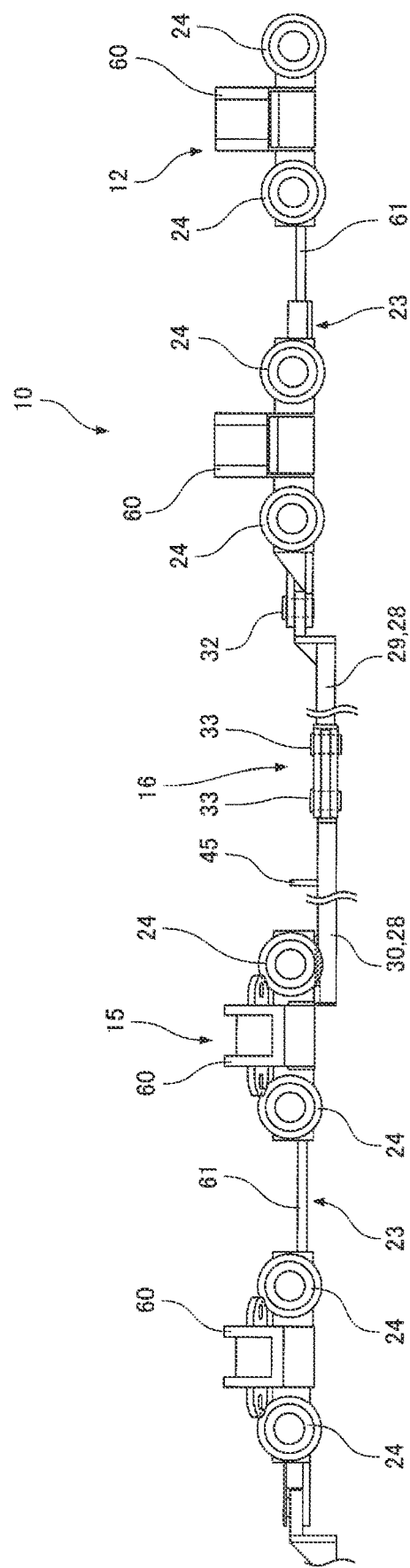
FIG. 3 is a side view illustrating the pipe transport device used for joining the pipes according to the first embodiment of the present invention.

The pipeline construction shaft 1 includes a pipe transport device 10 and an automotive vehicle 9, for example, a battery powered car for traveling the pipe transport device 10. As illustrated in FIGS. 1 to 3, the pipe transport device 10 includes a first transport trolley 12 for transporting a first pipe 11, a second transport trolley 15 for transporting a second pipe 14, and a coupling device 16 for coupling the first transport trolley 12 and the second transport trolley 15.

A pipe constituting the pipeline 2, a rearmost pipe 4 of the pipeline 2, the first pipe 11, and the second pipe 14 each have a spigot 19 on one end and a socket 20 on the other end. The automotive vehicle 9 is detachably coupled to the second transport trolley 15.

As illustrated in FIGS. 3 and 4 to 7, the first transport trolley 12 can travel on rails 17 in the pipeline construction shaft 1 and includes a trolley body 23, a plurality of traveling wheels 24 provided on the trolley body 23, a plurality of trolley jacks 25 (an example of a lifting device) for raising and lowering the first pipe 11 supported on the trolley body 23, and temporary placing plates 26 for temporarily placing the removed separate rails 18.

The trolley body 23 includes a pair of support frames 60 longitudinally supporting the first pipe 11 and a coupling frame 61 coupled between the support frames 60. The traveling wheels 24 can roll on the rails 17, the trolley jacks 25 are provided on the trolley body 23, and the temporary placing plates 26 are provided on both side ends of the trolley body 23.

As illustrated in FIGS. 1 to 3, 5, 6, and 8, the second transport trolley 15 is identical in configuration to the first transport trolley 12, and the second pipe 14 is supported on the trolley body 23. As illustrated in FIGS. 8 and 11 to 15, the trolley body 23 of the second transport trolley 15 has a coupling plate 27 on one end. The coupling plate 27 has a vertically penetrating engagement hole 31.

The coupling device 16 has a coupler 28 one end of which is attachable and detachable to and from the trolley body 23 of the first transport trolley 12 and the other end of which is attachable and detachable to and from the trolley body 23 of the second transport trolley 15. Furthermore, the coupler 28 can be divided into a first coupler 29 and a second coupler 30.

Figure 4:
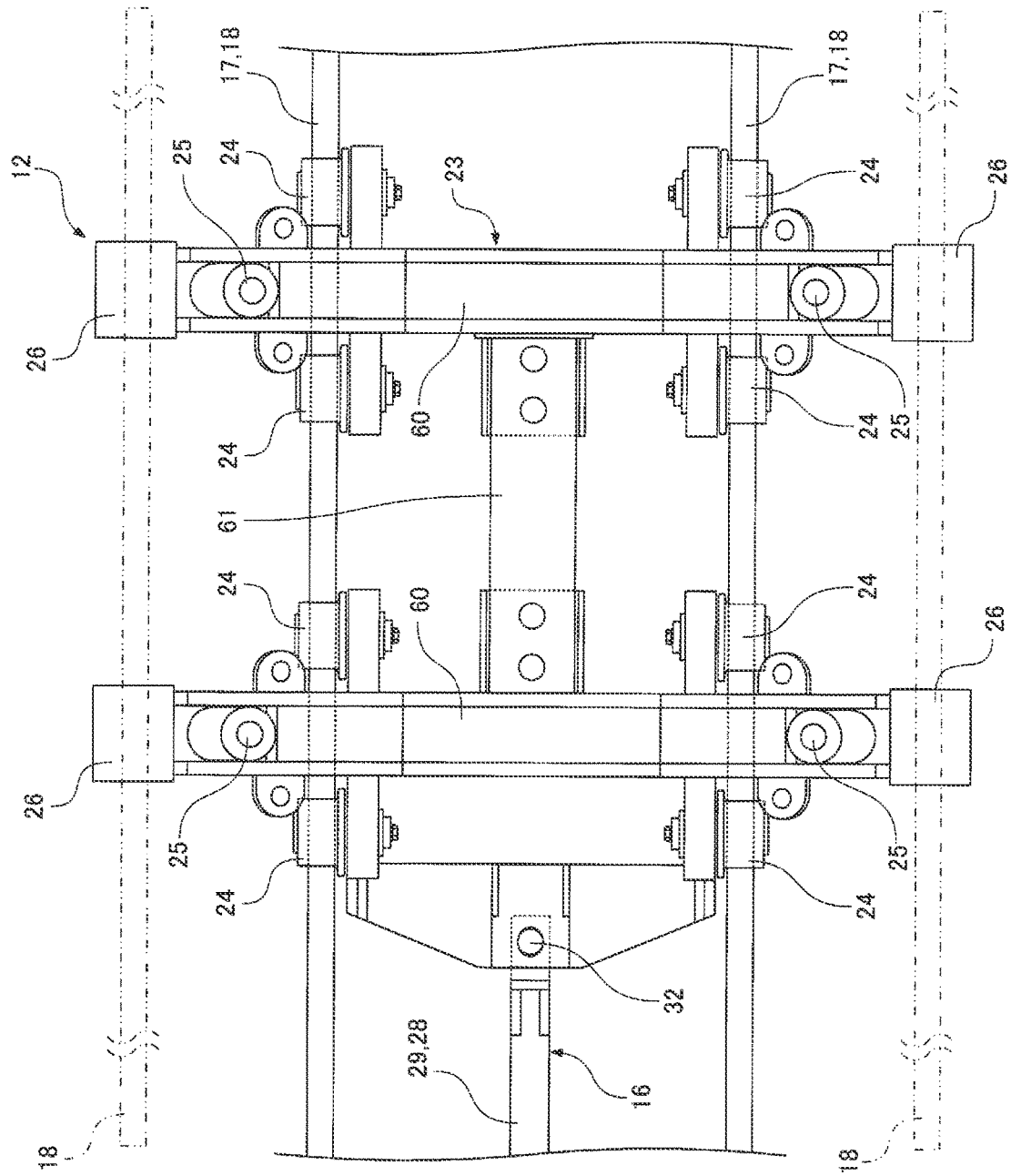
FIG. 4 is a plan view illustrating a first transport trolley for the pipe transport device used for joining the pipes according to the first embodiment of the present invention.
Figure 5:
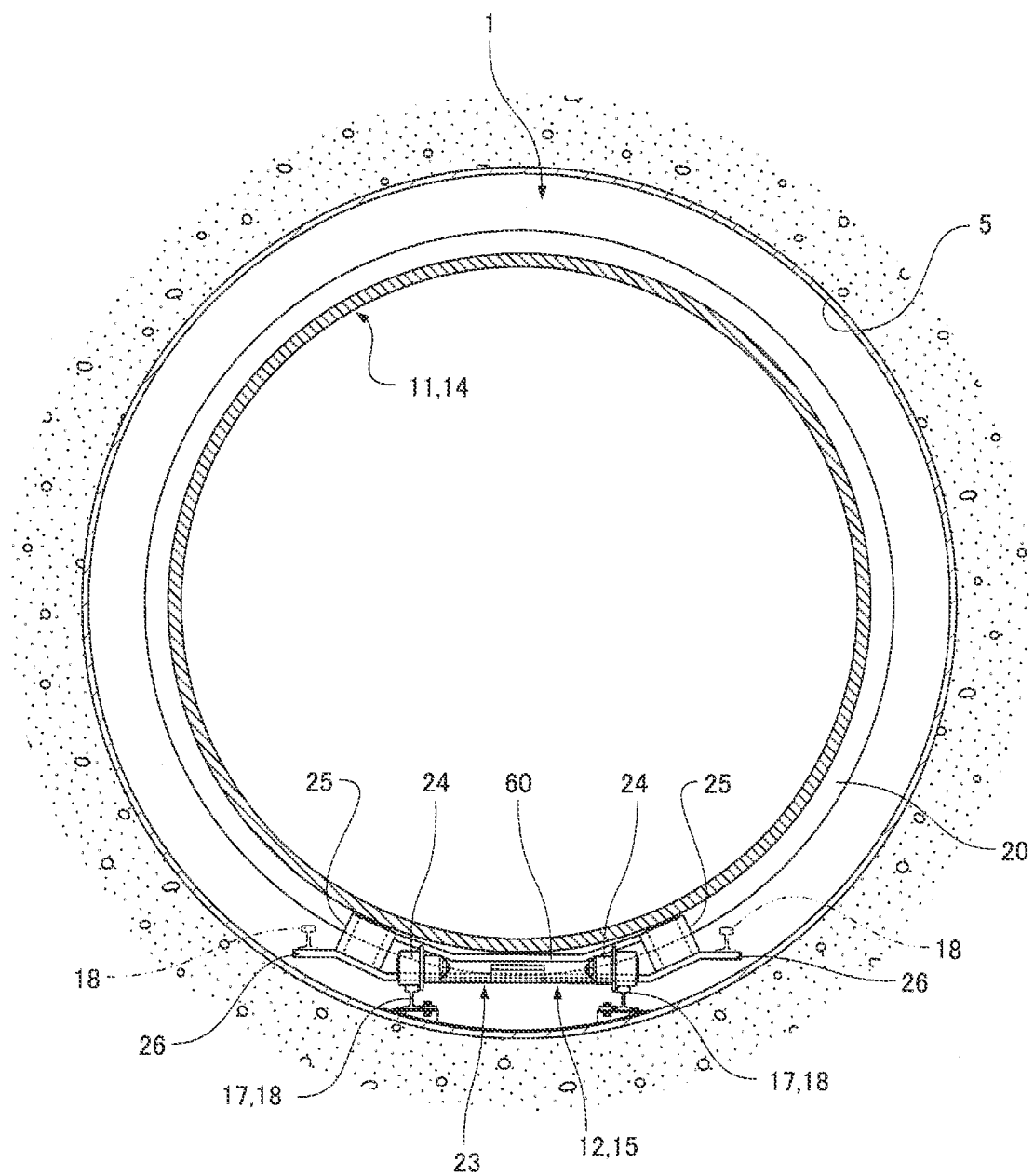
FIG. 5 is a cross-sectional view taken along line X-X of FIG. 1.
Figure 7:
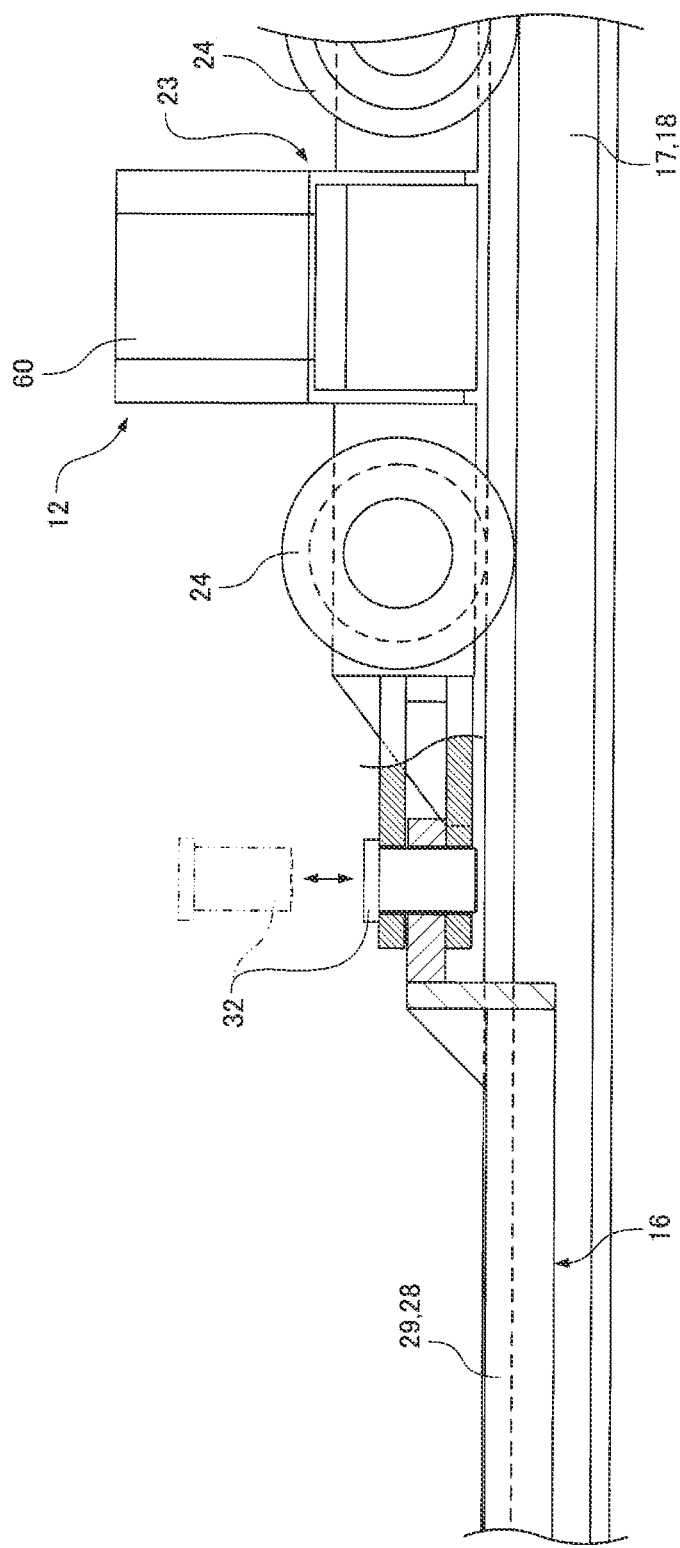
FIG. 7 is a cross-sectional view illustrating a coupling part between the first transport trolley and a first coupler of the pipe transport device used for joining the pipes according to the first embodiment of the present invention.
Figure 8:
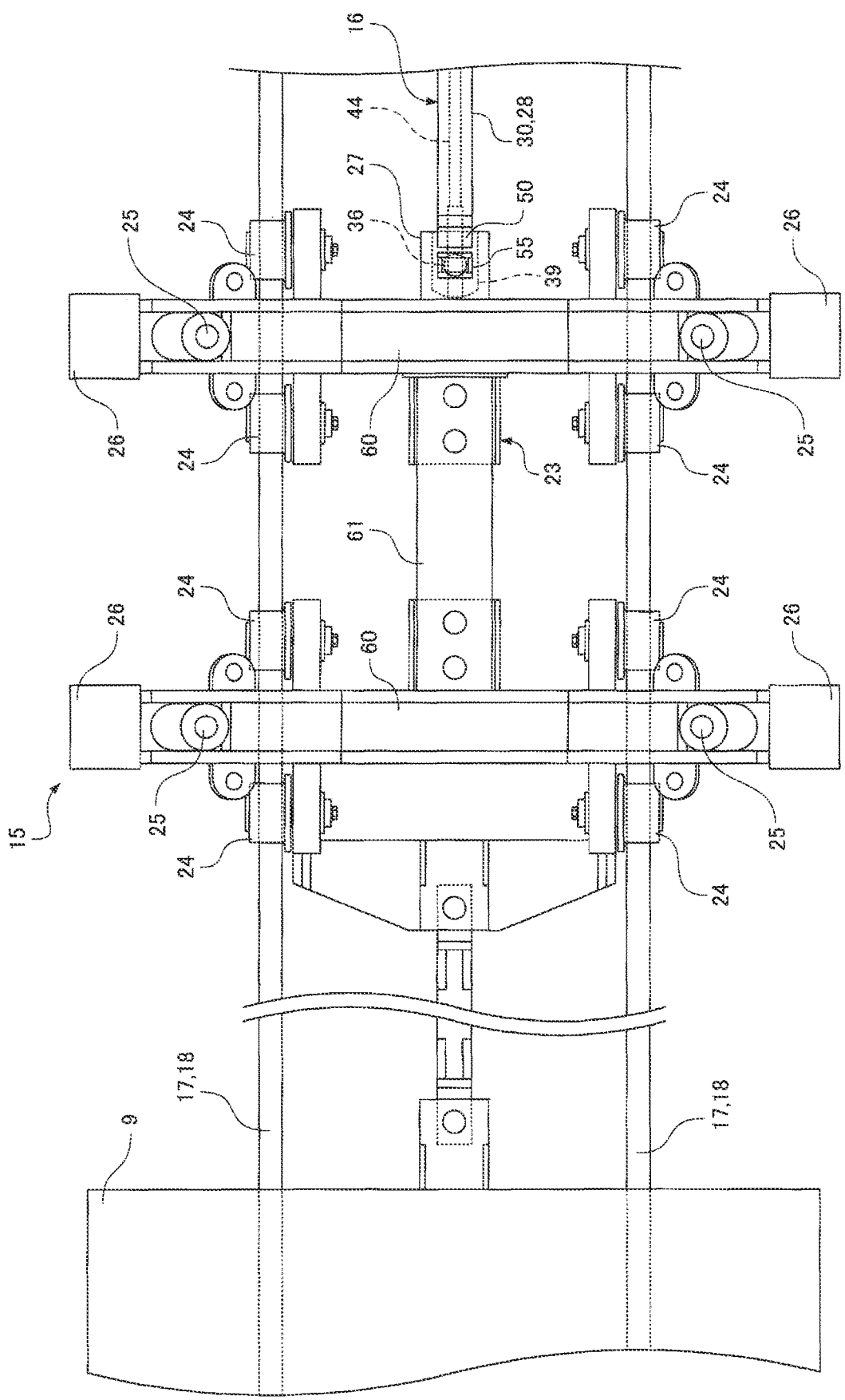
FIG. 8 is a plan view illustrating a second transport trolley for the pipe transport device used for joining the pipes according to the first embodiment of the present invention.
Figure 9:
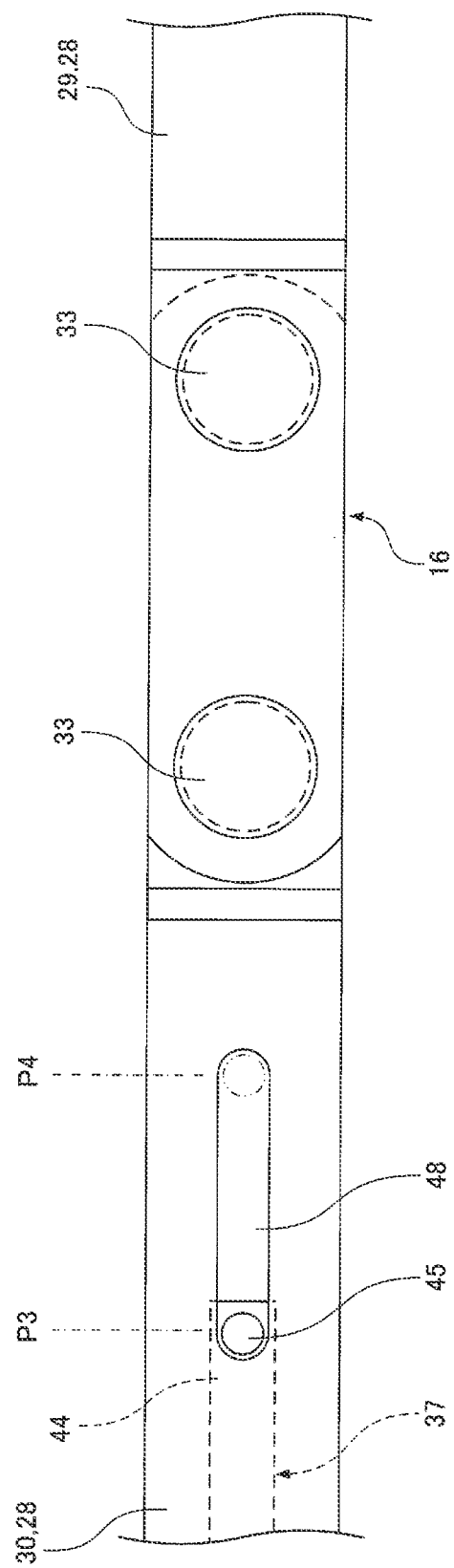
FIG. 9 is a plan view illustrating a coupling part between the first coupler and a second coupler of the pipe transport device used for joining the pipes according to the first embodiment of the present invention.
Figure 10:
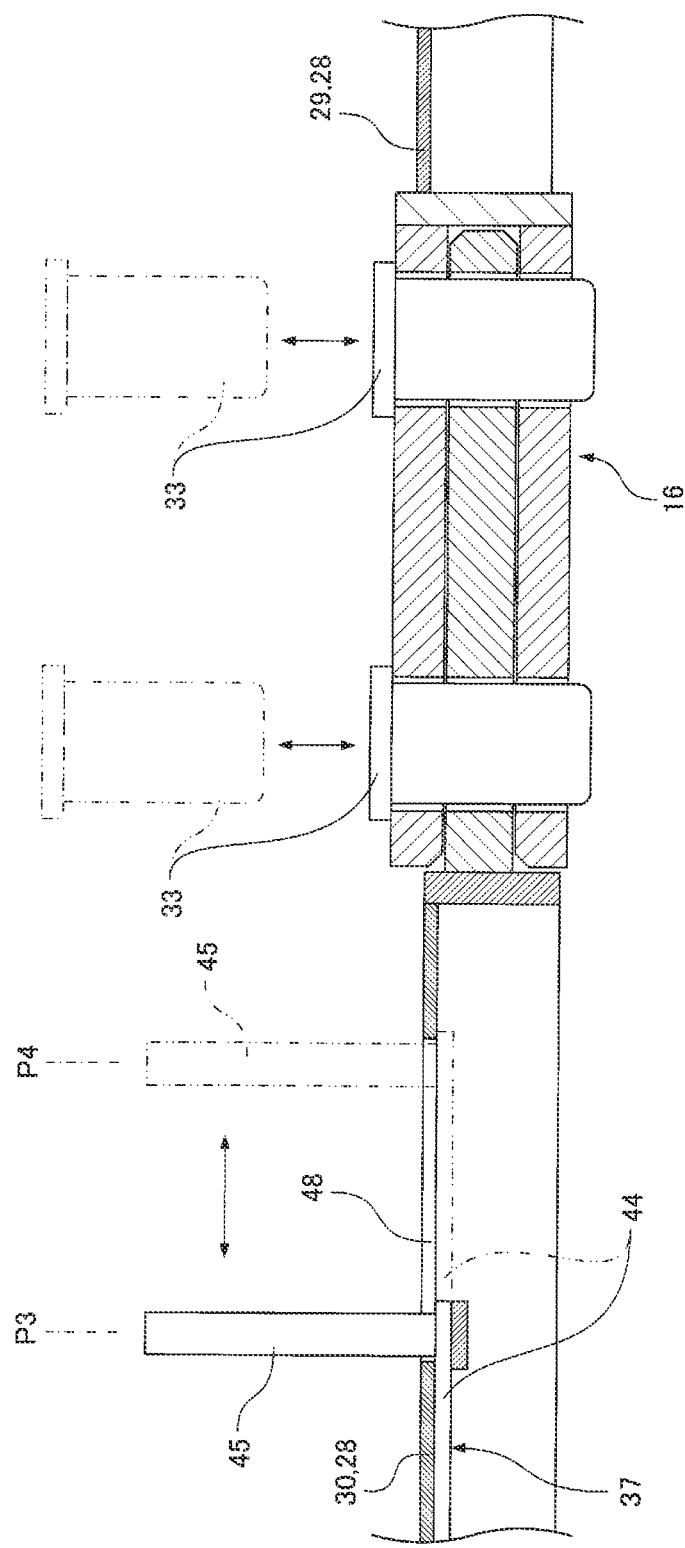
FIG. 10 is a cross-sectional view illustrating the coupling part between the first coupler and the second coupler of the pipe transport device used for joining the pipes according to the first embodiment of the present invention.

As illustrated in FIGS. 3, 4, and 7, one end of the first coupler 29 is detachably coupled to the trolley body 23 of the first transport trolley 12 via a first coupling pin 32. As illustrated in FIGS. 9 and 10, the other end of the first coupler 29 and one end of the second coupler 30 are detachably coupled to each other via a plurality of junction coupling pins 33.

As illustrated in FIGS. 11 to 15, the second coupler 30 is a channel-shaped member that is opened on the underside and has a support plate 39 on the top surface of the other end. The support plate 39 has a holding hole 40 vertically penetrating the second coupler 30.

The second coupler 30 includes an engagement pin 36 (an example of an engaging member) that can be engaged and disengaged into and from the second transport trolley 15 and a switching device 37 for switching the engagement pin 36 from an engaged state to a disengaged state.

Figure 11:
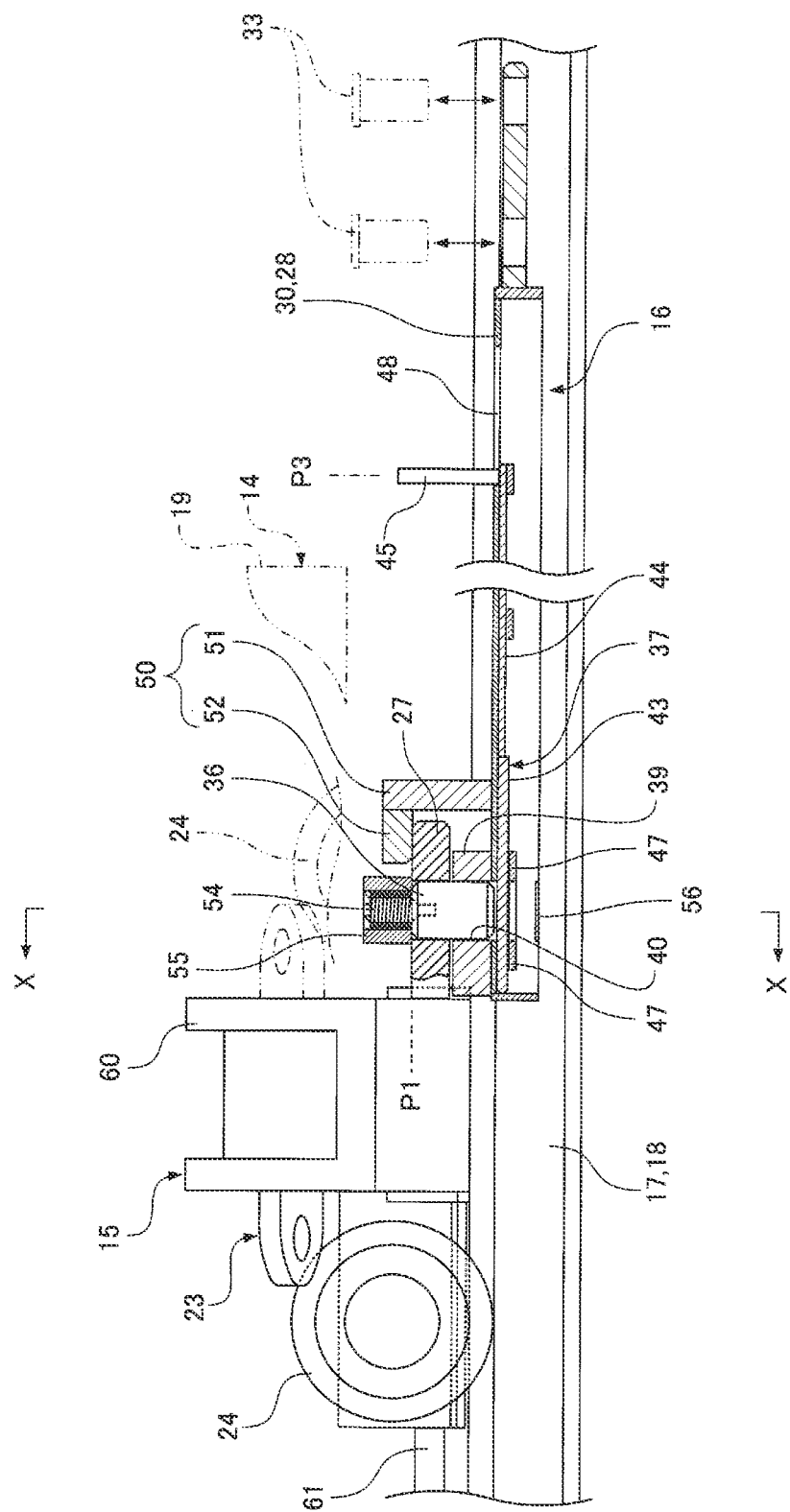
FIG. 11 is a cross-sectional view illustrating a coupling part between the second transport trolley and the second coupler of the pipe transport device and a switching device with an engagement pin switched to an engagement position used for joining the pipes according to the first embodiment of the present invention.
Figure 12:
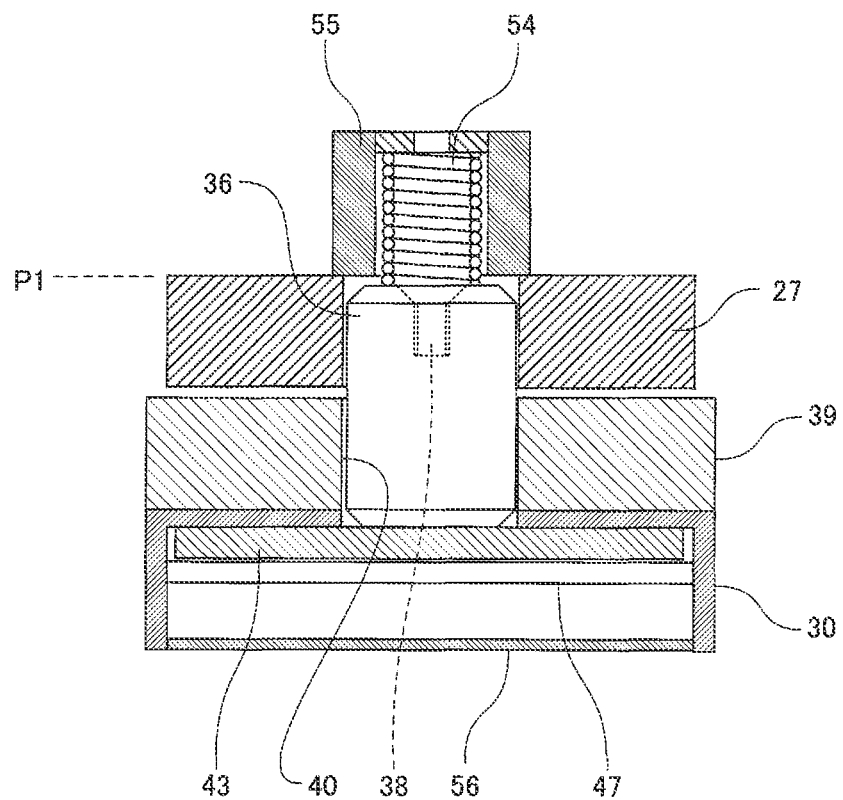
FIG. 12 is a cross-sectional view taken along line X-X of FIG. 11.
Figure 13:
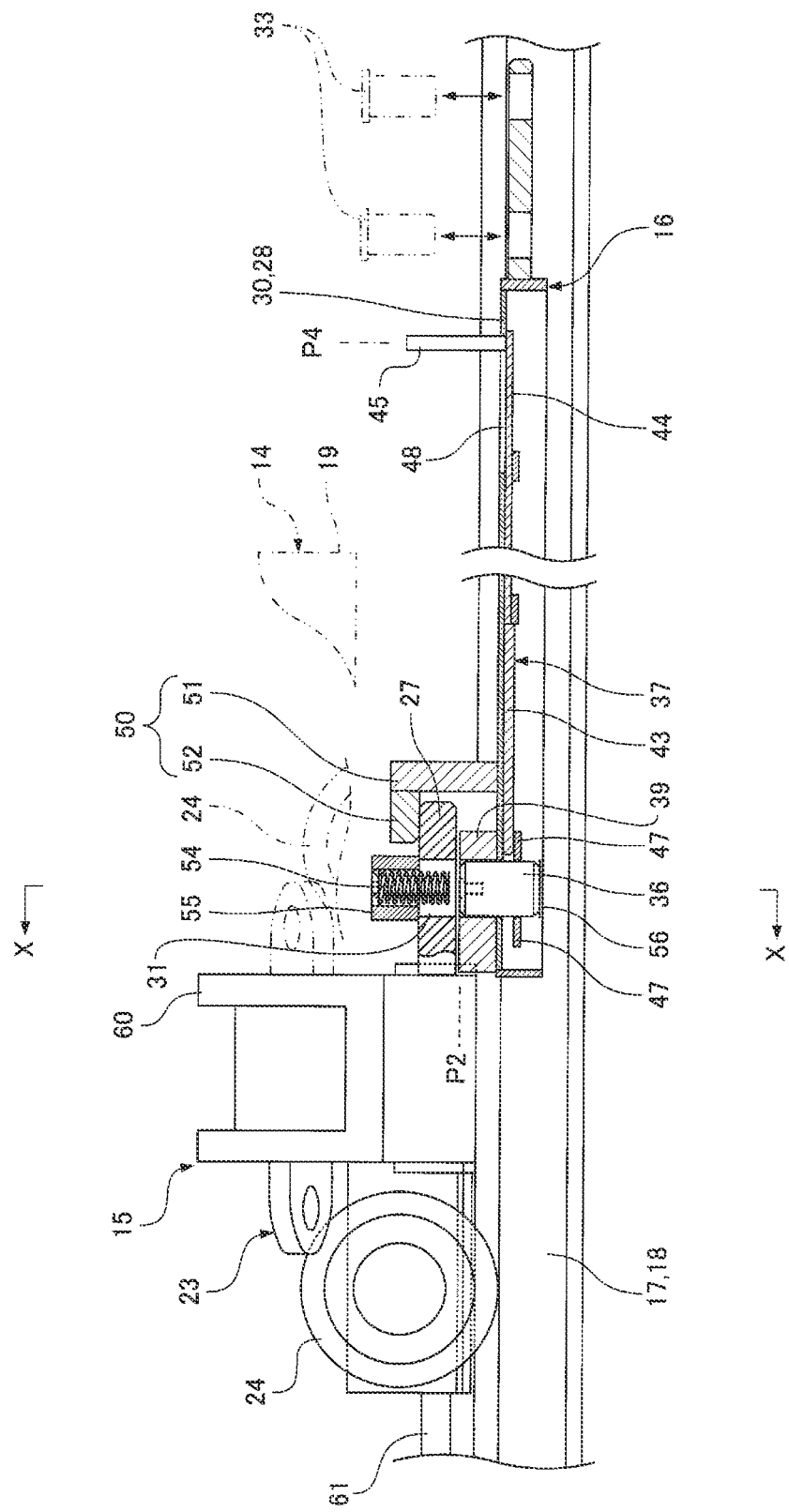
FIG. 13 is a cross-sectional view illustrating the coupling part between the second transport trolley and the second coupler of the pipe transport device and the switching device with the engagement pin switched to a disengagement position used for joining the pipes according to the first embodiment of the present invention.
Figure 14:
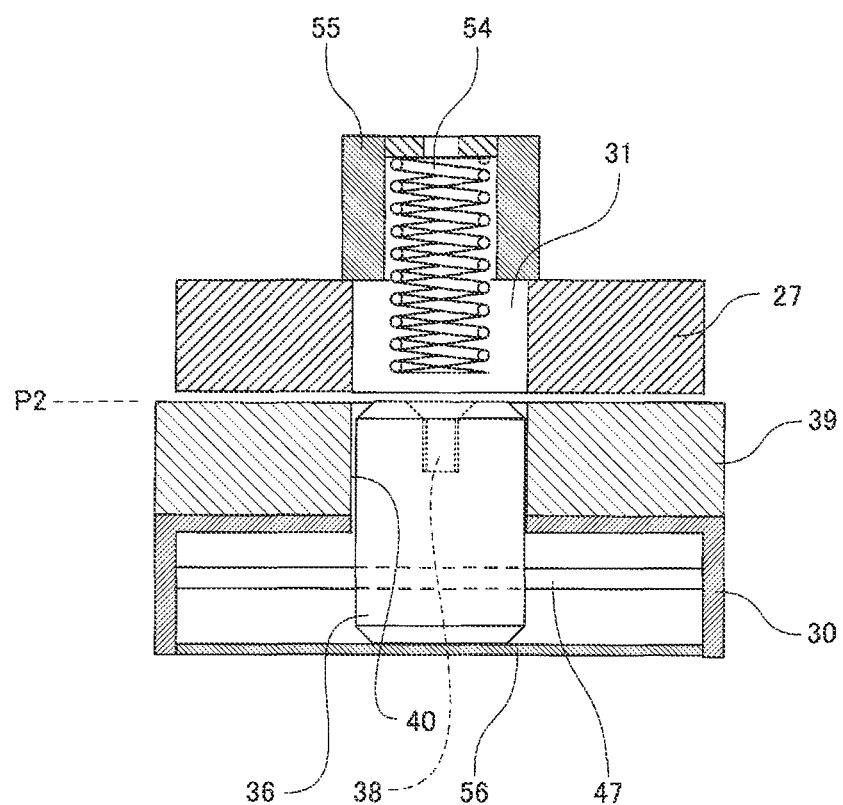
FIG. 14 is a cross-sectional view taken along line X-X of FIG. 13.

The engagement pin 36 is fit into the holding hole 40 of the second coupler 30 and can be engaged and disengaged into and from the coupling plate 27 of the second transport trolley 15. The engagement pin 36 can be switched between an engagement position P1 where the engagement pin 36 is placed into the engagement hole 31 from below and is engaged with the coupling plate 27 of the second transport trolley 15 as illustrated in FIGS. 11 and 12 and a disengagement position P2 where the engagement pin 36 is dropped below the engagement hole 31 from the engagement position P1 and is disengaged from the coupling plate 27 of the second transport trolley 15 as illustrated in FIGS. 13 and 14. The engaged state corresponds to a state in which the engagement pin 36 is switched to the engagement position P1, whereas the disengaged state corresponds to a state in which the engagement pin 36 is switched to the disengagement position P2.

The switching device 37 switches the engagement pin 36 from the engagement position P1 to the disengagement position P2 and includes a support plate 43 that supports the engagement pin 36 from below at the engagement position P1, a link rod 44 slidable in a pipe length direction A, and an operation lever 45 (an example of an operation part) for operating the switching device 37 from the outside.

The support plate 43 is supported by a support piece 47 inside the other end of the second coupler 30 and is slidable in the pipe length direction A. The link rod 44 is provided in the second coupler 30, the operation lever 45 is provided on one end of the link rod 44, and the support plate 43 is provided on the other end of the link rod 44.

Provided inside the other end of the second coupler 30 is a receiving plate 56 that receives the engagement pin 36 from below after the engagement pin 36 is dropped from the engagement position P1 to the disengagement position P2.

As illustrated in FIGS. 9, 10, 11, and 13, one end of the second coupler 30 has a long hole 48 that penetrates vertically and extends in the pipe length direction A. The operation lever 45 is inserted into the long hole 48 from the inside of the second coupler 30, is protruded above the second coupler 30, and is exposed into a space 57 formed between the first pipe 11 loaded on the first transport trolley 12 and the second pipe 14 loaded on the second transport trolley 15.

Figure 15:
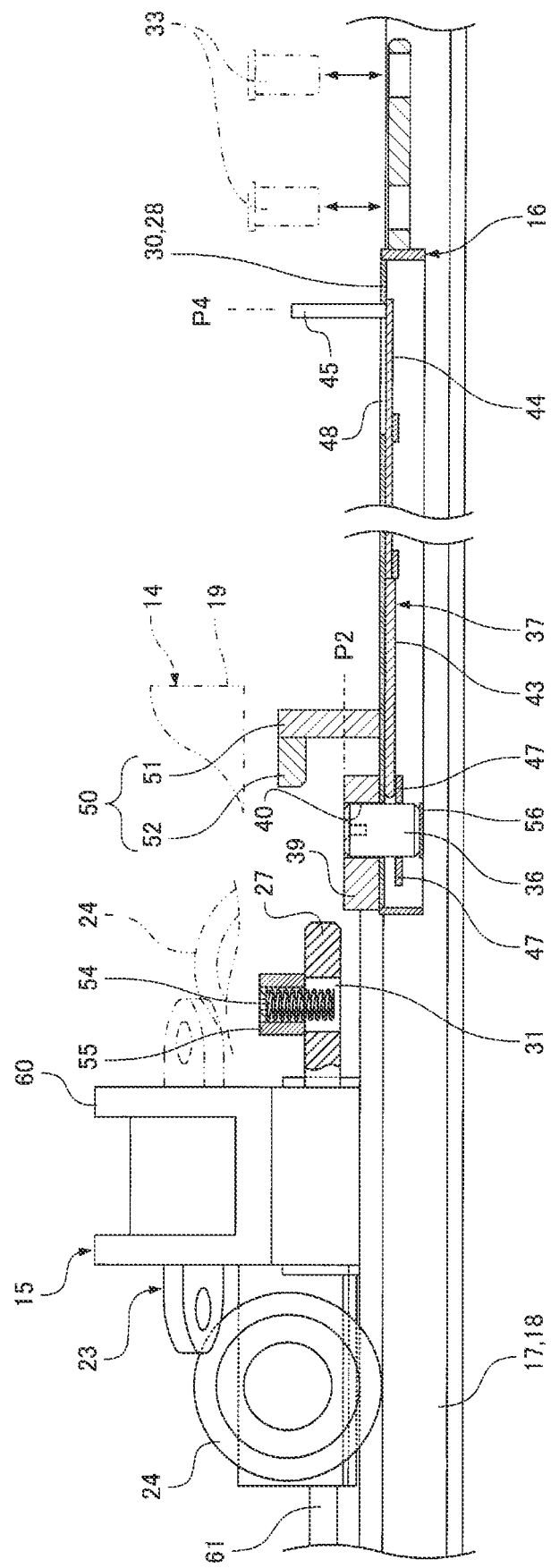
FIG. 15 is a cross-sectional view illustrating the coupling part between the second transport trolley and the second coupler of the pipe transport device and the switching device while the second transport trolley and the second coupler are separated from each other used for joining the pipes according to the first embodiment of the present invention.

As illustrated in FIGS. 11, 13, and 15, the other end of the second coupler 30 has a drop preventing member 50. The drop preventing member 50 is a member for preventing the second coupler 30 from dropping by its own weight (and the weight of the engagement pin 36 and the urging force of a coil spring 54, which will be discussed later) when the engagement pin 36 is engaged with the coupling plate 27 of the second transport trolley 15. The drop preventing member 50 is inverted-L-shaped with a vertical plate 51 raised on the top surface of the second coupler 30 and a horizontal plate 52 provided on the upper end of the vertical plate 51.

As illustrated in FIG. 11, when the other end of the second coupler 30 and the second transport trolley 15 are coupled to each other, the coupling plate 27 of the second transport trolley 15 is held between the support plate 39 of the second coupler 30 and the horizontal plate 52 of the drop preventing member 50, and the horizontal plate 52 is engaged with the coupling plate 27 from above.

When the other end of the second coupler 30 and the second transport trolley 15 are coupled to each other, the horizontal plate 52 is engaged with the coupling plate 27 from above, so that the other end of the second coupler 30 can be provisionally (temporarily) laid on the coupling plate 27. Thus, also when the other end of the second coupler 30 and the second transport trolley 15 are coupled to each other, the second coupler 30 can be prevented from dropping by its own weight, facilitating the coupling operation.

The coupling plate 27 of the second transport trolley 15 is provided with the coil spring 54 (an example of an urging member) that urges the engagement pin 36 from the engagement position P1 to the disengagement position P2. The coil spring 54 is stored in a box-shaped storage member 55 provided on the top surface of the coupling plate 27. At the top of the engagement pin 36, a lifting internal thread portion 38 is formed for lifting the engagement pin 36 switched to the disengagement position P2 and setting the engagement pin 36 to the engagement position P1.

With the switching device 37 thus configured, as illustrated in FIGS. 11 and 12, the engagement pin 36 switched to the engagement position P1 is protruded into the engagement hole 31 and is engaged with the coupling plate 27 while being supported on the support plate 43. This couples the second coupler 30 and the second transport trolley 15 via the engagement pin 36 and the coupling plate 27. At this point, the coil spring 54 is compressed with the operation lever 45 switched to a coupling position P3.

Thereafter, as illustrated in FIGS. 13 and 14, the operation lever 45 is separated from the coupling position P3 and is switched to a separating position P4, causing the link rod 44 to slide in the pipe length direction A in synchronization with the operation lever 45 and the support plate 43 to retract forward from below the engagement pin 36. With this configuration, the engagement pin 36 is dropped, is switched from the engagement position P1 to the disengagement position P2, and is received by the receiving plate 56. Thus, the engagement pin 36 is dropped below the engagement hole 31 and is separated from the coupling plate 27, thereby decoupling the second coupler 30 from the second transport trolley 15 as illustrated in FIG. 15.

At this point, the engagement pin 36 is urged from the engagement position P1 to the disengagement position P2 by the coil spring 54 and thus can be securely switched to the disengagement position P2.

Figure 16:
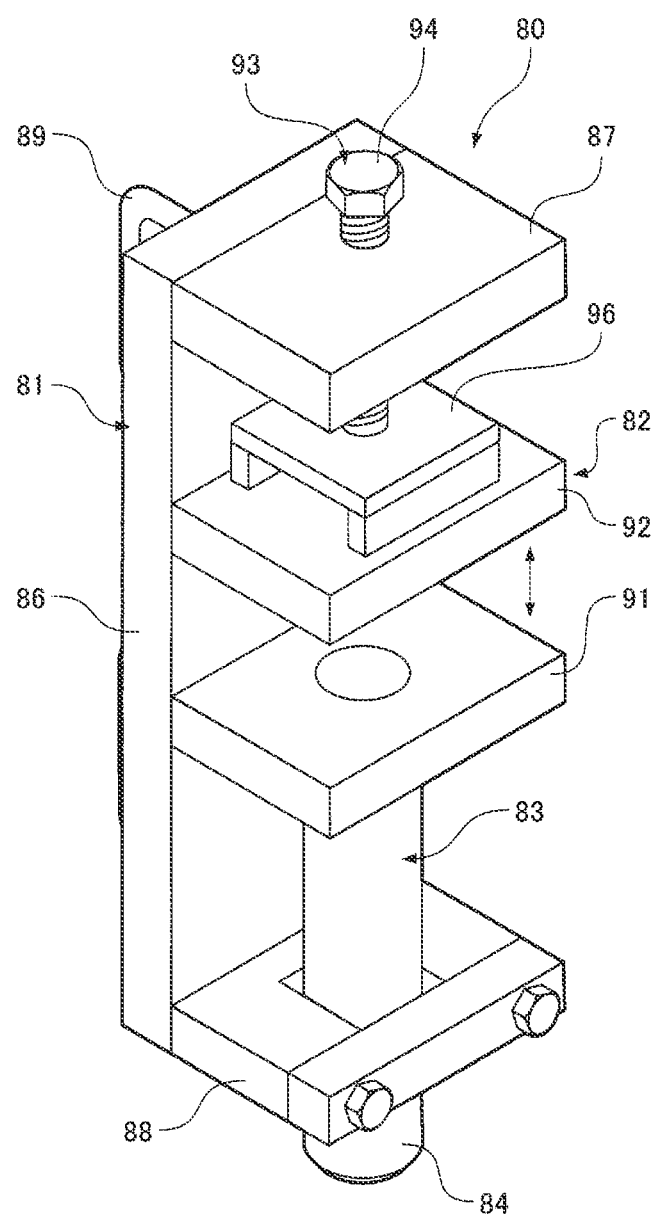
FIG. 16 is a perspective view illustrating a lifting jig used for joining the pipes used for joining the pipes according to the first embodiment of the present invention.
Figure 17:
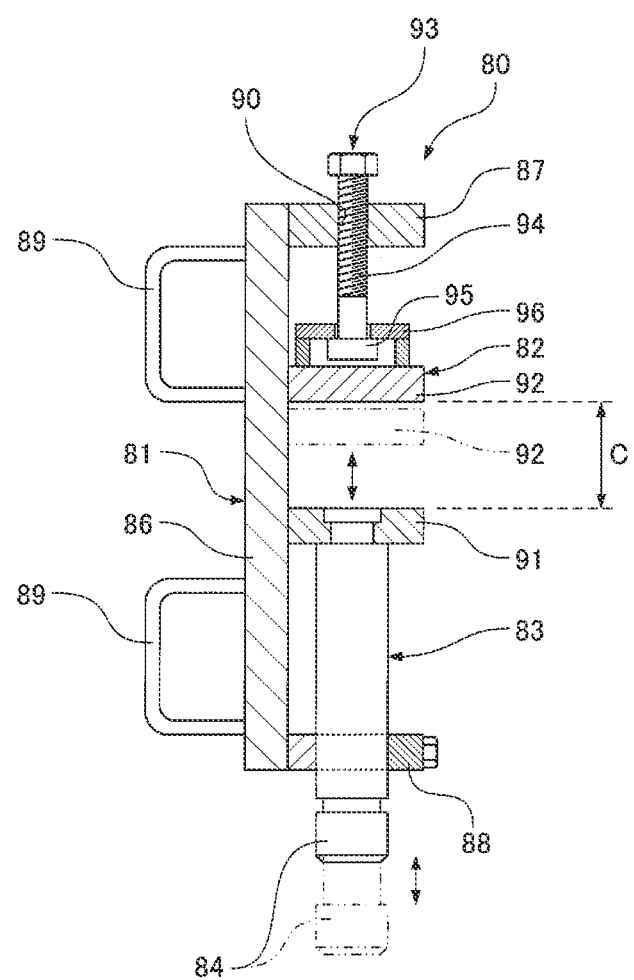
FIG. 17 is a cross-sectional view illustrating the lifting jig used for joining the pipes used for joining the pipes according to the first embodiment of the present invention.
Figure 18:
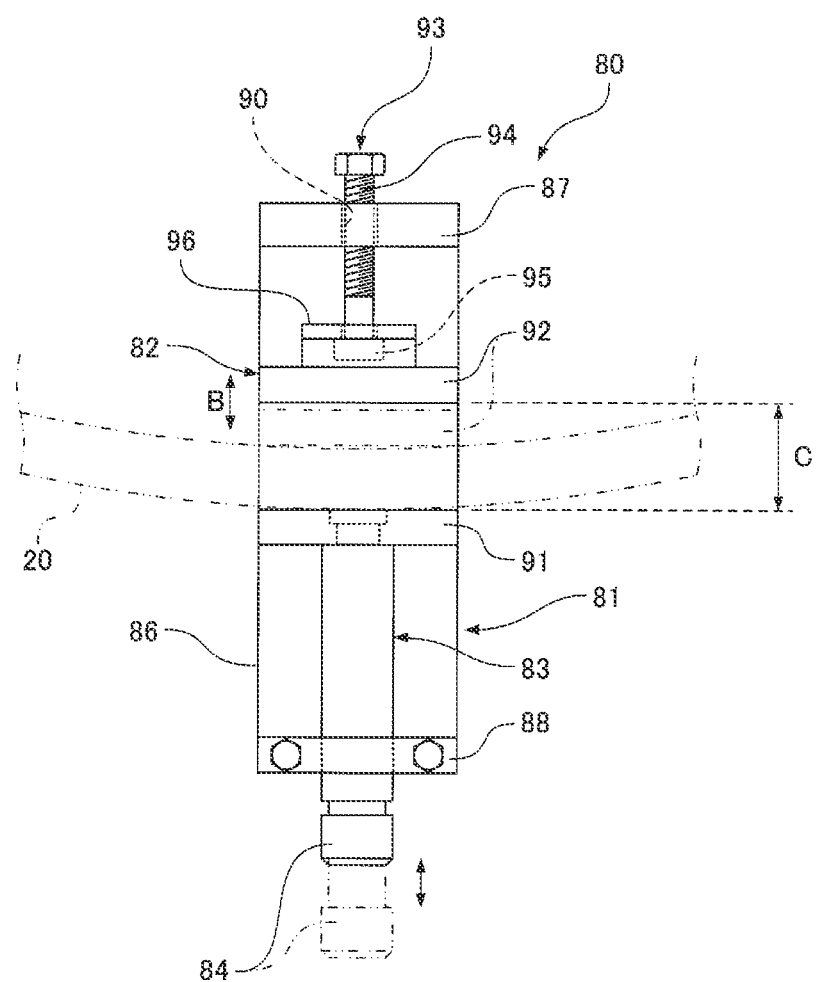
FIG. 18 is a front view illustrating the lifting jig used for joining the pipes used for joining the pipes according to the first embodiment of the present invention.

As illustrated in FIGS. 16 to 18, reference numeral 80 denotes a lifting jig for lifting the pipe in the pipeline construction shaft 1. The lifting jig 80 includes a jig frame 81, a holding mechanism 82 that holds the opening end of the socket 20 of the first pipe 11 in a pipe diameter direction B, and a hydraulic jack 83.

The jig frame 81 has a backplate part 86 and an inner plate part 87 and an outer plate part 88 that are provided on both ends of the backplate part 86. The backplate part 86 has handles 89.

The holding mechanism 82 has a pair of a fixed plate 91 and a movable plate 92 that are opposed to each other in the pipe diameter direction B, and a moving member 93 that moves the movable plate 92 relative to the fixed plate 91. The fixed plate 91 is fixed to the backplate part 86. The jack 83 has an extendable ram 84 that is attached to the fixed plate 91 and penetrates the outer plate part 88.

The moving member 93 has a bolt body 94 with an external thread on the outer surface, and an engagement piece 95 provided on the head of the bolt body 94. The inner plate part 87 has a screw hole 90 that is internally threaded. The bolt body 94 of the moving member 93 is rotatably inserted into the screw hole 90 with the external thread and the internal thread screwed to each other. The movable plate 92 includes an engagement member 96 on the top surface. The engagement piece 95 has a larger diameter than the bolt body 94. The engagement piece 95 and the engagement member 96 are engaged with each other.

As indicated by a virtual line in FIG. 18, the lifting jig 80 thus configured holds the opening end of the socket 20 between the fixed plate 91 and the movable plate 92 and rotates the moving member 93 in one direction to bring the movable plate 92 close to the fixed plate 91. With this configuration, a clearance C between the fixed plate 91 and the movable plate 92 in the pipe diameter direction B is reduced, the opening end of the socket 20 is sandwiched between the fixed plate 91 and the movable plate 92, and the lifting jig 80 is attached to the opening end of the socket 20.

Figure 19:
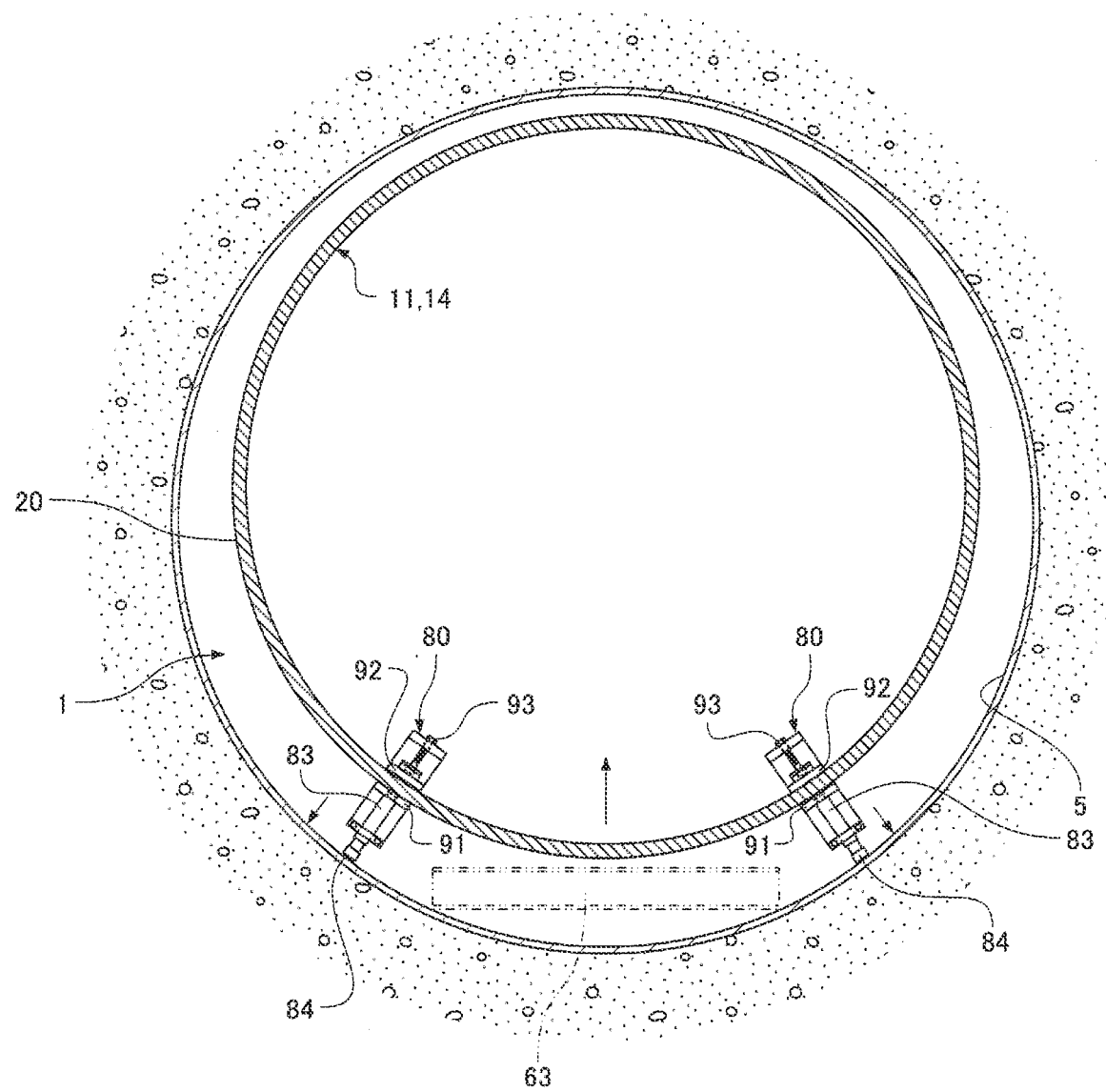
FIG. 19 illustrates a pipe socket lifted by using the lifting jigs used for joining the pipes according to the first embodiment of the present invention.

In this way, as illustrated in FIG. 19, the two lifting jigs 80 are attached to the lower part of the opening end of the socket 20, and the rams 84 of the jacks 83 of the lifting jigs 80 are extended so as to press the heads of the rams 84 to an inner wall 5 of the pipeline construction shaft 1. Thus, the socket 20 of the first pipe 11 is lifted.

The moving member 93 is reversely turned to move the movable plate 92 away from the fixed plate 91, thereby increasing the clearance C between the fixed plate 91 and the movable plate 92 in the pipe diameter direction B. Thus, the lifting jig 80 can be removed from the opening end of the socket 20.

Likewise, the socket 20 of the second pipe 14 can be lifted or the spigot 19 can be lifted by using the lifting jigs 80.

A joining method for joining pipes by using the pipe transport device 10 and the lifting jigs 80 in the pipeline construction shaft 1 will be described below.

As illustrated in FIG. 20, the first pipe 11 is loaded on the trolley body 23 of the first transport trolley 12 of the pipe transport device 10, the second pipe 14 is loaded on the trolley body 23 of the second transport trolley 15, and the automotive vehicle 9 is caused to travel forward to press the pipe transport device 10 forward. Thus, the first transport trolley 12 and the second transport trolley 15 are moved forward to transport the first pipe 11 and the second pipe 14, so that the spigot 19 (one end) of the first pipe 11 is inserted into the socket 20 (the other end) of the rearmost pipe 4 of the pipeline 2 and is joined thereto.

At this point, the coupler 28 is hidden under the first and second pipes 11 and 14. Moreover, the trolley jacks 25 of the first transport trolley 12 vertically adjust the position of the first pipe 11, thereby centering the pipes being joined to each other.

Figure 21:
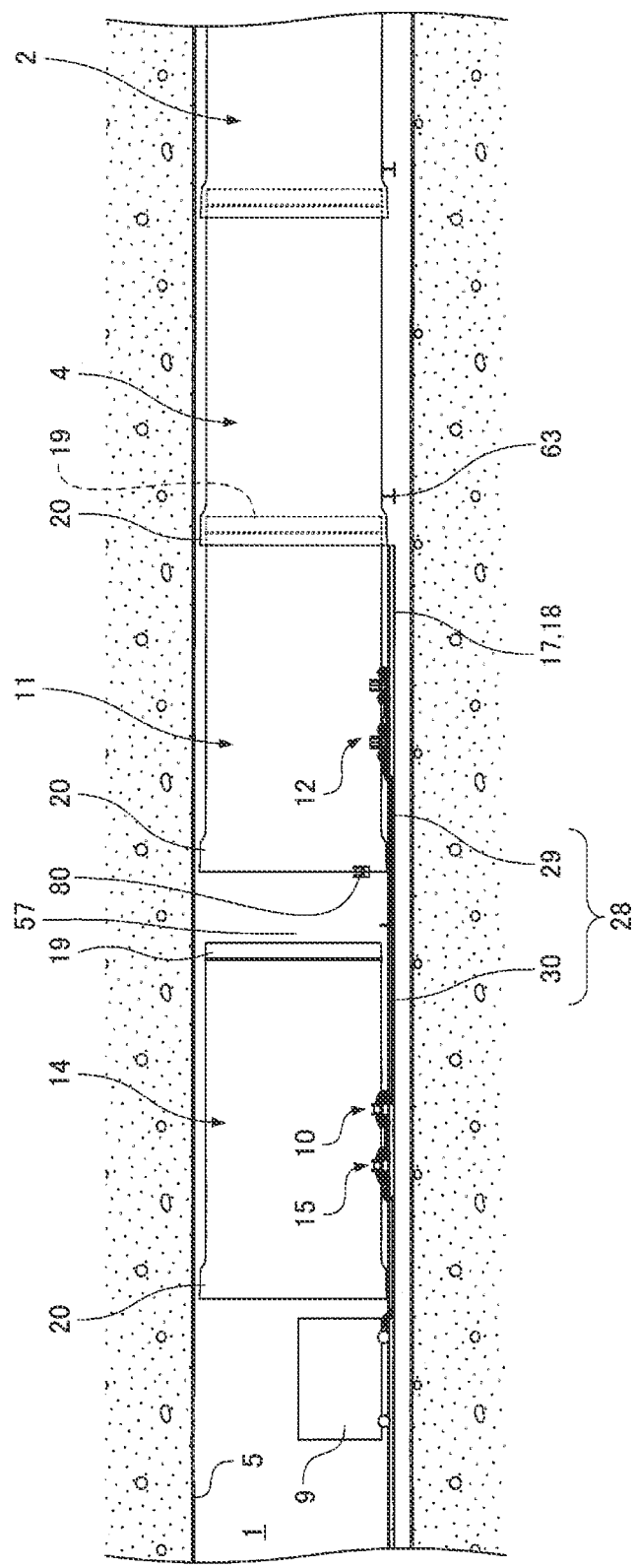
FIG. 21 illustrates the pipe joining method used for joining the pipes according to the first embodiment of the present invention.
Figure 22:
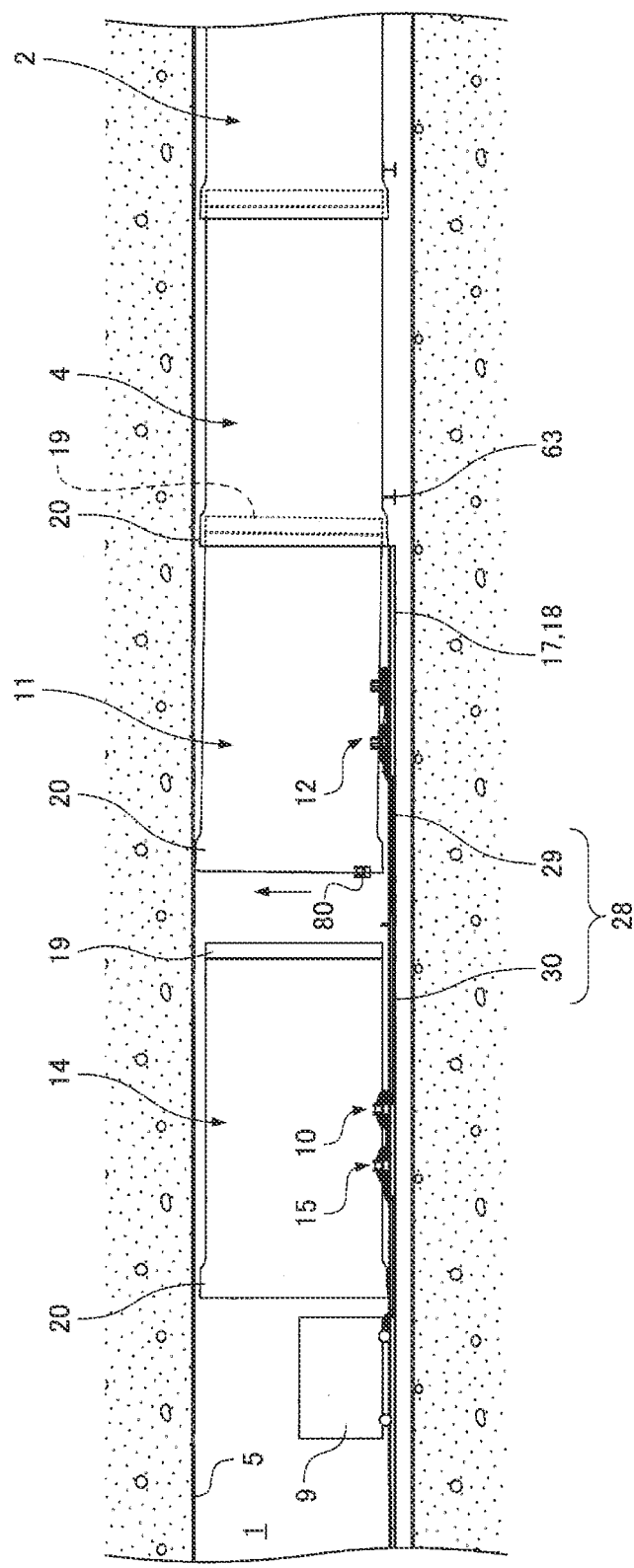
FIG. 22 illustrates the pipe joining method used for joining the pipes according to the first embodiment of the present invention.

Subsequently, as illustrated in FIGS. 19, 21, and 22, the two lifting jigs 80 are attached to the lower part of the opening end of the socket 20 of the first pipe 11, and the rams 84 of the jacks 83 of the lifting jigs 80 are extended to lift the socket 20 (the other end) of the first pipe 11. Thus, the first pipe 11 is lifted above the first transport trolley 12.

Figure 23:
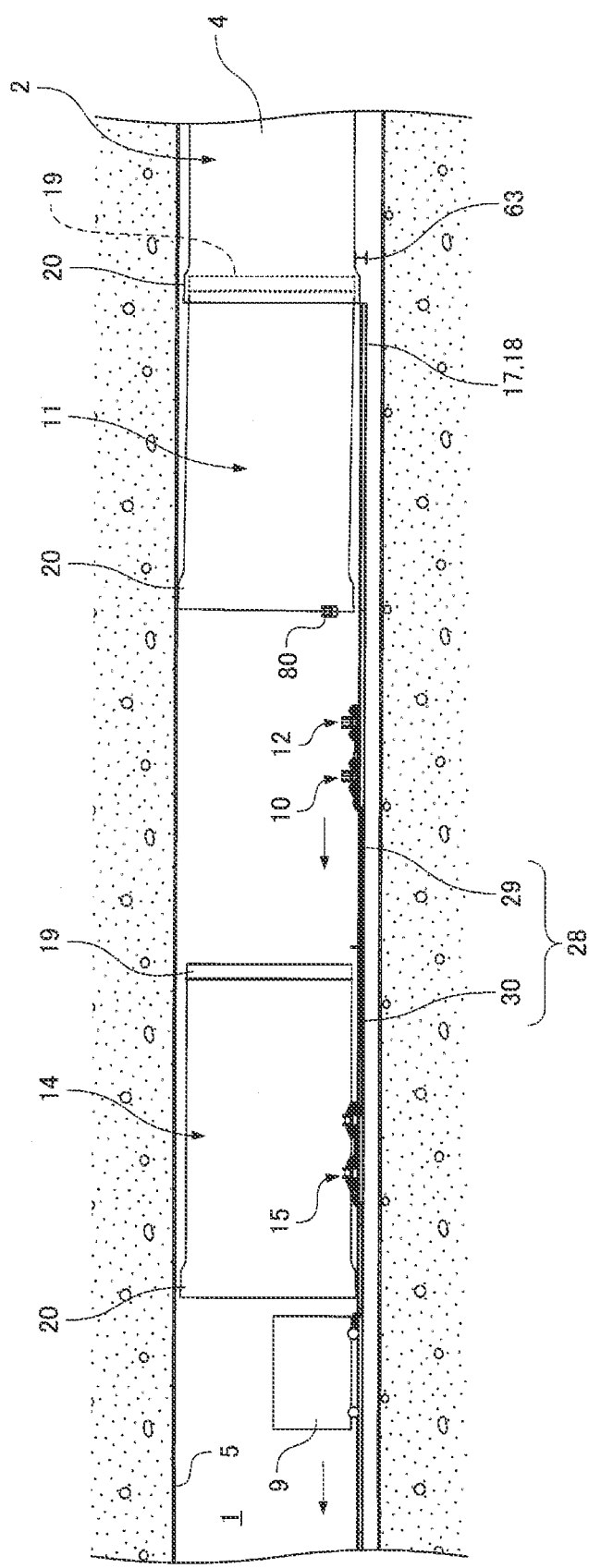
FIG. 23 illustrates the pipe joining method used for joining the pipes according to the first embodiment of the present invention.

After that, as illustrated in FIG. 23, the automotive vehicle 9 is caused to travel backward to move the pipe transport device 10 rearward, and the first transport trolley 12 is drawn from beneath the first pipe 11 to the near side of the first pipe 11.

Subsequently, as indicated by virtual lines in FIG. 6 and FIG. 24, the separate rails 18 of the rails 17 under the first pipe 11 are removed and are loaded on the temporary placing plates 26 of the first transport trolley 12.

Figure 25:
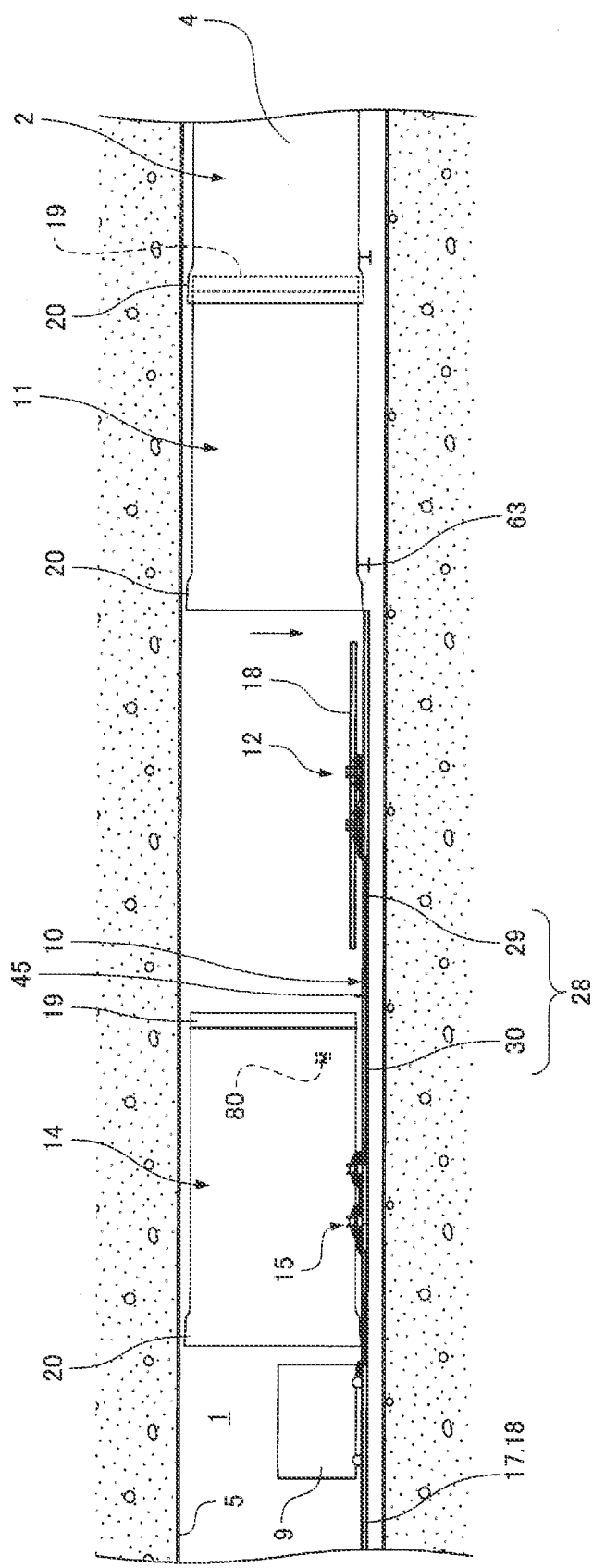
FIG. 25 illustrates the pipe joining method used for joining the pipes according to the first embodiment of the present invention.

Thereafter, as illustrated in FIG. 25, an H-shaped steel support member 63 is installed under the socket-side end of the first pipe 11. The rams 84 of the jacks 83 of the lifting jigs 80 are retracted to lower the socket-side end (the other end) of the first pipe 11 onto the support member 63, so that the socket-side end of the first pipe 11 is supported by the support member 63. Thereafter, the two lifting jigs 80 are removed from the opening end of the socket 20 of the first pipe 11 and are transferred into the second pipe 14 so as to be temporarily stored therein. As has been discussed, the socket-side end of the first pipe 11 is supported by the support member 63, thereby preventing the socket-side end of the first pipe 11 from being displaced downward.

Figure 26:
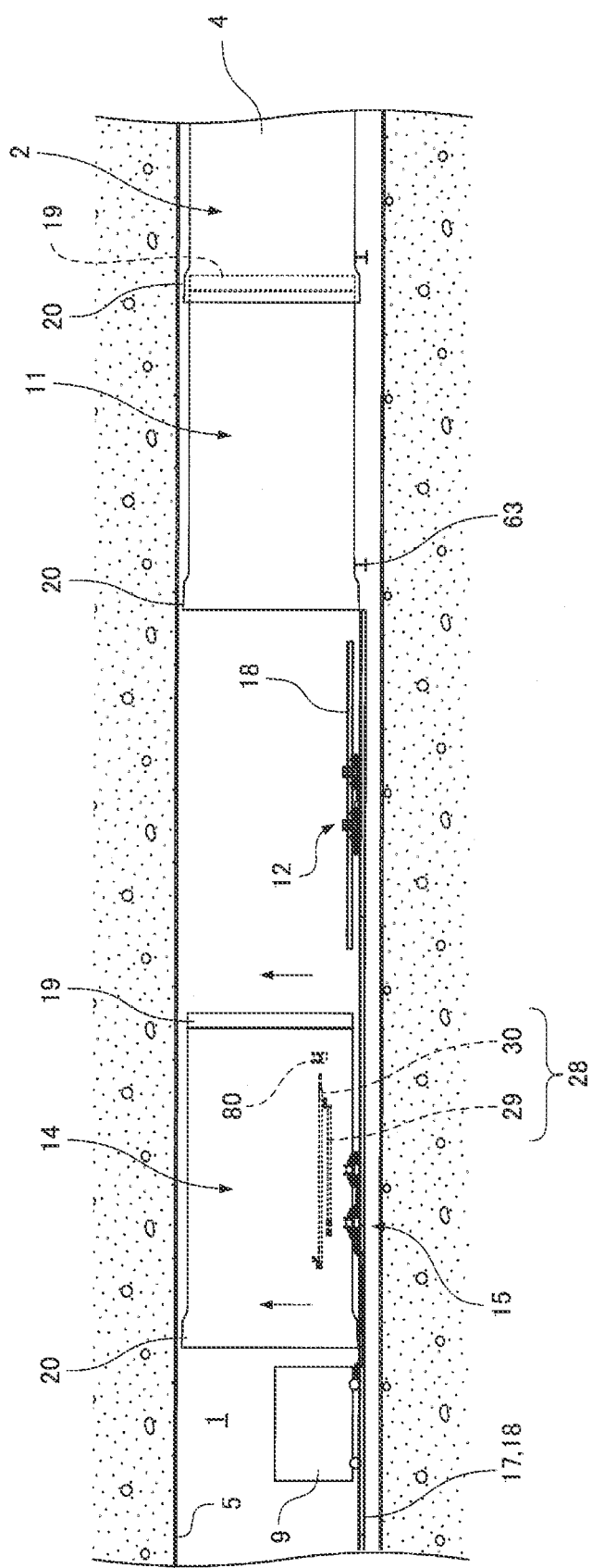
FIG. 26 illustrates the pipe joining method used for joining the pipes according to the first embodiment of the present invention.

After that, as illustrated in FIG. 26, the coupler 28 is removed to separate the first transport trolley 12 and the second transport trolley 15. Specifically, the first coupling pin 32 is removed to decouple the first coupler 29 and the first transport trolley 12 as indicated by virtual lines in FIG. 7, and the junction coupling pins 33 are removed to decouple the first coupler 29 and the second coupler 30 as indicated by virtual lines in FIG. 10, so that the first coupler 29 between the first transport trolley 12 and the second coupler 30 is removed. With this configuration, the first coupling pin 32 can be removed to separate the first coupler 29 and the first transport trolley 12 without interfering with the first pipe 11.

Thereafter, as illustrated in FIGS. 13 and 14, the operation lever 45 is operated for switching from the coupling position P3 to the separating position P4. This can switch the engagement pin 36 from the engagement position P1 to the disengagement position P2 and disengage the second coupler 30 from the second transport trolley 15 by a remote operation. As illustrated in FIG. 15, the second coupler 30 is removed from the second transport trolley 15, and the coupler 28 between the first transport trolley 12 and the second transport trolley 15 is removed, thereby separating the first transport trolley 12 and the second transport trolley 15.

As illustrated in FIG. 13, such an operation by the operation lever 45 can be performed at a point remote from the engagement pin 36, that is, a vacant space in front of the spigot 19 of the second pipe 14, thereby switching the engagement pin 36 from the engagement position P1 to the disengagement position P2 by a remote operation. Hence, when the engagement pin 36 is switched from the engagement position P1 to the disengagement position P2, the second pipe 14 on the second transport trolley 15 does not interfere with the switching.

Thus, even if a small space is formed under the second pipe 14 loaded on the second transport trolley 15, the other end of the coupler 28 and the second transport trolley 15 can be easily disengaged from each other by operating the operation lever 45. This can reduce time and effort to remove the coupler 28 to separate the first transport trolley 12 and the second transport trolley 15.

The first coupler 29 and the second coupler 30 that have been thus removed are transferred into the second pipe 14 and are temporarily stored therein as illustrated in FIG. 26. Furthermore, the second pipe 14 loaded on the second transport trolley 15 is lifted by the trolley jacks 25.

Figure 27:
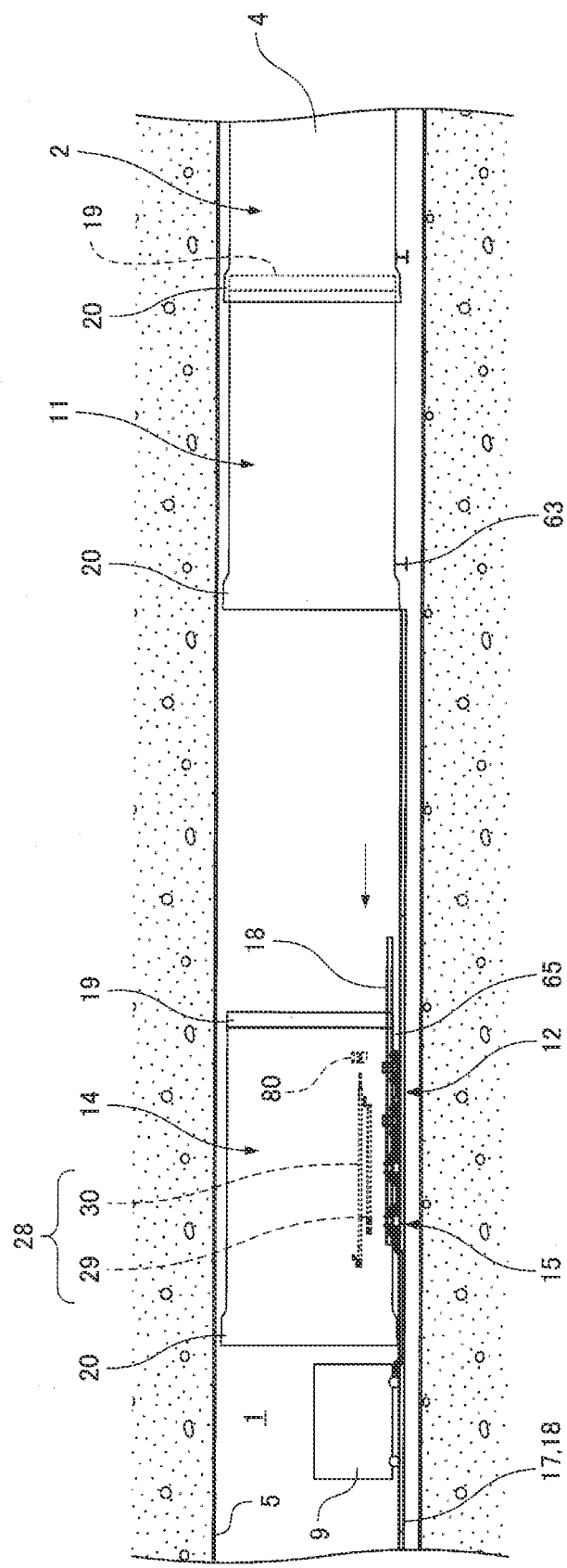
FIG. 27 illustrates the pipe joining method used for joining the pipes according to the first embodiment of the present invention.

After that, as illustrated in FIG. 27, the first transport trolley 12 is pressed to move backward and is drawn below the second pipe 14 on the second transport trolley 15. This draws the first transport trolley 12 below the second pipe 14 along with the separate rails 18 removed to be loaded on the temporary placing plates 26.

A space under the second pipe 14 is extended upward by lifting the second pipe 14 on the second transport trolley 15 by using the trolley jacks 25, thereby obtaining a space 65 under the second pipe 14 so as to draw the first transport trolley 12 below the second pipe 14.

Figure 28:
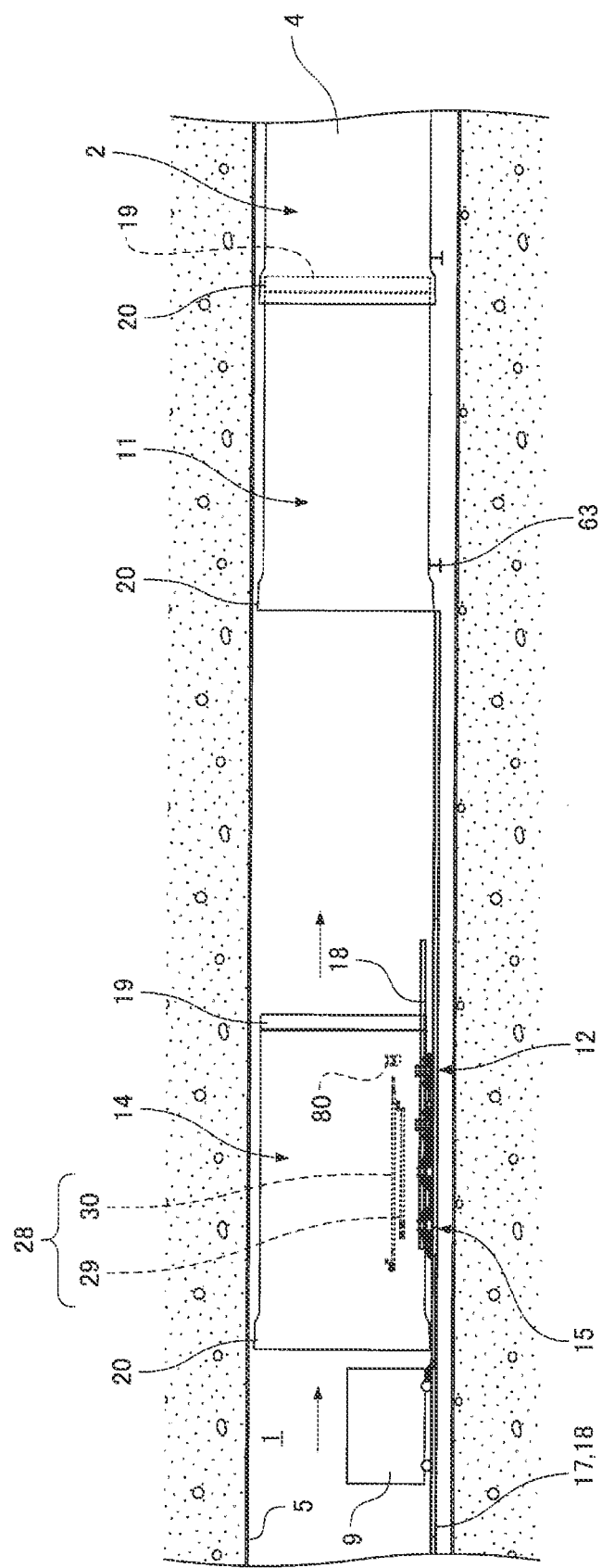
FIG. 28 illustrates the pipe joining method used for joining the pipes according to the first embodiment of the present invention.
Figure 29:
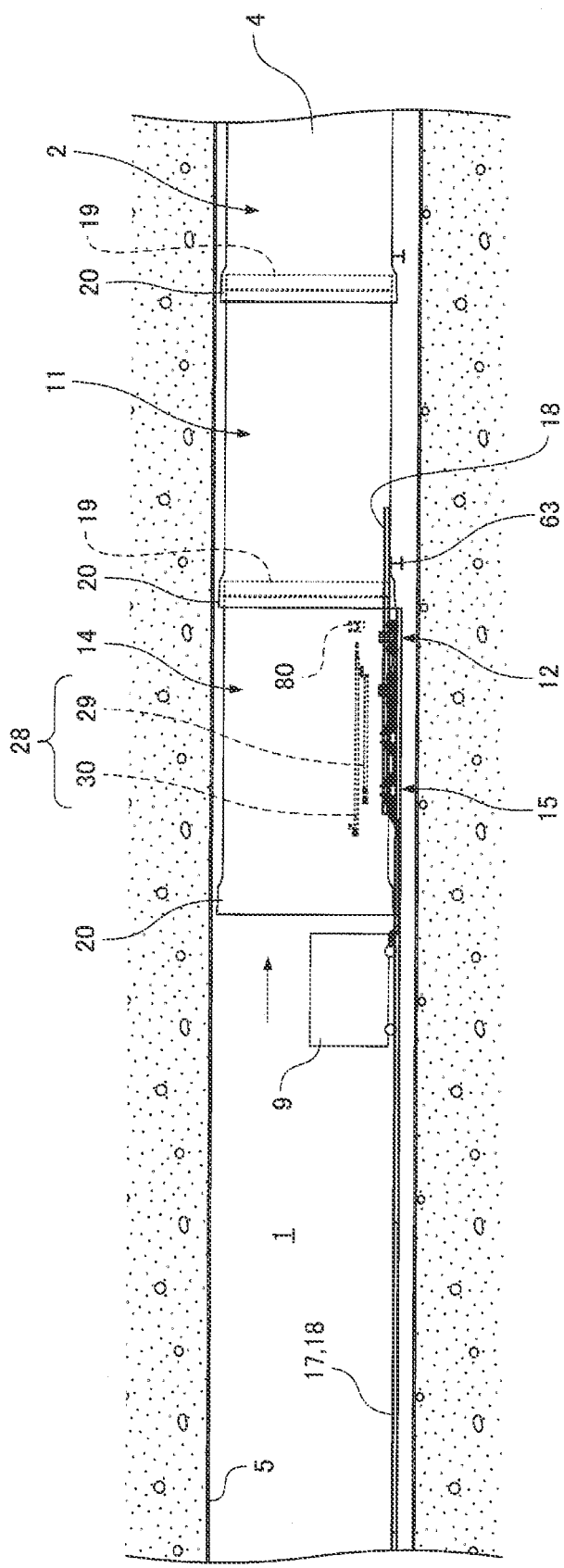
FIG. 29 illustrates the pipe joining method used for joining the pipes according to the first embodiment of the present invention.

Thereafter, as illustrated in FIG. 28, the automotive vehicle 9 is caused to travel forward to move the second transport trolley 15 forward with the first transport trolley 12. As illustrated in FIG. 29, the spigot 19 of the second pipe 14 on the second transport trolley 15 is joined to the socket 20 of the first pipe 11 joined to the rearmost pipe 4.

At this point, the trolley jacks 25 of the second transport trolley 15 vertically adjust the position of the second pipe 14, thereby centering the pipes being joined to each other.

Figure 30:
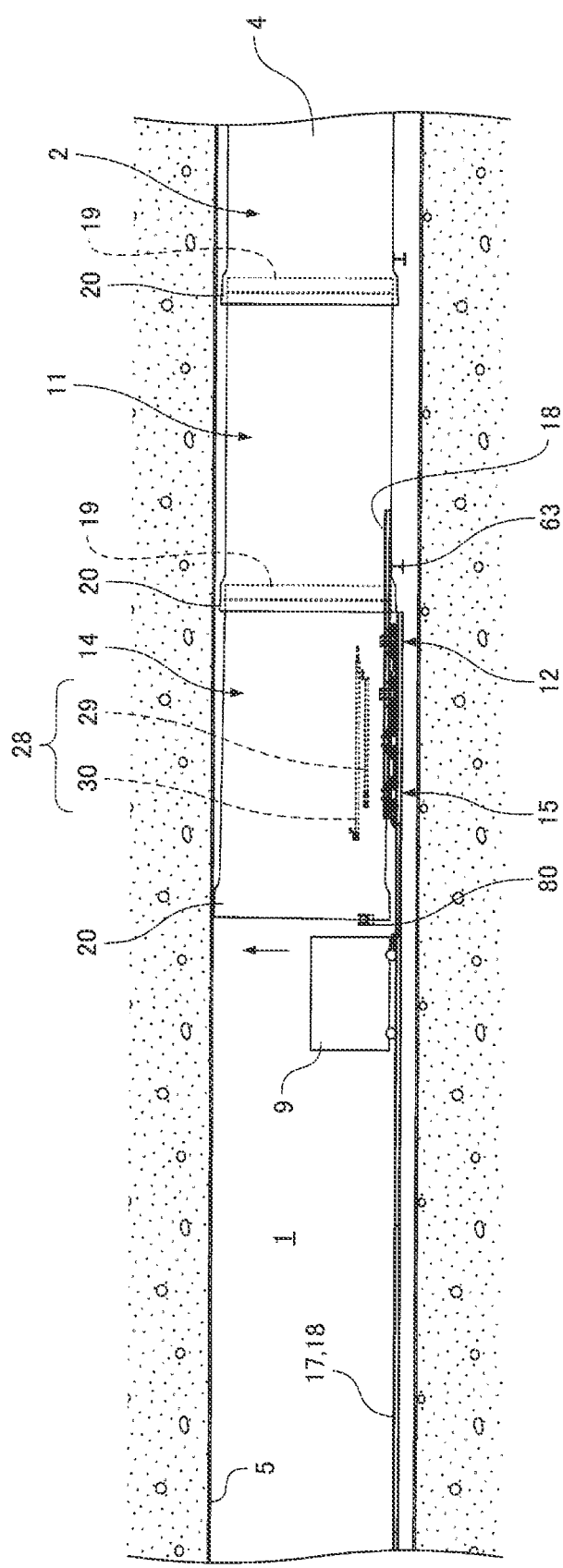
FIG. 30 illustrates the pipe joining method used for joining the pipes according to the first embodiment of the present invention.

Subsequently, as illustrated in FIG. 30, the two lifting jigs 80 are attached to the lower part of the opening end of the socket 20 of the second pipe 14, and then the lifting jigs 80 lift the socket 20 (the other end) of the second pipe 14. Thus, the second pipe 14 is lifted above the second transport trolley 15.

Figure 31:
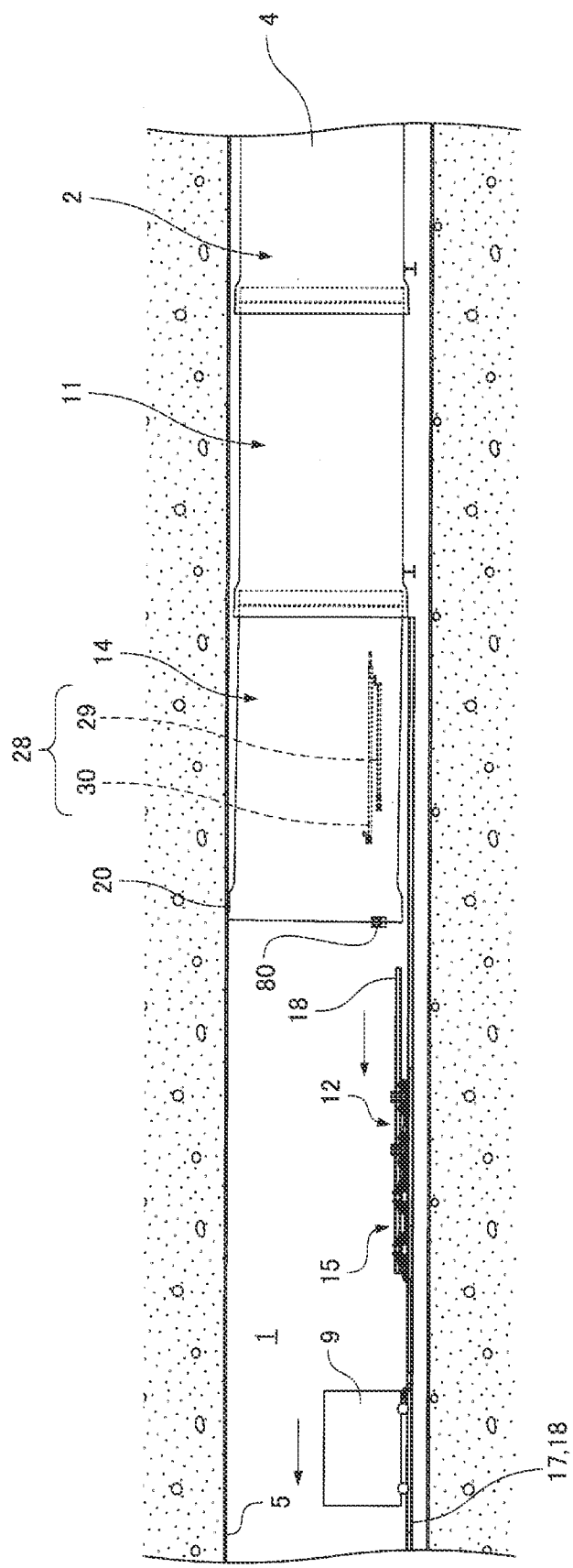
FIG. 31 illustrates the pipe joining method used for joining the pipes according to the first embodiment of the present invention.

After that, as illustrated in FIG. 31, the automotive vehicle 9 and the first and second transport trolleys 12 and 15 are moved backward to draw the first and second transport trolleys 12 and 15 from beneath the second pipe 14 to the near side of the second pipe 14. This joins the first pipe 11 and the second pipe 14 to the rearmost pipe 4 of the pipeline 2. The pipeline 2 in the pipeline construction shaft 1 is extended by repeatedly performing the joining step.

The pipe joining method eliminates the need for lifting the vacant first transport trolley 12 and transferring the first transport trolley 12 into the second pipe 14 on the second transport trolley 15, thereby saving time and effort for the operations.

Furthermore, the vacant first and second transport trolleys 12 and 15 are collected, and other pipes are transported on the first and second transport trolleys 12 and 15 and are sequentially joined to the rearmost pipe. The operations can be repeatedly performed.

Moreover, when the operation lever 45 is switched from the coupling position P3 (FIG. 11) to the separating position P4 (FIG. 13), the engagement pin 36 drops from the engagement position P1 (FIG. 11, FIG. 12) so as to be switched to the disengagement position P2 (FIG. 13, FIG. 14). Thus, the engagement pin 36 can be switched from the engagement position P1 to the disengagement position P2 without using a special drive unit, e.g., a motor or a hydraulic cylinder, thereby reducing the consumption of power or the like.

The engagement pin 36 is urged from the engagement position P1 to the disengagement position P2 by the coil spring 54 and thus can be securely switched to the disengagement position P2.

Figure 6:
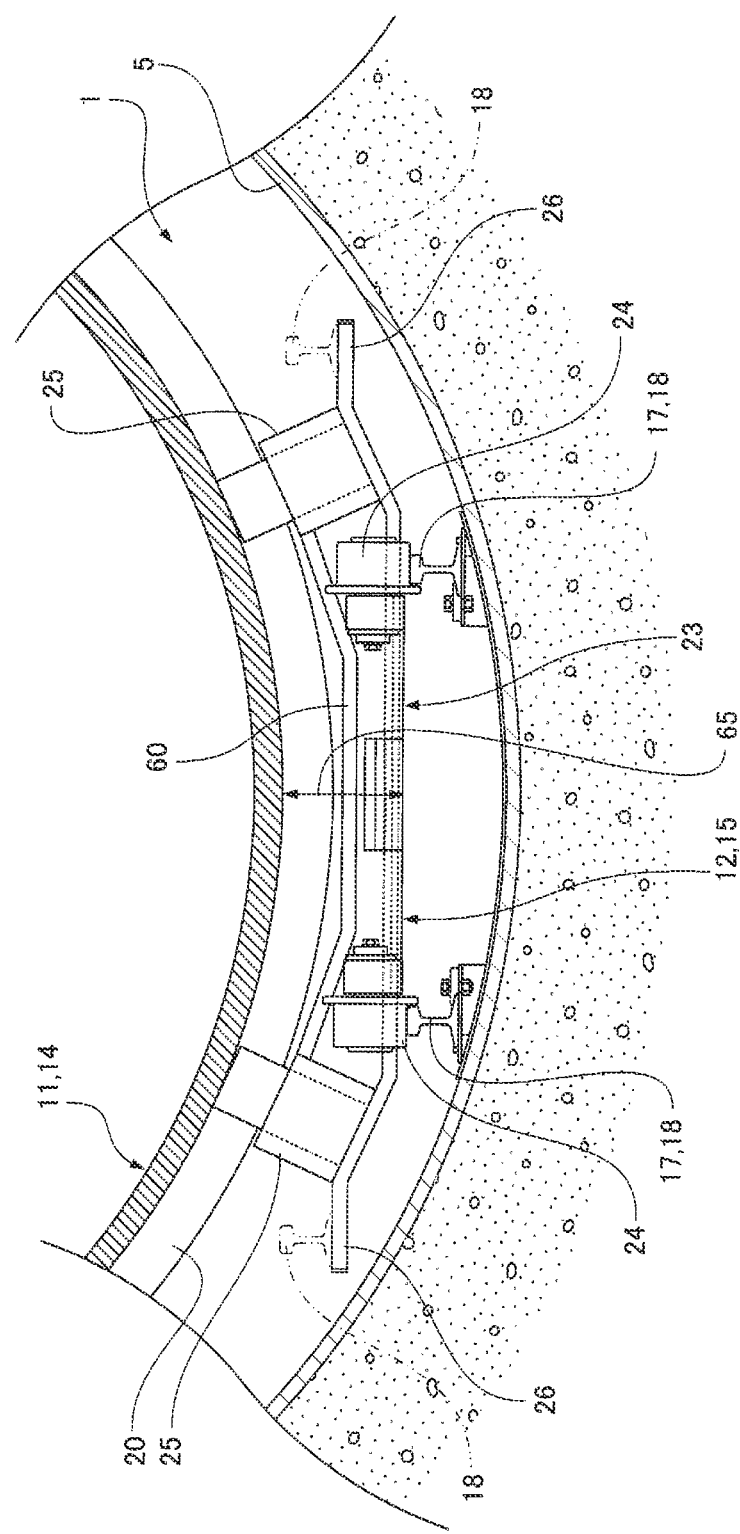
FIG. 6 is an enlarged view of a part of FIG. 5.
Figure 24:
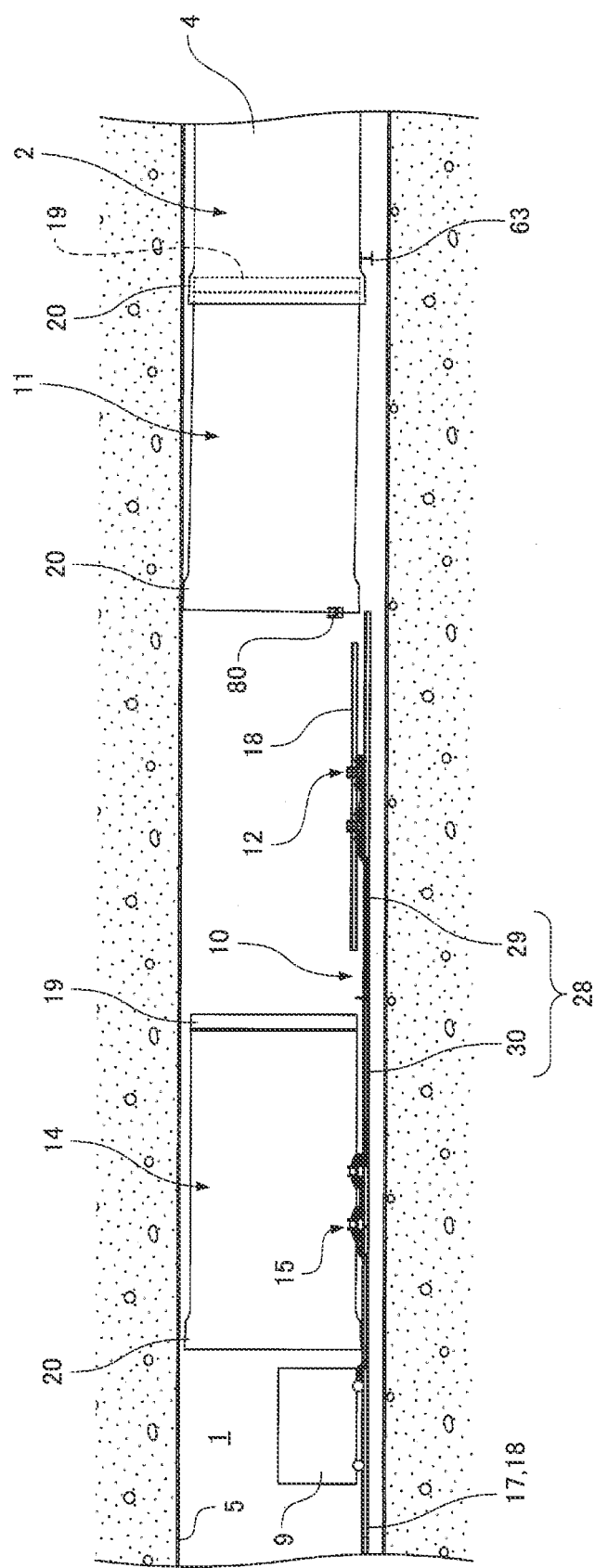
FIG. 24 illustrates the pipe joining method used for joining the pipes according to the first embodiment of the present invention.

As indicated by the virtual lines in FIG. 6, and FIG. 24, the removed separate rails 18 are loaded on the temporary placing plates 26 of the first transport trolley 12, so that the removed separate rails 18 can be easily collected with the first transport trolley 12.

After the second pipe 14 is joined to the first pipe 11, the first coupler 29 and the second coupler 30 can be easily collected from the inside of the second pipe 14.

A second embodiment will be described below. The same members as the members of the first embodiment are indicated by the same reference numerals and the detailed explanation thereof is omitted.

In the second embodiment, a first pipe 11 and a second pipe 14 are sequentially joined to a rearmost pipe 4 of a pipeline 2 in a pipeline construction shaft 1 by using a pipe transport device 10, lifting jigs 80, and an auxiliary rail device 101 (an example of an auxiliary rail device).

As illustrated in FIGS. 32 to 35, the auxiliary rail device 101 includes a plurality of auxiliary crossties 102 and a pair of left and right auxiliary rails 103 supported on the auxiliary crossties 102. The auxiliary rail 103 includes a tilted rail part 104 (an example of a tilted part) that is diagonally tilted upward from the front end to the rear, and a horizontal rail part 105 extending rearward from the rear end of the tilted rail part 104. The ends of the tilted rail part 104 and the horizontal rail part 105 are detachably coupled to each other via a bolt, a nut or the like.

Moreover, an automotive vehicle 9 is provided with a wire rope 107 having a hook at one end of the rope and a winch 108 for winding up the wire rope 107. Rails 17 in the pipeline construction shaft 1 are supported on crossties 8.

A joining method for joining pipes by using the pipe transport device 10, the lifting jigs 80, and the auxiliary rail device 101 in the pipeline construction shaft 1 will be described below.

Figure 36:
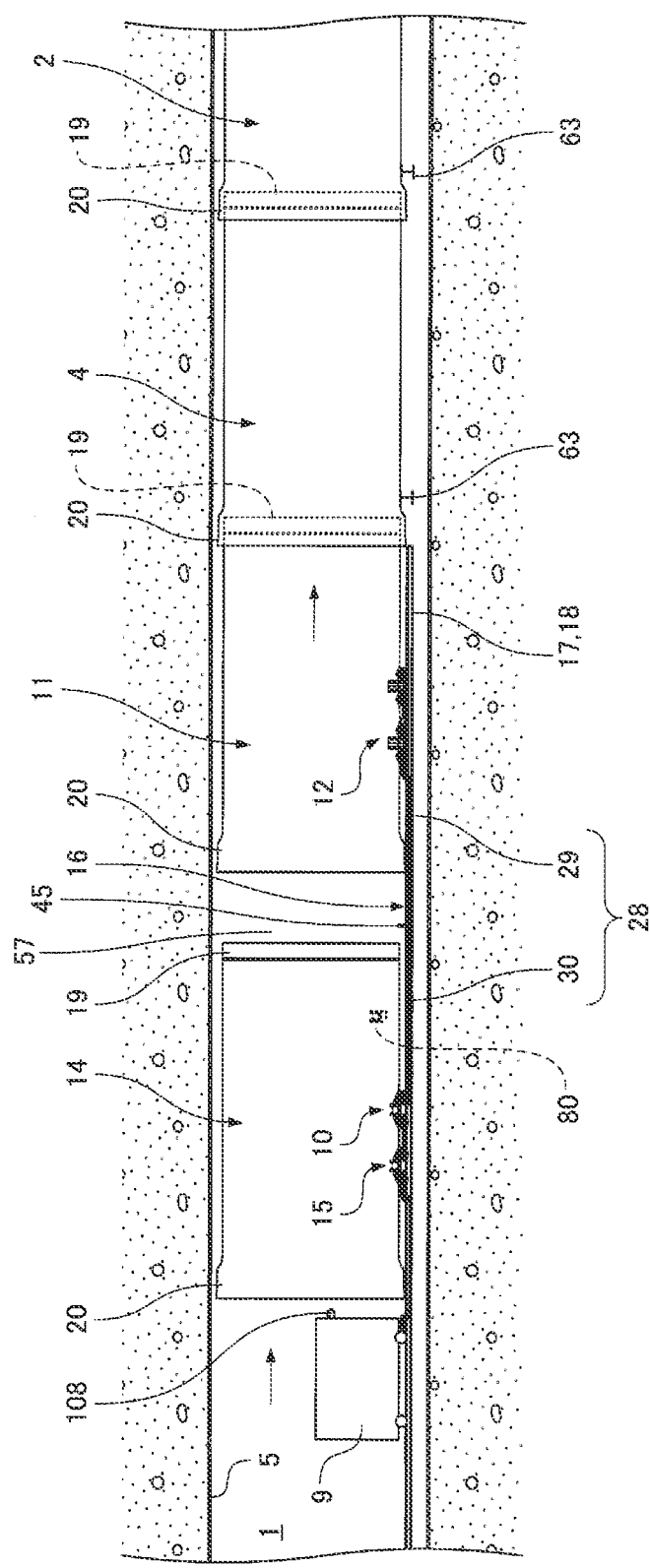
FIG. 36 illustrates a pipe joining method using the auxiliary rail device.

As illustrated in FIG. 36, the first pipe 11 is loaded on a trolley body 23 of a first transport trolley 12 of the pipe transport device 10, the second pipe 14 is loaded on a trolley body 23 of a second transport trolley 15, and the automotive vehicle 9 is caused to travel forward to press the pipe transport device 10 forward. Thus, the first transport trolley 12 and the second transport trolley 15 are moved forward to transport the first pipe 11 and the second pipe 14, so that a spigot 19 (one end) of the first pipe 11 is inserted into a socket 20 (the other end) of the rearmost pipe 4 of the pipeline 2 and is joined thereto.

At this point, a coupler 28 is hidden under the first and second pipes 11 and 14. Moreover, trolley jacks 25 of the first transport trolley 12 vertically adjust the position of the first pipe 11, thereby centering the pipes being joined to each other.

Figure 37:
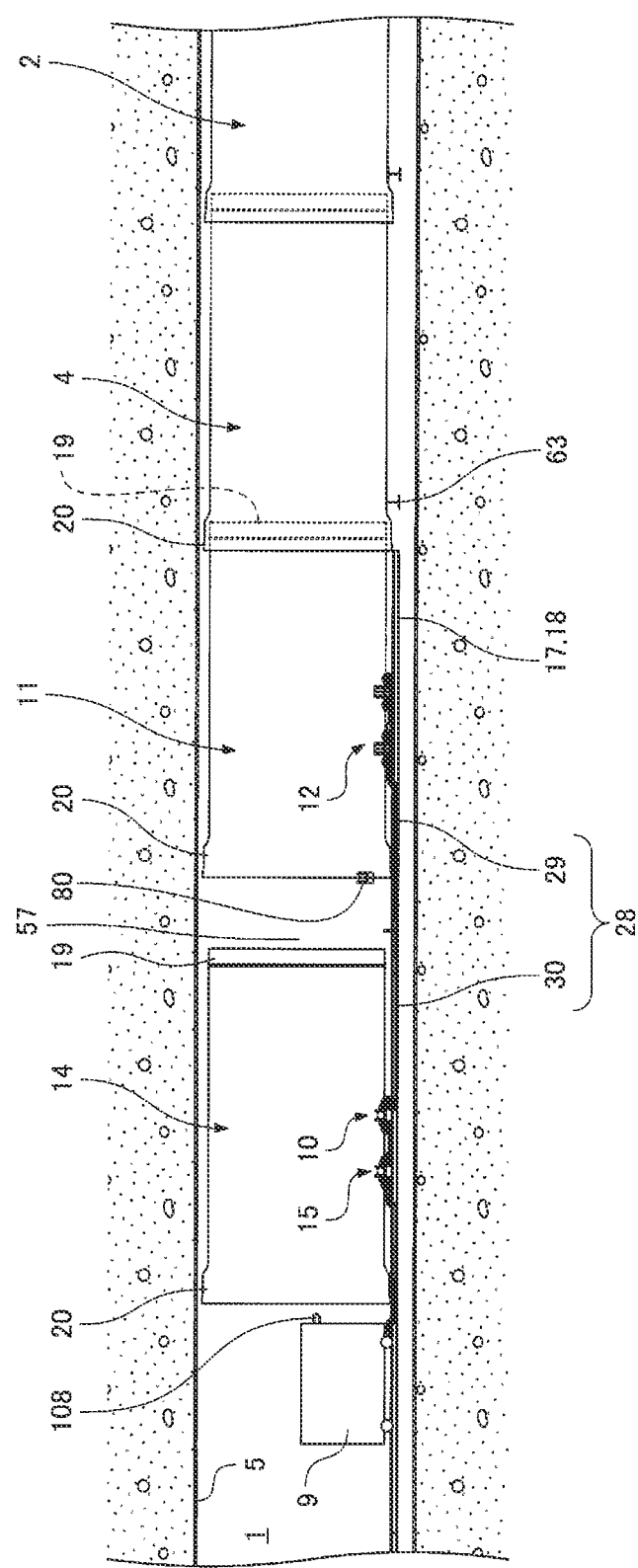
FIG. 37 illustrates the pipe joining method used for joining pipes according to the second embodiment of the present invention.
Figure 38:
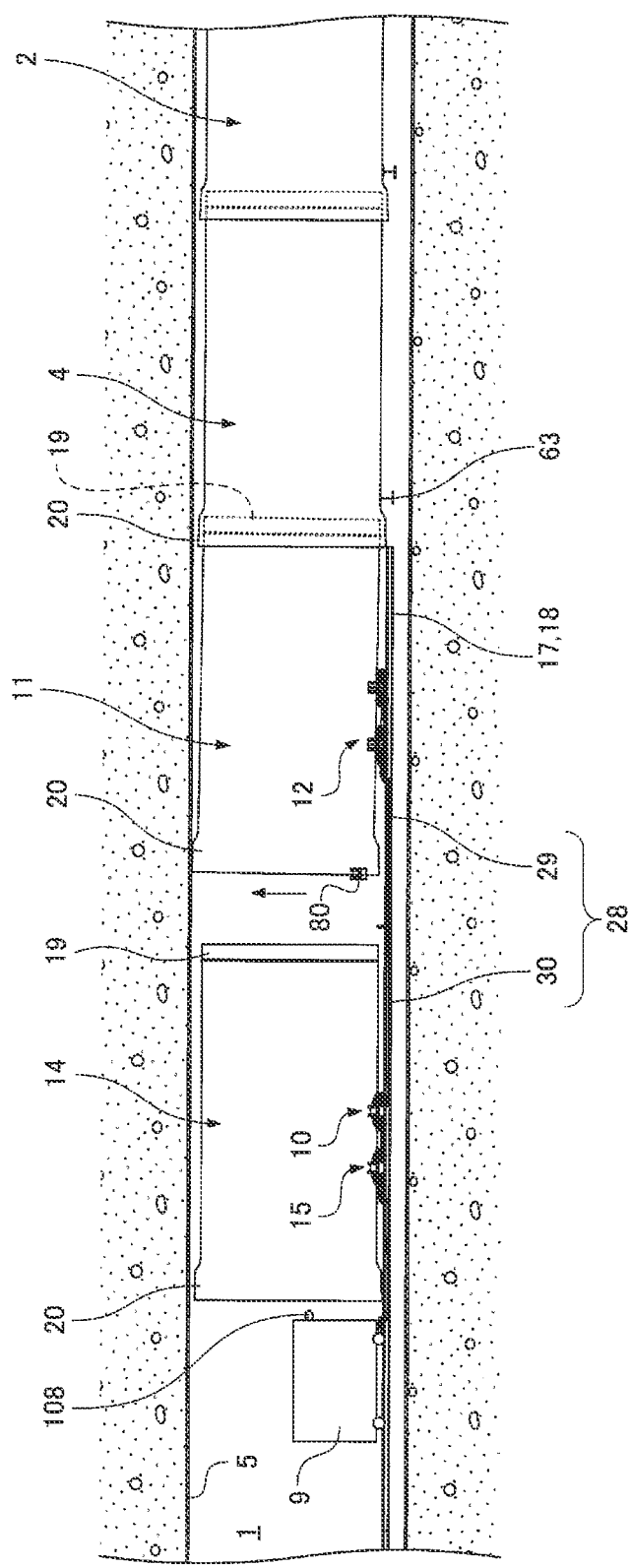
FIG. 38 illustrates the pipe joining method used for joining pipes according to the second embodiment of the present invention.

Subsequently, as illustrated in FIGS. 19, 37, and 38, the two lifting jigs 80 are attached to the lower part of the opening end of the socket 20 of the first pipe 11, and rams 84 of jacks 83 of the lifting jigs 80 are extended to lift the socket 20 (the other end) of the first pipe 11. Thus, the first pipe 11 is lifted above the first transport trolley 12.

Figure 39:
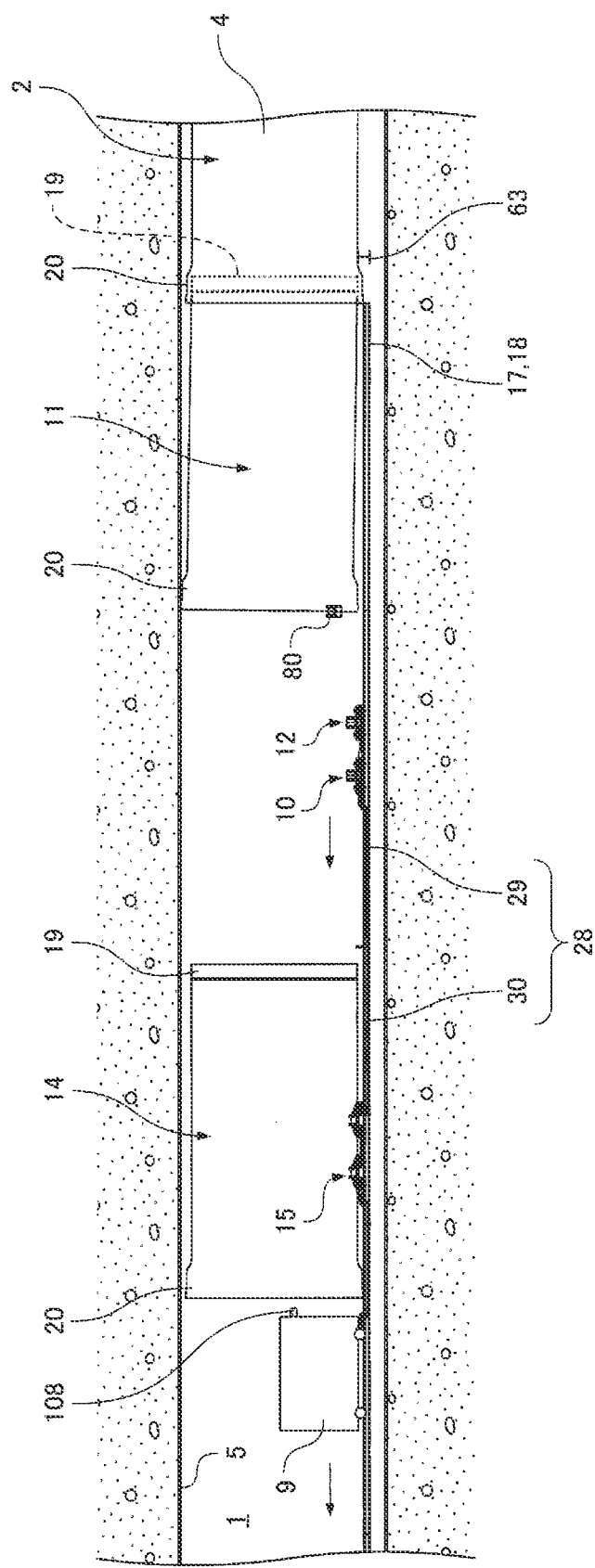
FIG. 39 illustrates the pipe joining method used for joining pipes according to the second embodiment of the present invention.

After that, as illustrated in FIG. 39, the automotive vehicle 9 is caused to travel backward to move the pipe transport device 10 rearward, and the first transport trolley 12 is drawn from beneath the first pipe 11 to the near side of the first pipe 11.

Figure 40:
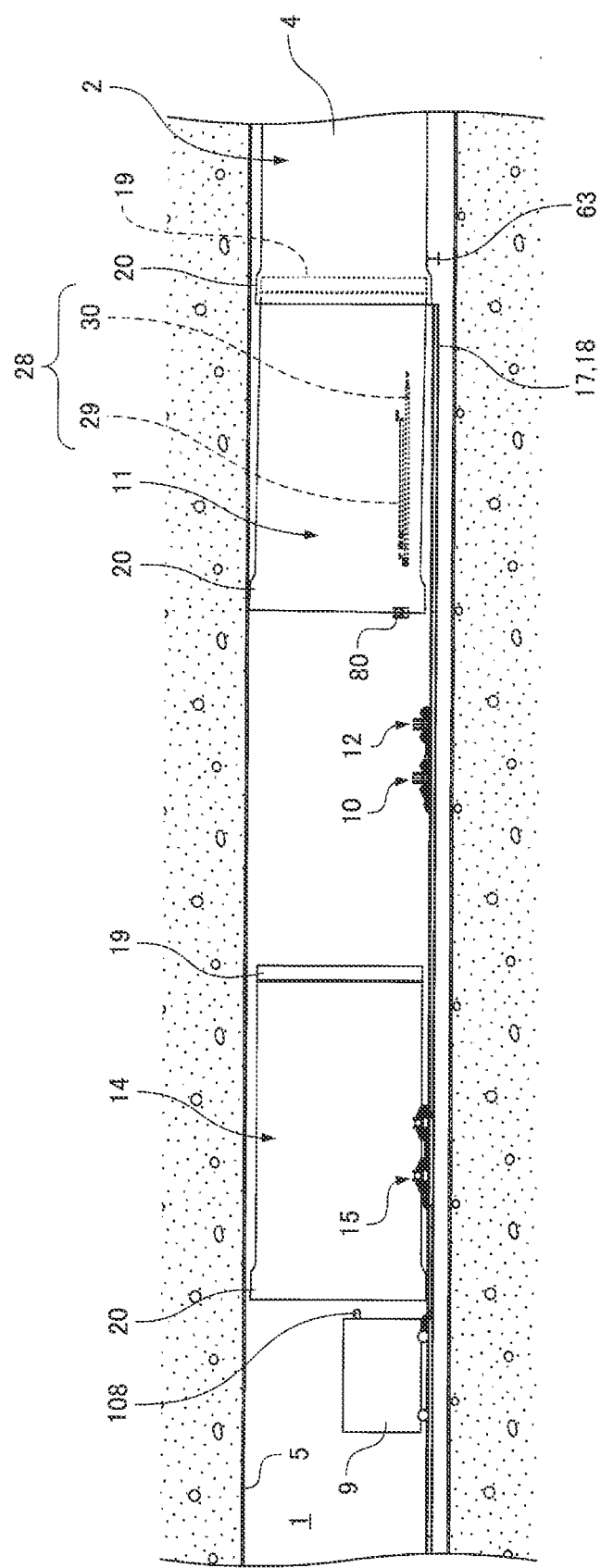
FIG. 40 illustrates the pipe joining method used for joining pipes according to the second embodiment of the present invention.
Figure 41:
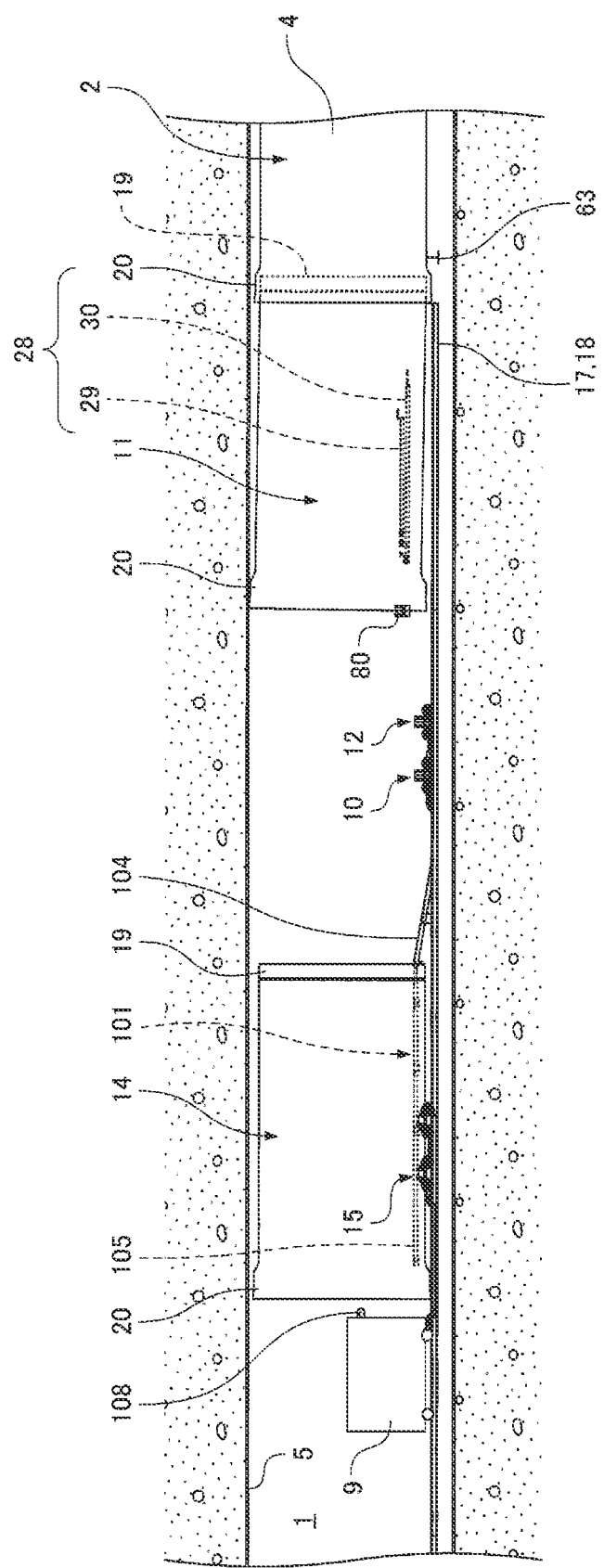
FIG. 41 illustrates the pipe joining method used for joining pipes according to the second embodiment of the present invention.

After that, as illustrated in FIG. 40, the coupler 28 is removed to separate a first coupler 29 and a second coupler 30. Specifically, a first coupling pin 32 is removed to decouple the first coupler 29 and the first transport trolley 12 as indicated by the virtual lines in FIG. 7, and a junction coupling pins 33 are removed to decouple the first coupler 29 and the second coupler 30 as indicated by the virtual lines in FIG. 10, so that the first coupler 29 between the first transport trolley 12 and the second coupler 30 is removed. With this configuration, the first coupling pin 32 can be removed to separate the first coupler 29 and the first transport trolley 12 without interfering with the first pipe 11.

Thereafter, as illustrated in FIGS. 13 and 14, an operation lever 45 is operated for switching from a coupling position P3 to a separating position P4. This can switch an engagement pin 36 from an engagement position P1 to a disengagement position P2 and disengage the second coupler 30 from the second transport trolley 15 by a remote operation. The second coupler 30 is removed from the second transport trolley 15, and the coupler 28 between the first transport trolley 12 and the second transport trolley 15 is removed, thereby separating the first transport trolley 12 and the second transport trolley 15.

As illustrated in FIG. 13, such an operation by the operation lever 45 can be performed at a point remote from the engagement pin 36, that is, a vacant space in front of the spigot 19 of the second pipe 14, thereby switching the engagement pin 36 from the engagement position P1 to the disengagement position P2 by a remote operation. Hence, when the engagement pin 36 is switched from the engagement position P1 to the disengagement position P2, the second pipe 14 on the second transport trolley 15 does not interfere with the switching.

Thus, even if a small space is formed under the second pipe 14 loaded on the second transport trolley 15, the other end of the coupler 28 and the second transport trolley 15 can be easily disengaged from each other by operating the operation lever 45. This can reduce time and effort to remove the coupler 28 to separate the first transport trolley 12 and the second transport trolley 15.

The first coupler 29 and the second coupler 30 that have been thus removed are transferred into the first pipe 11 and are temporarily stored therein as illustrated in FIG. 40.

Thereafter, as illustrated in FIGS. 32 to 34 and 41, the auxiliary rail device 101 is installed in the second pipe 14 on the second transport trolley 15. At this point, the horizontal rail part 105 is installed in the second pipe 14, and the tilted rail part 104 is attached to the front end of the horizontal rail part 105 and is protruded forward from the spigot 19 of the second pipe 14. With this configuration, the auxiliary rail device 101 is installed so as to branch upward from the rails 17 on the near side of the first pipe 11 and extend into the second pipe 14.

Figure 32:
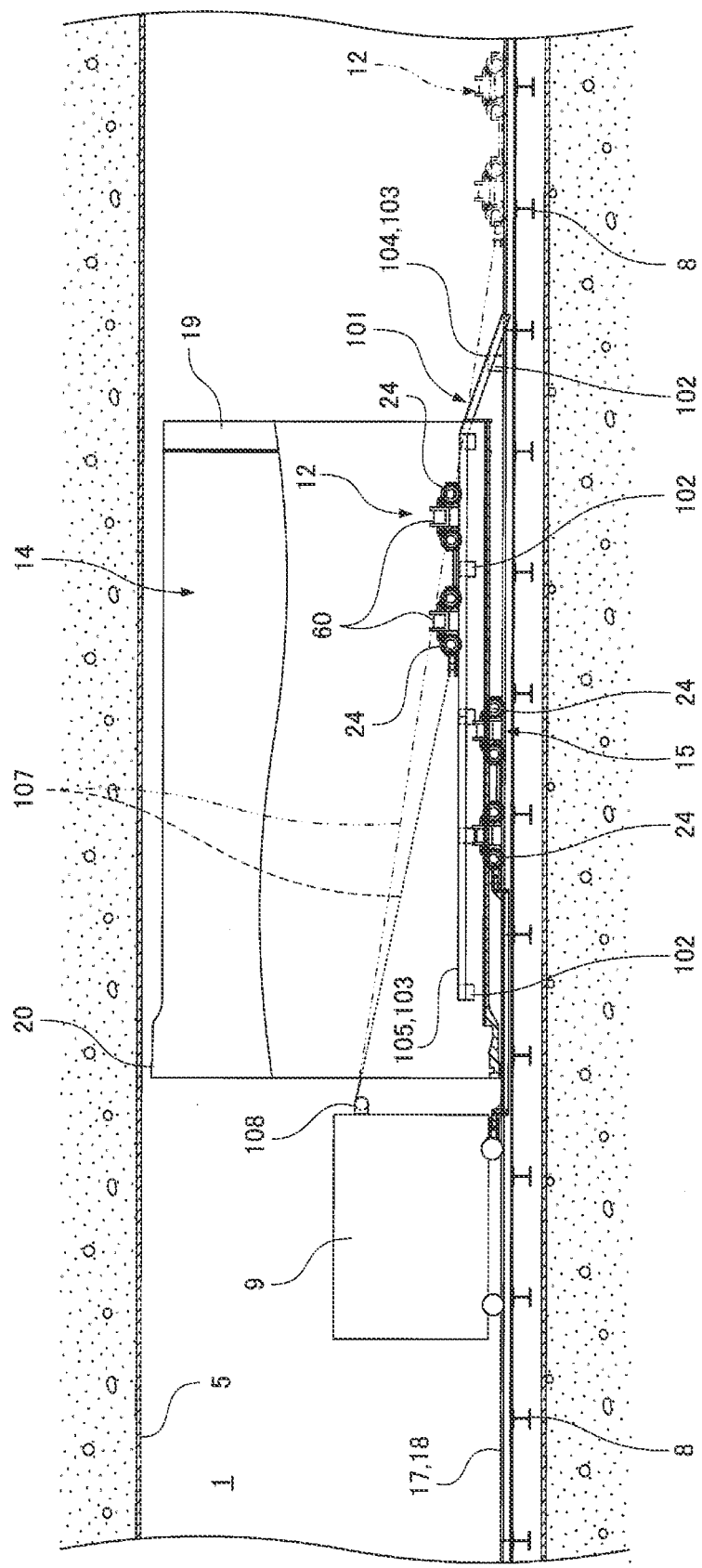
FIG. 32 is a side view illustrating an auxiliary rail device used for joining pipes according to a second embodiment of the present invention.
Figure 33:
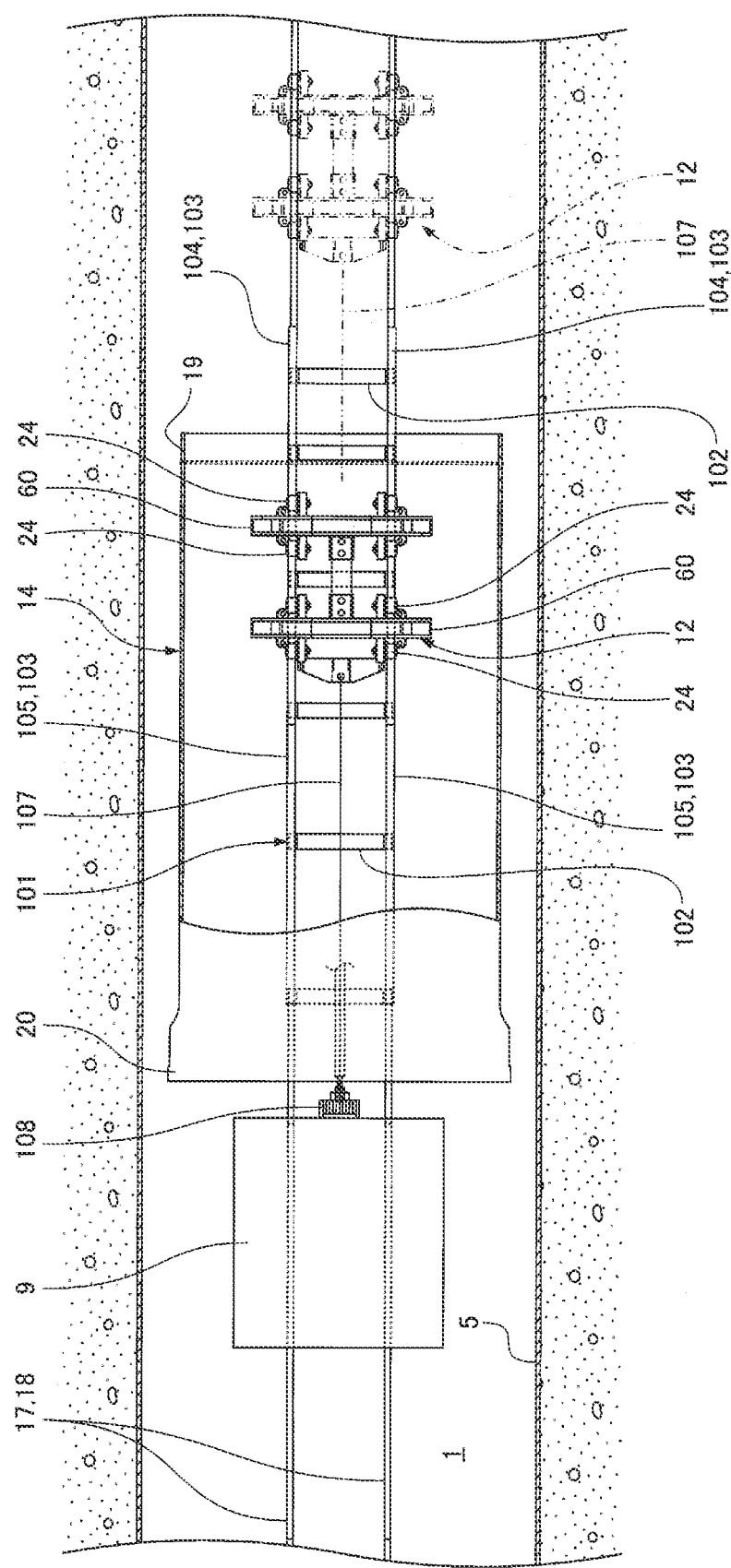
FIG. 33 is a plan view illustrating the auxiliary rail device used for joining pipes according to the second embodiment of the present invention.
Figure 34:
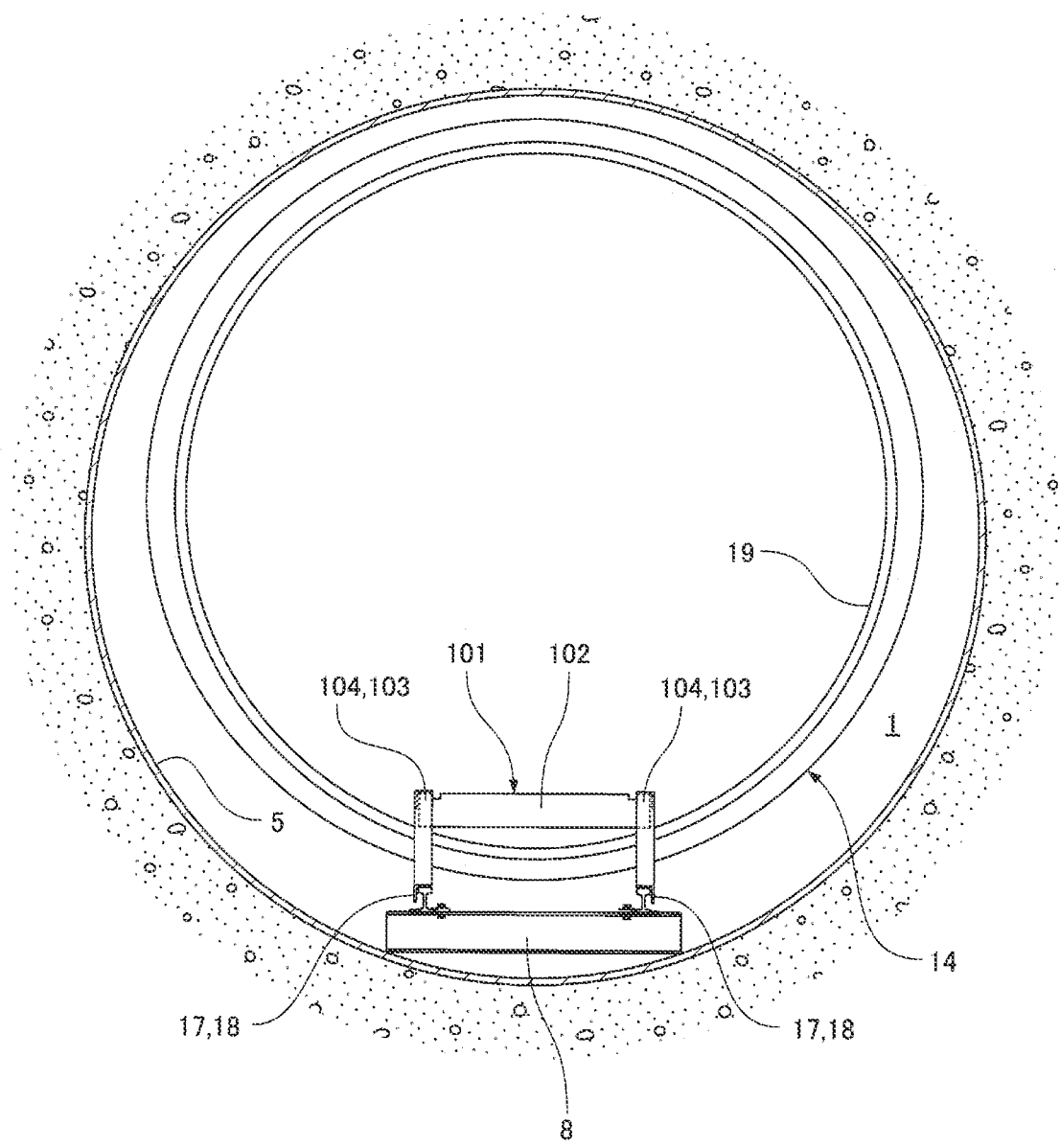
FIG. 34 is a front view illustrating the auxiliary rail device used for joining pipes according to the second embodiment of the present invention.
Figure 35:
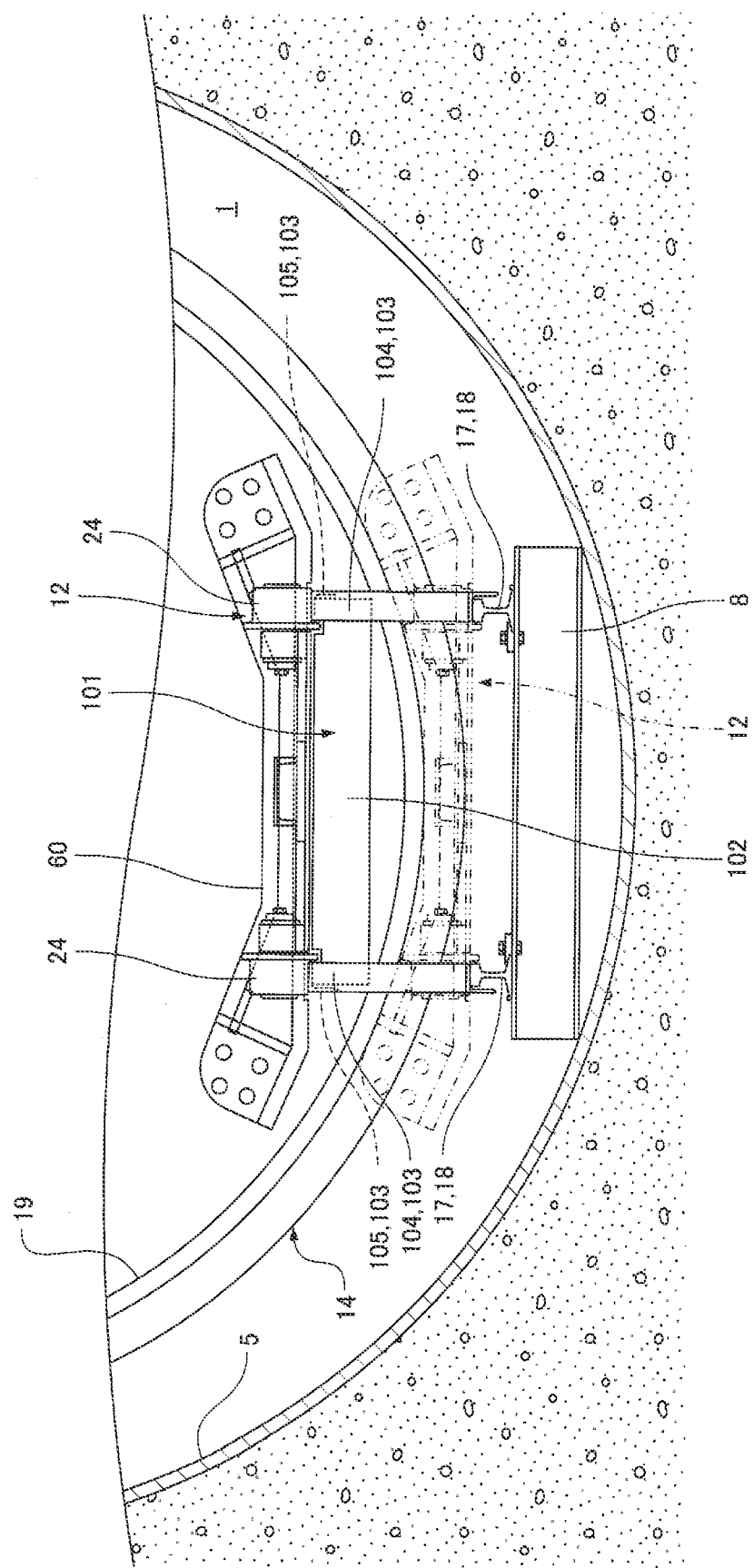
FIG. 35 is an enlarged front view illustrating the auxiliary rail device used for joining pipes according to the second embodiment of the present invention.
Figure 42:
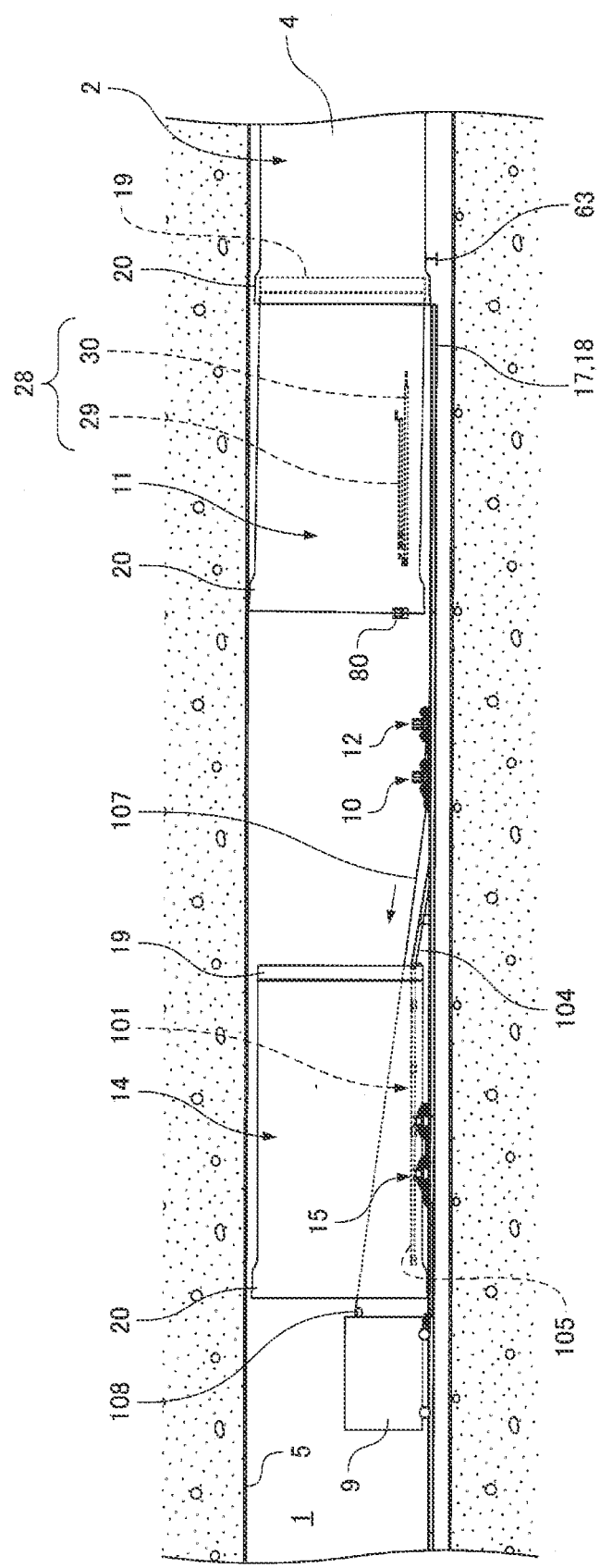
FIG. 42 illustrates the pipe joining method used for joining pipes according to the second embodiment of the present invention.
Figure 43:
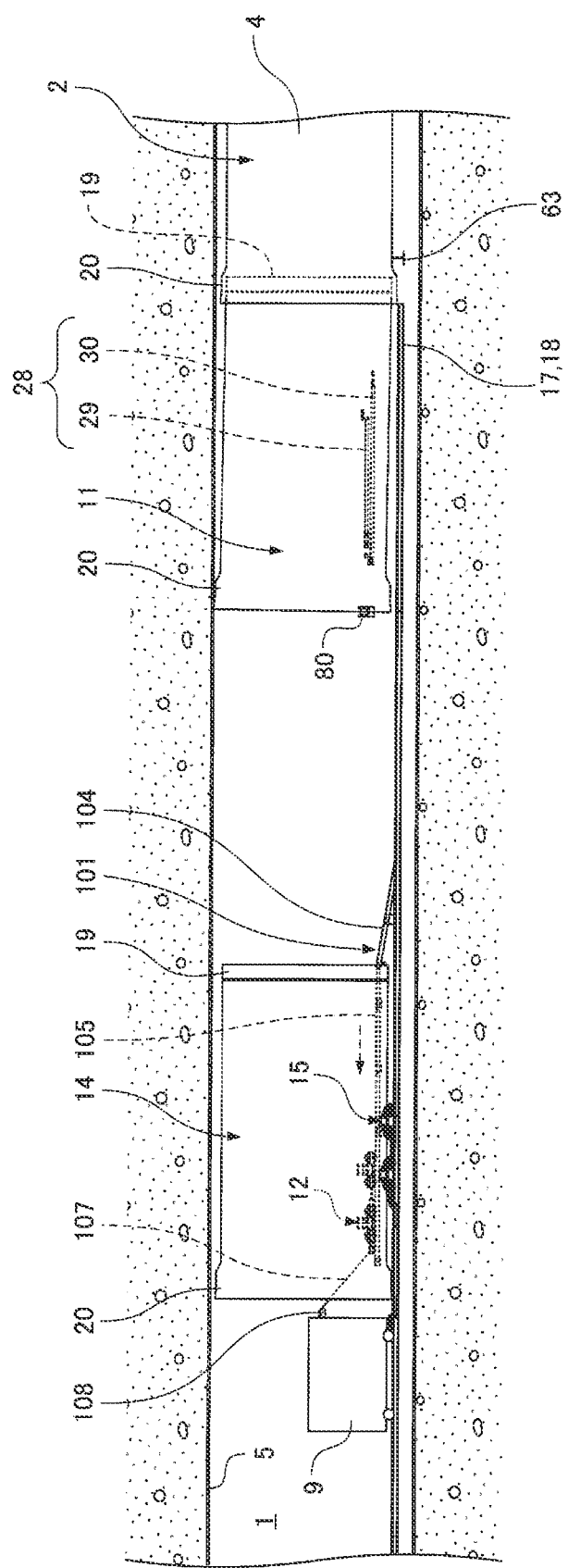
FIG. 43 illustrates the pipe joining method used for joining pipes according to the second embodiment of the present invention.

Thereafter, as illustrated in FIG. 42, the hook of the wire rope 107 provided for the automotive vehicle 9 is hung on the first transport trolley 12 in an unloaded state, and then the winch 108 is operated to wind up the wire rope 107. Thus, the first transport trolley 12 is pulled by the wire rope 107, moves backward from the near side of the first pipe 11, and is transferred from the rails 17 onto the auxiliary rail device 101. As illustrated in FIGS. 32, 33, and 35, the first transport trolley 12 passes along the tilted rail part 104, travels on the horizontal rail part 105, and is transferred into the second pipe 14. As illustrated in FIG. 43, the first transport trolley 12 is stored in the second pipe 14 while being supported on the horizontal rail part 105.

Figure 44:
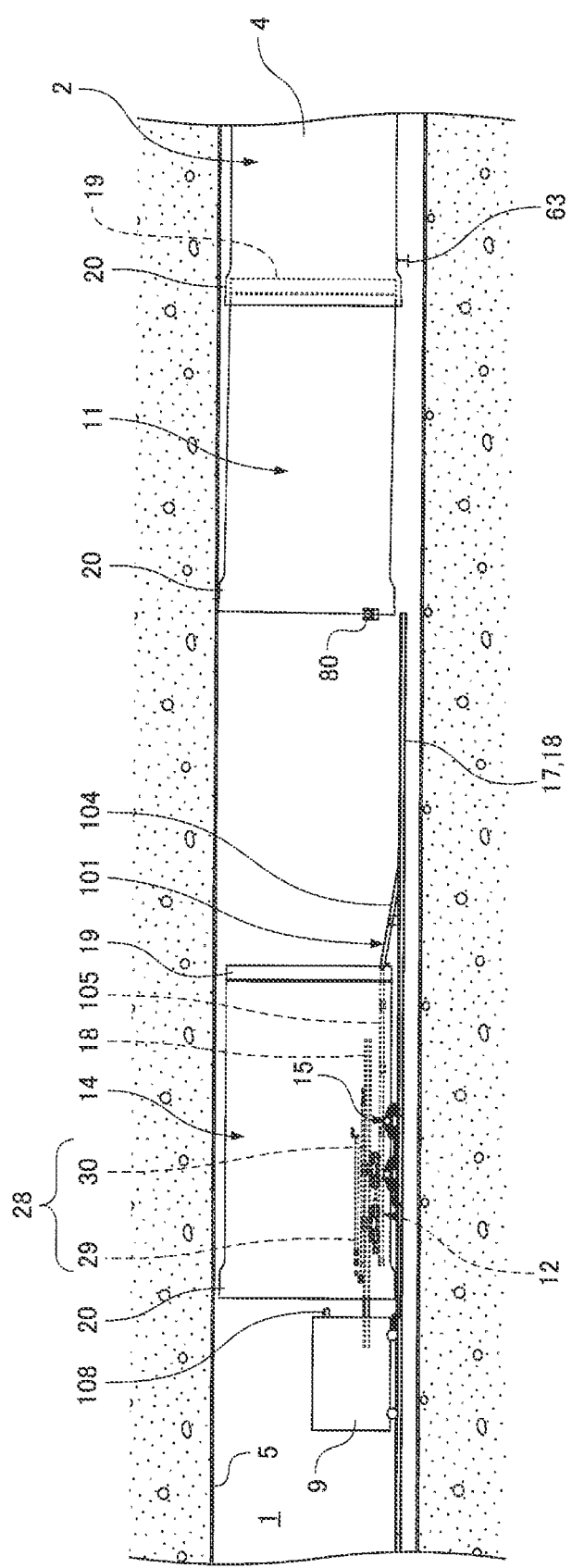
FIG. 44 illustrates the pipe joining method used for joining pipes according to the second embodiment of the present invention.

Subsequently, as illustrated in FIG. 44, separate rails 18 of the rails 17 under the first pipe 11 are removed and are loaded on the temporary placing plates 26 of the first transport trolley 12 in the second pipe 14. Moreover, the first coupler 29 and the second coupler 30 are transferred from the inside of the first pipe 11 onto the first transport trolley 12 in the second pipe 14.

Figure 45:
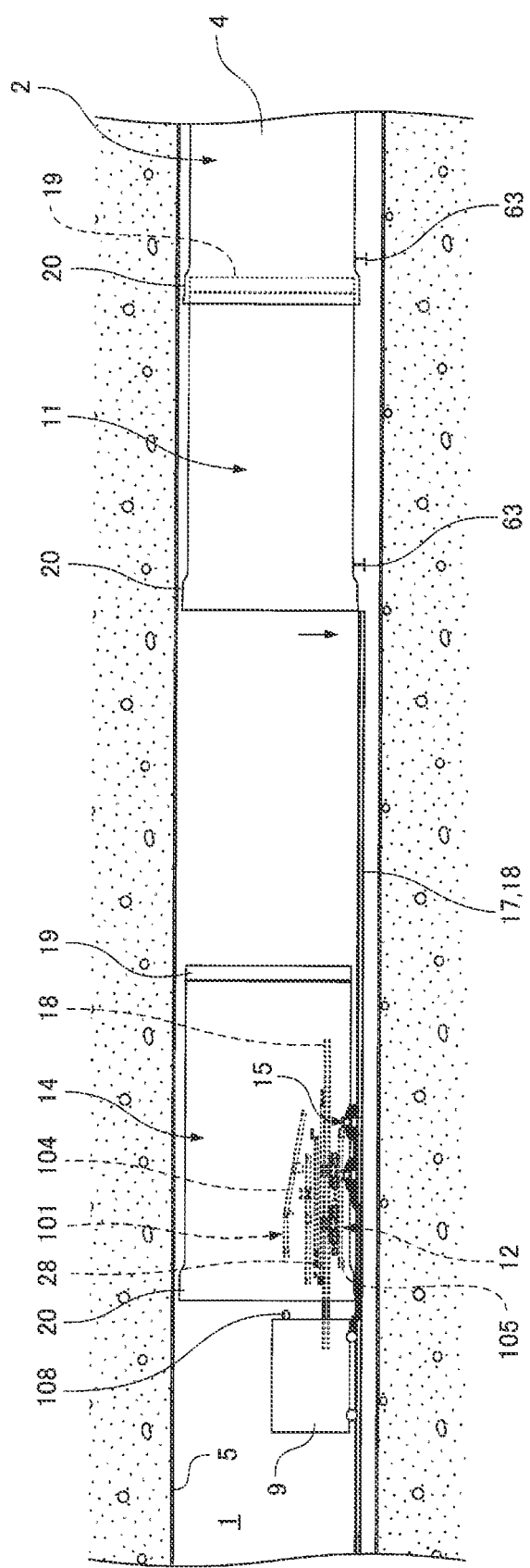
FIG. 45 illustrates the pipe joining method used for joining pipes according to the second embodiment of the present invention.

Thereafter, as illustrated in FIG. 45, an H-shaped steel support member 63 is installed under the socket-side end of the first pipe 11. The rams 84 of the jacks 83 of the lifting jigs 80 are retracted to lower the socket-side end (the other end) of the first pipe 11 onto the support member 63, so that the socket-side end of the first pipe 11 is supported by the support member 63. Thereafter, the two lifting jigs 80 are removed from the opening end of the socket 20 of the first pipe 11 and are transferred into the second pipe 14 so as to be temporarily stored therein. As has been discussed, the socket-side end of the first pipe 11 is supported by the support member 63, thereby preventing the socket-side end of the first pipe 11 from being displaced downward.

The tilted rail part 104 of the auxiliary rail device 101 is removed from the horizontal rail part 105 and is temporarily stored in the second pipe 14. The tilted rail part 104 corresponds to a tilted part of the auxiliary rail device 101 that branches from the rails 17 and protrudes forward from the spigot 19 of the second pipe 14.

Figure 46:
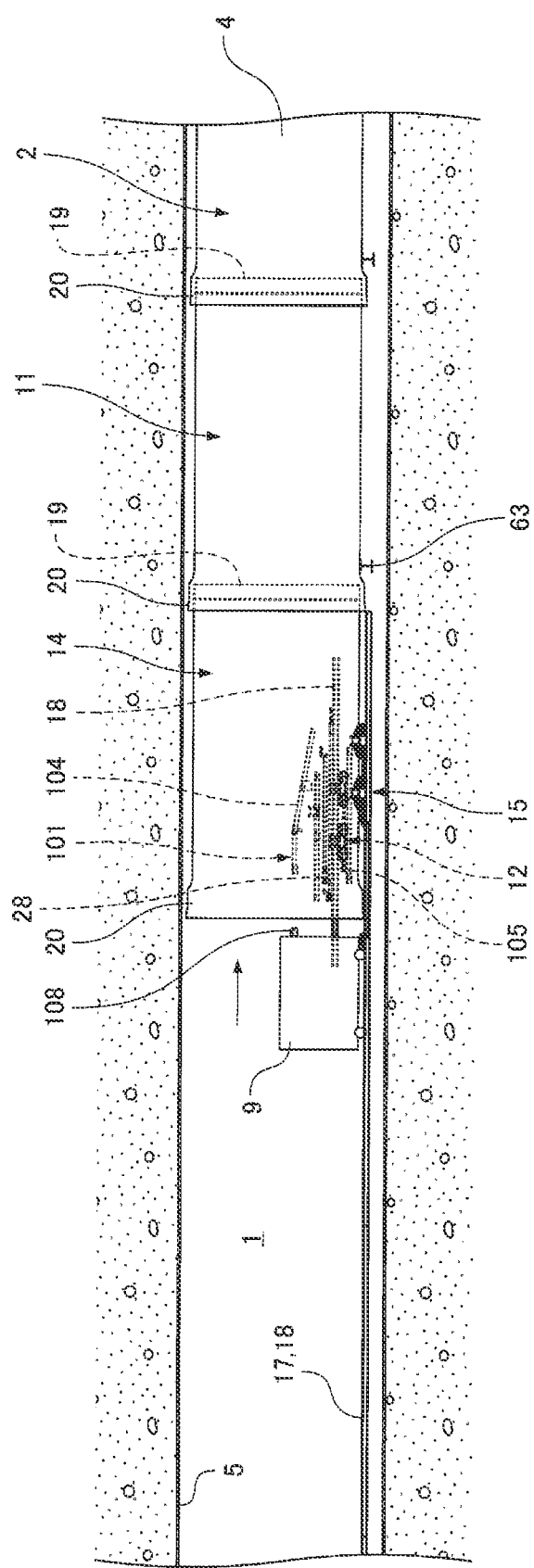
FIG. 46 illustrates the pipe joining method used for joining pipes according to the second embodiment of the present invention.

Thereafter, as illustrated in FIG. 46, the automotive vehicle 9 is caused to travel forward to move the second transport trolley 15 forward. The spigot 19 of the second pipe 14 on the second transport trolley 15 is joined to the socket 20 of the first pipe 11 joined to the rearmost pipe 4.

At this point, the trolley jacks 25 of the second transport trolley 15 vertically adjust the position of the second pipe 14, thereby centering the pipes being joined to each other.

Figure 47:
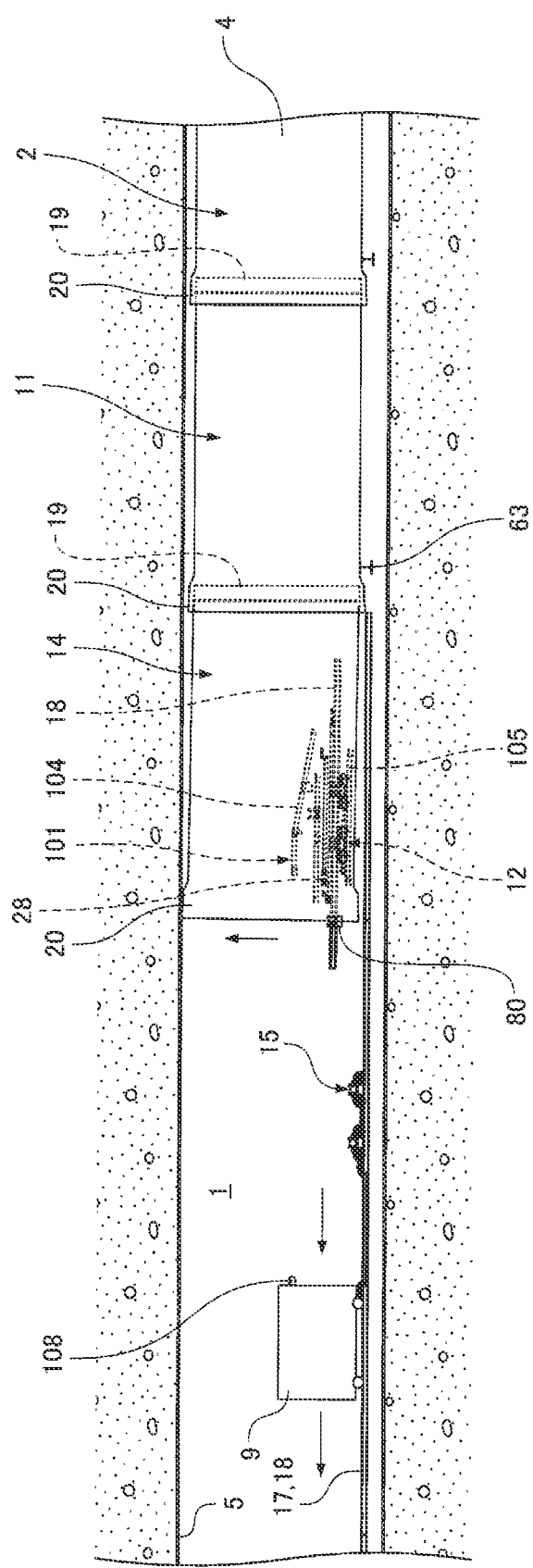
FIG. 47 illustrates the pipe joining method used for joining pipes according to the second embodiment of the present invention.

Subsequently, as illustrated in FIG. 47, the two lifting jigs 80 are attached to the lower part of the opening end of the socket 20 of the second pipe 14, and then the lifting jigs 80 lift the socket 20 (the other end) of the second pipe 14. Thus, the second pipe 14 is lifted above the second transport trolley 15. The automotive vehicle 9 and the second transport trolley 15 are caused to travel backward, and the second transport trolley 15 is drawn from beneath the second pipe 14 to the near side of the second pipe 14 and is retracted behind the second pipe 14.

Figure 48:
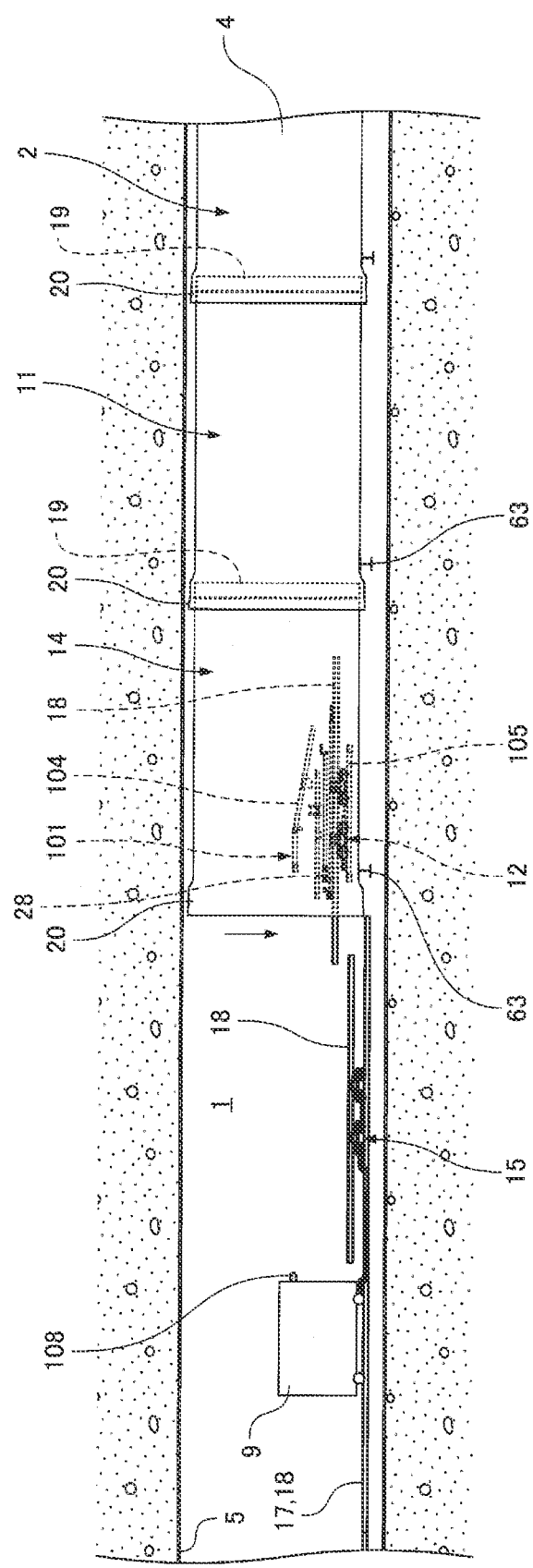
FIG. 48 illustrates the pipe joining method used for joining pipes according to the second embodiment of the present invention.

Subsequently, as illustrated in FIG. 48, the separate rails 18 of the rails 17 under the second pipe 14 are removed and are loaded on the temporary placing plates 26 of the second transport trolley 15. Furthermore, the H-shaped steel support member 63 is installed under the socket-side end of the second pipe 14. The rams 84 of the jacks 83 of the lifting jigs 80 are retracted to lower the socket-side end (the other end) of the second pipe 14 onto the support member 63, so that the socket-side end of the second pipe 14 is supported by the support member 63. The two lifting jigs 80 are then removed from the opening end of the socket 20 of the second pipe 14.

Figure 49:
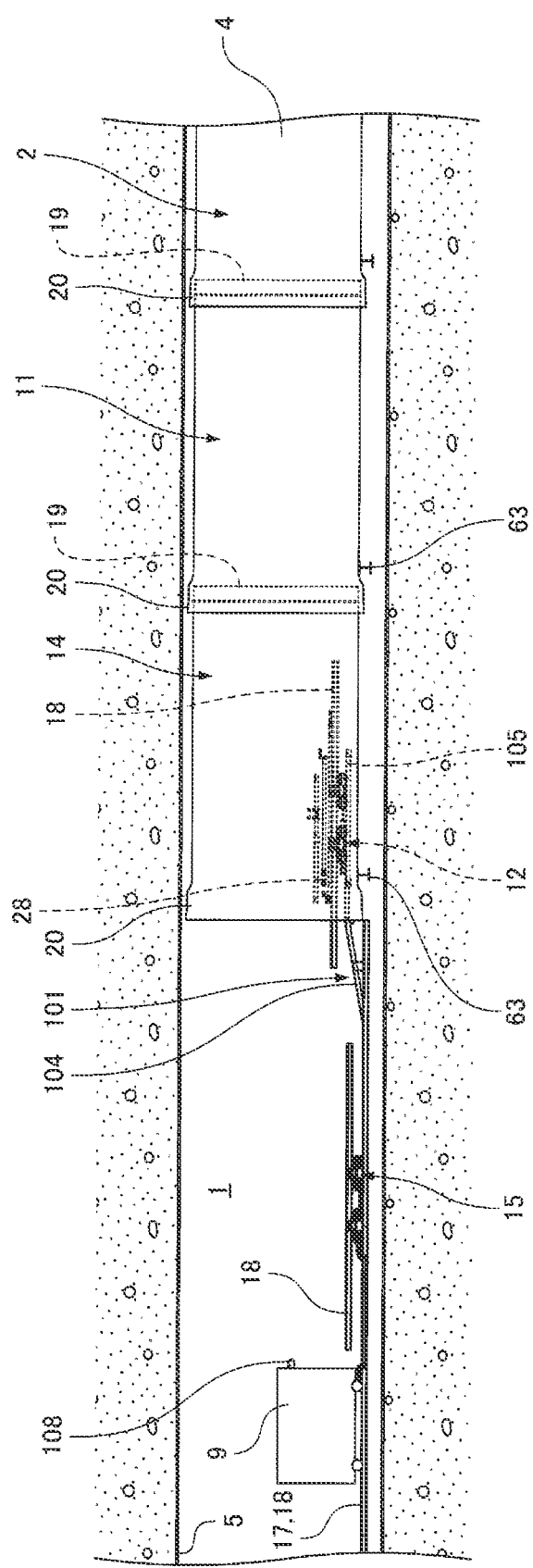
FIG. 49 illustrates the pipe joining method used for joining pipes according to the second embodiment of the present invention.

After that, as illustrated in FIG. 49, the tilted rail part 104 is attached to the rear end of the horizontal rail part 105 and is protruded rearward from the socket 20 of the second pipe 14, and the rear end of the tilted rail part 104 is connected onto the rails 17.

Figure 50:
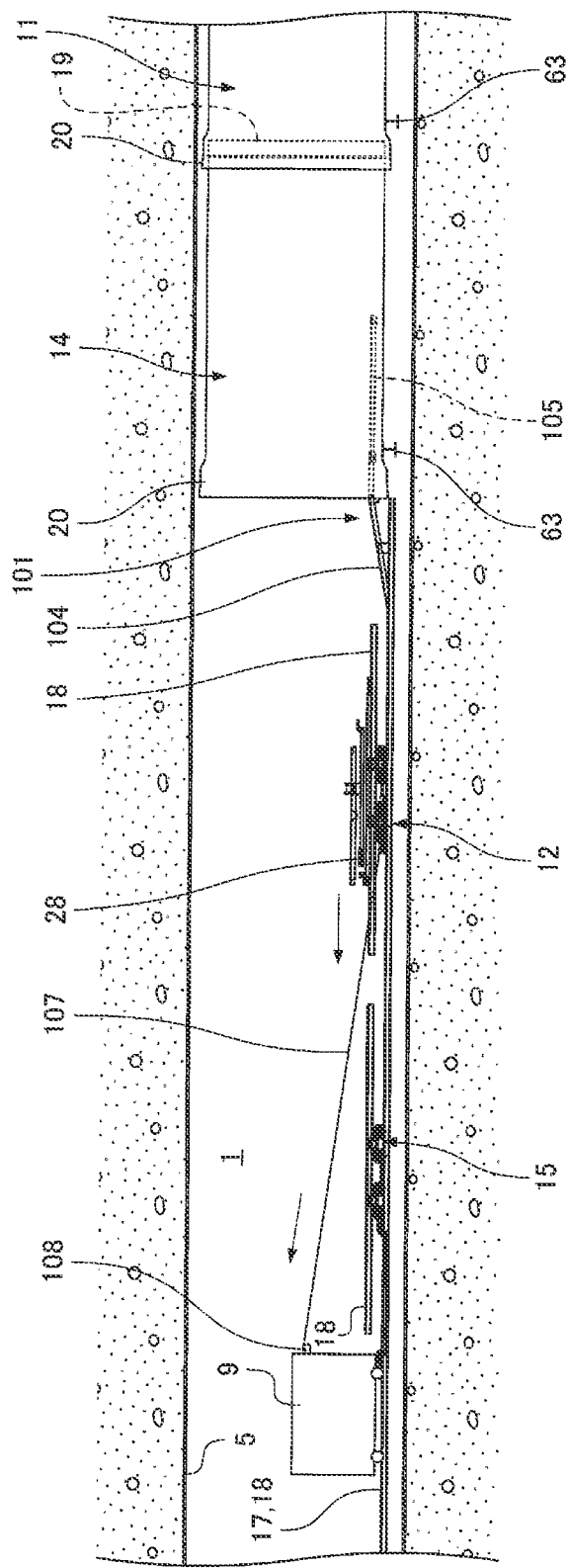
FIG. 50 illustrates the pipe joining method used for joining pipes according to the second embodiment of the present invention.
Figure 51:
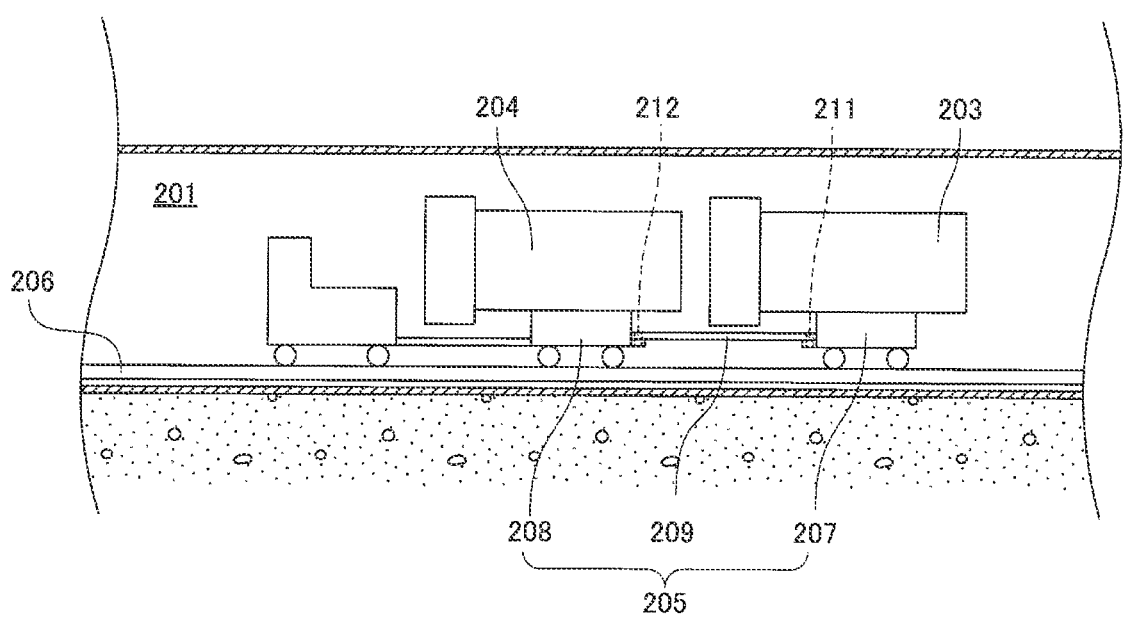
FIG. 51 is a schematic side view illustrating a conventional pipe transport device.
Figure 52:
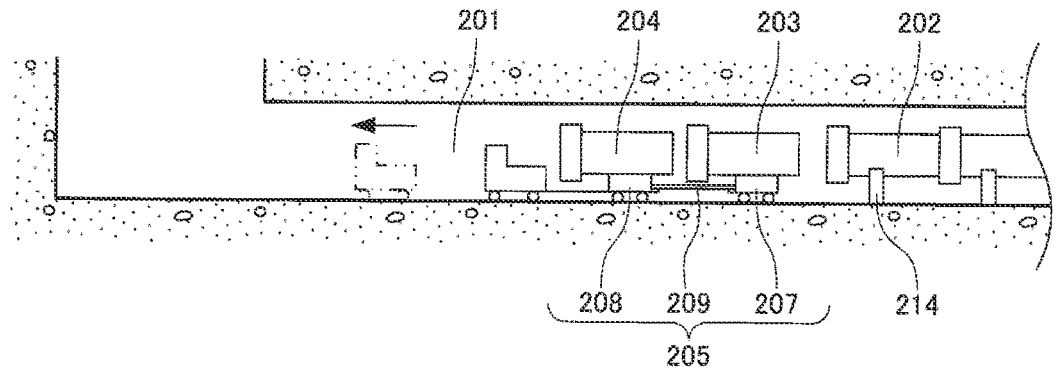
FIG. 52 illustrates a pipe joining method using the conventional pipe transport device.
Figure 53:
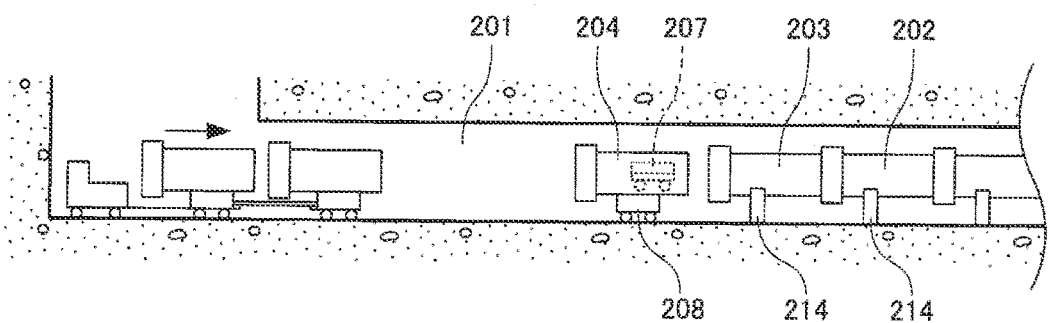
FIG. 53 illustrates the conventional pipe joining method.
Figure 54:
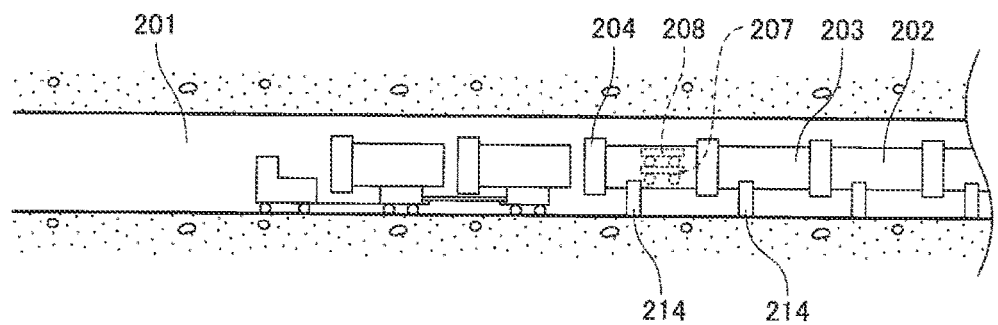
FIG. 54 illustrates the conventional pipe joining method.

As illustrated in FIG. 50, the hook of the wire rope 107 provided for the automotive vehicle 9 is hung on the first transport trolley 12 in the second pipe 14, and then the winch 108 is operated to wind up the wire rope 107. Thus, the first transport trolley 12 is moved backward on the horizontal rail part 105 in the second pipe 14 and is unloaded from the tilted rail part 104 onto the rails 17.

This joins the first pipe 11 and the second pipe 14 to the rearmost pipe 4 of the pipeline 2. The pipeline 2 in the pipeline construction shaft 1 is extended by repeatedly performing the joining step.

In the first and second embodiments, as illustrated in FIG. 11, the engagement pin 36 (an example of an engaging member) that can be engaged and disengaged into and from the second transport trolley 15 is provided on the other end of the coupler 28 (that is, the second coupler 30) and the switching device 37 is provided in the second coupler 30. The engagement pin 36 (an example of an engaging member) that can be engaged and disengaged into and from the first transport trolley 12 may be provided on one end (that is, the first coupler 29) of the coupler 28, and the switching device 37 may be provided in the first coupler 29.

With this configuration, the operation lever 45 is operated to operate the switching device 37, so that the engagement pin 36 is switched from the engagement position P1 to the disengagement position P2 and the first transport trolley 12 and the coupler 28 are disengaged from each other. At this point, the operation lever 45 can be operated without interfering with the first pipe 11 and the second pipe 14. Thus, even if a small space is formed under the first pipe 11 loaded on the first transport trolley 12, the first transport trolley 12 and the coupler 28 can be easily disengaged from each other by operating the operation lever 45. This can reduce time and effort to remove the coupler 28 to separate the first transport trolley 12 and the second transport trolley 15.

Moreover, a first engagement pin that can be engaged and disengaged into and from the first transport trolley 12 may be provided on one end of the coupler 28, a second engagement pin that can be engaged and disengaged into and from the second transport trolley 15 may be provided on the other end of the coupler 28, and a first switching device for switching the first engagement pin from an engaged state to a disengaged state and a second switching device for switching the second engagement pin from an engaged state to a disengaged state may be provided for the coupler 28.

In the foregoing embodiments, the pipes are joined by inserting the spigot 19 of another pipe into the socket 20 of the pipe joined to the pipeline 2. The pipes may be joined by fitting the socket 20 of another pipe onto the spigot 19 of the pipe joined to the pipeline 2.

In the foregoing embodiments, the coupling plate 27 of the second transport trolley 15 is provided with the coil spring 54. The coil spring 54 may be omitted.

In the foregoing embodiments, the pipes 4, 11, and 14 each have the spigot 19 on one end and the socket 20 on the other end. This configuration is also applicable to joining of a pipe having only one of the spigot 19 and the socket 20.

What is claimed is:

1. A pipe joining method inside a pipeline construction shaft, in which a first pipe is loaded on a first transport trolley of a pipe transport device including the first transport trolley and a second transport trolley that are capable of traveling on rails in the pipeline construction shaft, a second pipe being loaded on the second transport trolley coupled to the first transport trolley via a coupler, the first pipe and the second pipe being transported, the first pipe and the second pipe being sequentially joined to a rearmost pipe of a pipeline in the pipeline construction shaft, the method comprising:

inside the pipeline construction shaft, moving the first transport trolley with the loaded first pipe and the second transport trolley with the loaded second pipe forward and joining one end of the first pipe to the rearmost pipe;

inside the pipeline construction shaft, lifting another end of the first pipe, moving the first transport trolley and the second transport trolley backward, and drawing the first transport trolley from beneath of the first pipe to a near side of the first pipe;

inside the pipeline construction shaft, removing the coupler to separate the first transport trolley and the second transport trolley;

inside the pipeline construction shaft, moving the first transport trolley backward and drawing the first transport trolley below the second pipe loaded on the second transport trolley; and inside the pipeline construction shaft, moving the second transport trolley forward with the first transport trolley and joining one end of the second pipe on the second transport trolley to the other end of the first pipe joined to the rearmost pipe.

2. The pipe joining method inside the pipeline construction shaft according to claim 1, further comprising, after joining the one end of the second pipe on the second transport trolley to the other end of the first pipe joined to the rearmost pipe;

inside the pipeline construction shaft, lifting another end of the second pipe, moving the first transport trolley and the second transport trolley backward, and drawing the first transport trolley and the second transport trolley from beneath of the second pipe to a near side of the second pipe.

3. The pipe joining method inside the pipeline construction shaft according to claim 1, further comprising, after lifting the other end of the first pipe, moving the first transport trolley and the second transport trolley backward, and drawing the first transport trolley from beneath of the first pipe to the near side of the first pipe:

inside the pipeline construction shaft, removing the rails under the first pipe joined to the rearmost pipe and loading the rails on the first transport trolley;

inside the pipeline construction shaft, removing the coupler to separate the first transport trolley and the second transport trolley; and inside the pipeline construction shaft, drawing, with the removed rails, the first transport trolley below the second pipe loaded on the second transport trolley.

4. The pipe joining method inside the pipeline construction shaft according to claim 1, further comprising, inside the pipeline construction shaft, transferring the removed coupler into the second pipe.

5. The pipe joining method inside the pipeline construction shaft according to claim 1, further comprising, after lifting the other end of the first pipe, moving the first transport trolley and the second transport trolley backward, and drawing the first transport trolley from beneath of the first pipe to the near side of the first pipe:

inside the pipeline construction shaft, installing a support member under the other end of the first pipe; and inside the pipeline construction shaft, lowering the other end of the first pipe onto the support member and supporting the other end of the first pipe by the support member.

6. The pipe joining method inside the pipeline construction shaft according to claim 1, further comprising, after removing the coupler to separate the first transport trolley and the second transport trolley:

inside the pipeline construction shaft, drawing the first transport trolley below the second pipe while the second pipe loaded on the second transport trolley is lifted by a lifting device provided for the second transport trolley.

7. A pipe joining method inside a pipeline construction shaft, in which a first pipe is loaded on a first transport trolley of a pipe transport device including the first transport trolley and a second transport trolley that travel on rails in the pipeline construction shaft, a second pipe being loaded on the second transport trolley coupled to the first transport trolley via a coupler, the first pipe and the second pipe being transported, the first pipe and the second pipe being sequentially joined to a rearmost pipe of a pipeline in the pipeline construction shaft, the method comprising:

inside the pipeline construction shaft, moving the first transport trolley with the loaded first pipe and the second transport trolley with the loaded second pipe forward and joining one end of the first pipe to the rearmost pipe;

inside the pipeline construction shaft, lifting the other end of the first pipe, moving the first transport trolley and the second transport trolley backward, and drawing the first transport trolley from beneath of the first pipe to a near side of the first pipe;

inside the pipeline construction shaft, removing the coupler to separate the first transport trolley and the second transport trolley;

inside the pipeline construction shaft, installing an auxiliary rail device that branches from the rails on the near side of the first pipe and extends into the second pipe loaded on the second transport trolley;

inside the pipeline construction shaft, moving the first transport trolley backward from the near side of the first pipe, causing the first transport trolley to travel on the auxiliary rail device from the rails, and transferring the first transport trolley into the second pipe;

inside the pipeline construction shaft, removing a tilted part that branches from the rails and protrudes forward from one end of the second pipe; and inside the pipeline construction shaft, moving the second transport trolley forward and joining one end of the second pipe on the second transport trolley to the other end of the first pipe joined to the rearmost pipe.

8. The pipe joining method inside the pipeline construction shaft according to claim 7, wherein when the coupler is removed to separate the first transport trolley and the second transport trolley, one end of the coupler is removed from the first transport trolley, and wherein an operation part provided for the coupler is operated to disengage the other end of the coupler from the second transport trolley and remove the coupler between the first transport trolley and the second transport trolley.

9. A pipe transport device for transporting a pipe, comprising:

a first transport trolley positioned below a first pipe for transporting the first pipe;

a second transport trolley positioned below a second pipe for transporting the second pipe; and a coupling device for coupling the first transport trolley and the second transport trolley, wherein the coupling device has a coupler, a first end of the coupler being attachable and detachable to and from the first transport trolley below the first pipe, a second end of the coupler being attachable and detachable to and from the second transport trolley below the second pipe, wherein the first end or the second end of the coupler includes an engaging member that is engageable and disengageable into and from one of the transport trolleys, wherein the engaging member is switchable between an engaged state for engagement with one of the transport trolleys and a disengaged state for disengagement from one of the transport trolleys, wherein the coupler includes a switching device for switching the engaging member from the engaged state to the disengaged state, wherein the switching device includes an operation part for operating the switching device from outside and a link rod that extends in a direction of a pipe axis and slides freely in the direction of the pipe axis, the operation part being connected to one end of the link rod, wherein the operation part is exposed to a space formed between the first pipe loaded on the first transport trolley and the second pipe loaded on the second transport trolley, and wherein, when the operation part is operated in the space, the link rod slides in the direction of the pipe axis and an other end of the link rod switches the engaging member from the engaged state to the disengaged state.

10. The pipe transport device according to claim 9, wherein the engaging member drops from the engaged state so as to be switched to the disengaged state.

11. The pipe transport device according to claim 9, wherein one of the transport trolleys includes an urging member for urging the engaging member from the engaged state to the disengaged state.

12. The pipe transport device according to claim 9, wherein the coupler is divided into a first coupler and a second coupler, wherein the first coupler is detachably coupled to the first transport trolley, wherein the engaging member and the switching device are provided for the second coupler, and wherein the engaging member is switchable between the engaged state for engagement with the second transport trolley and the disengaged state for disengagement from the second transport trolley.

\* \* \* \* \*